(12) United States Patent
Tomczyk

(10) Patent No.: US 6,601,379 B1
(45) Date of Patent: Aug. 5, 2003

(54) INTERNAL COMBUSTION ENGINE

(75) Inventor: Hubert Tomczyk, Düsseldorf (DE)

(73) Assignee: Diro Konstruktions GmbH & Co. KG, Ruhen-Brechtorf (DE)

(*) Notice: Subject to any disclaimer, the term of this patent is extended or adjusted under 35 U.S.C. 154(b) by 0 days.

(21) Appl. No.: 09/958,897

(22) PCT Filed: Apr. 6, 2000

(86) PCT No.: PCT/DE00/01068

§ 371 (c)(1),
(2), (4) Date: Jan. 4, 2002

(87) PCT Pub. No.: WO00/61928

PCT Pub. Date: Oct. 19, 2000

(30) Foreign Application Priority Data

Apr. 14, 1999 (DE) .......................... 199 16 853

(51) Int. Cl.⁷ ................................. F02B 75/00
(52) U.S. Cl. ....................... 60/39.6; 123/59.1
(58) Field of Search .................. 60/39.6; 123/59.1

(56) References Cited

U.S. PATENT DOCUMENTS

| | | | | |
|---|---|---|---|---|
| 3,826,086 A | * | 7/1974 | Milisavljevic | 60/39.62 |
| 4,116,189 A | * | 9/1978 | Asaga | 123/190.6 |
| 4,553,385 A | | 11/1985 | Lamont | 60/39.6 |
| 4,739,615 A | | 4/1988 | Staheli | 60/39.6 |
| 6,199,369 B1 | * | 3/2001 | Meyer | 60/39.6 |

FOREIGN PATENT DOCUMENTS

| | | |
|---|---|---|
| DE | 2 039 398 | 2/1972 |
| DE | 297 18 938 | 12/1997 |
| EP | 0 074 174 | 3/1983 |

* cited by examiner

Primary Examiner—Sheldon J. Richter
(74) Attorney, Agent, or Firm—Husch & Eppenberger, LLC; Robert E. Muir; David A. Chambers

(57) ABSTRACT

The invention aims at providing higher efficiency and good exhaust gas performance. To this end, a fresh-gas is compressed in a first cylinder chamber having a first piston during successive compression strokes and compressed in one of at least two combustion chambers, in which combustion of a mixture consisting of the compressed fresh gas and an at least partially evaporated fuel is started after the combustion chamber has been closed in relation to the first combustion chamber. Subsequently, the combustion chamber is opened relative to a second cylinder chamber and a second piston in the second cylinder chamber is impinged upon by the combustion gases expanding form the combustion chamber to perform a working cycle. After the working cycle has been completed, the exhaust gases are expelled from the second cylinder chamber.

39 Claims, 48 Drawing Sheets

Fig. 2b
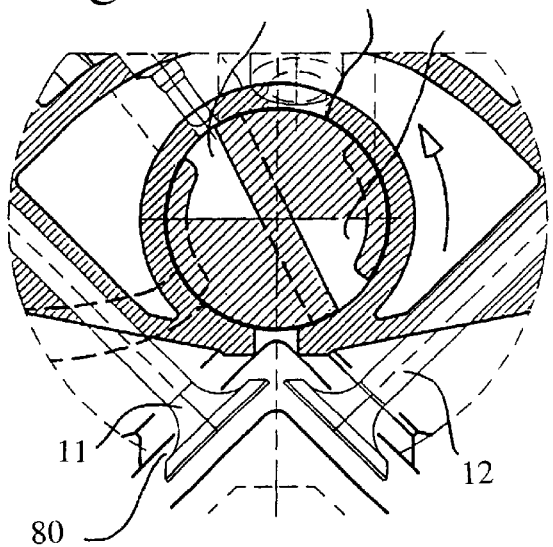
Fig. 2d
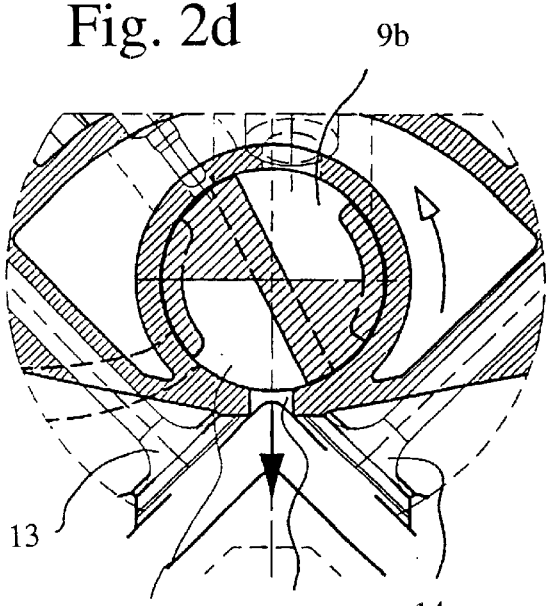
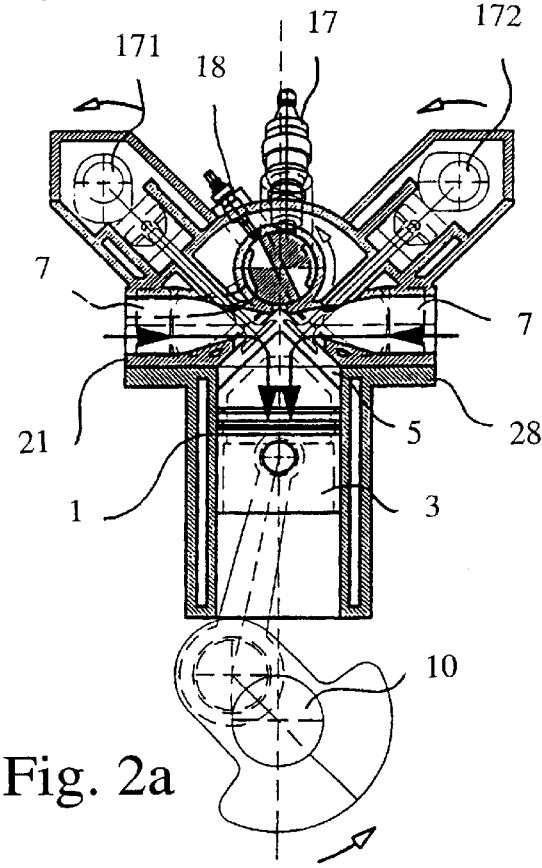
Fig. 2a
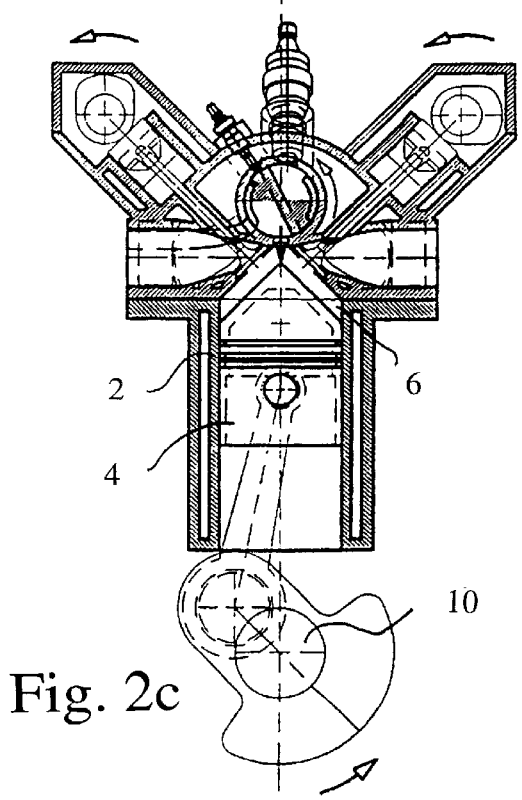
Fig. 2c

135°
Fig. 3b
Fig. 3d
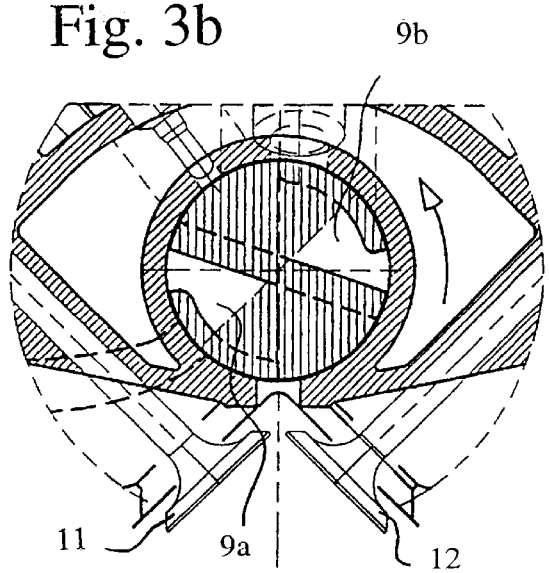
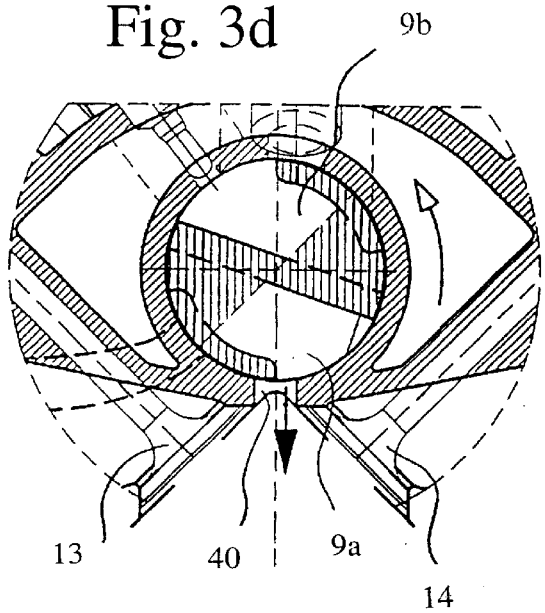
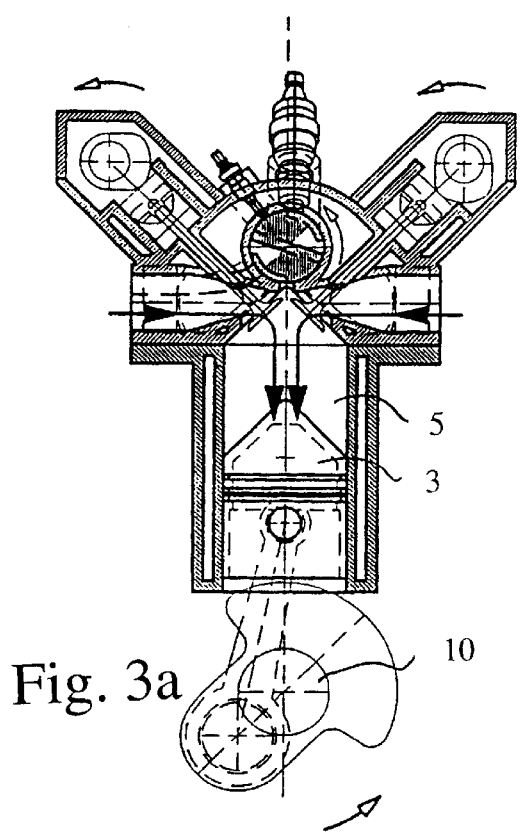
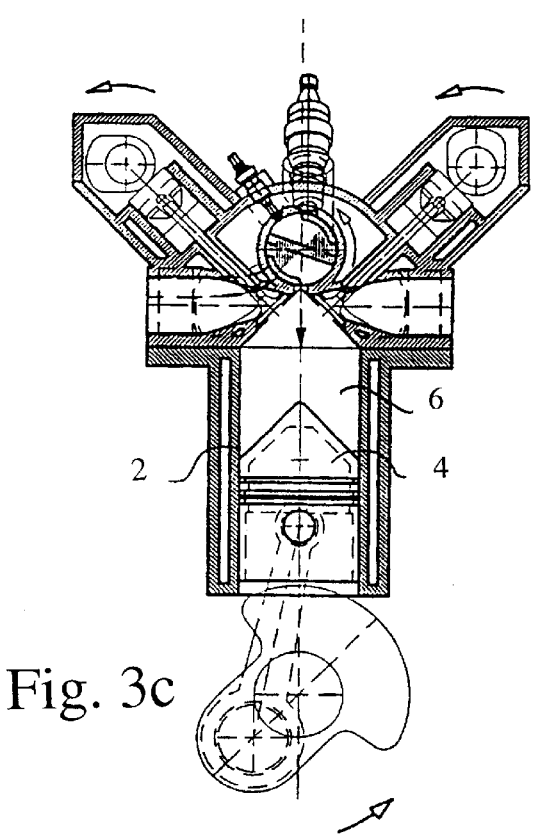
Fig. 3a
Fig. 3c

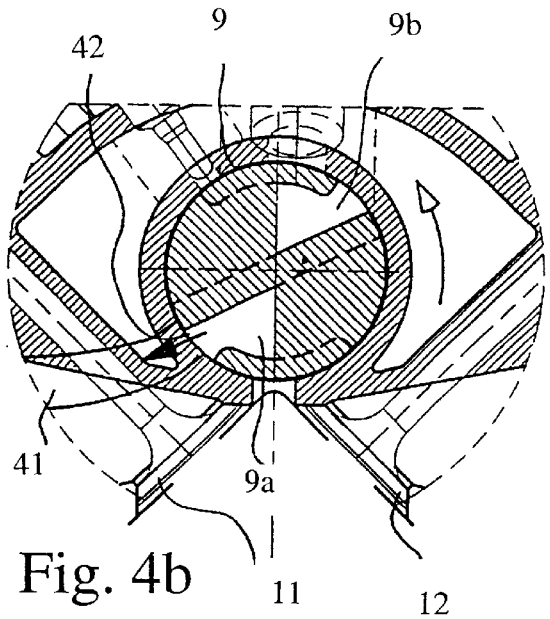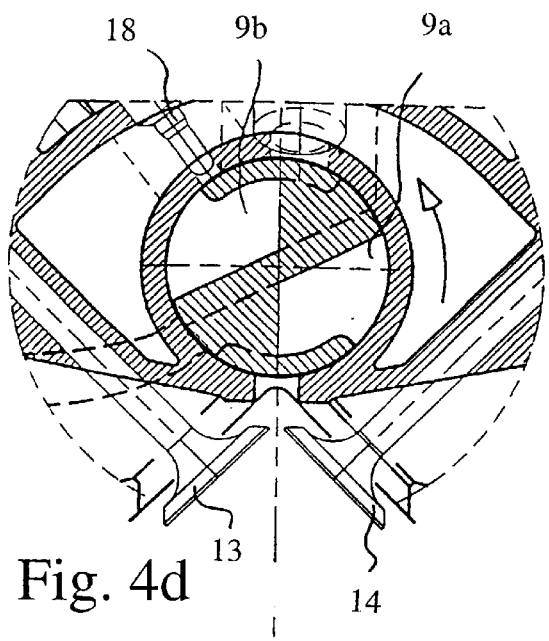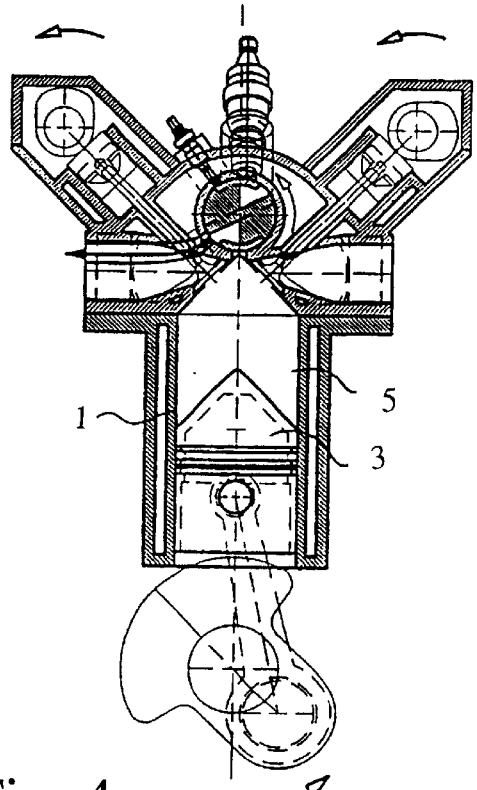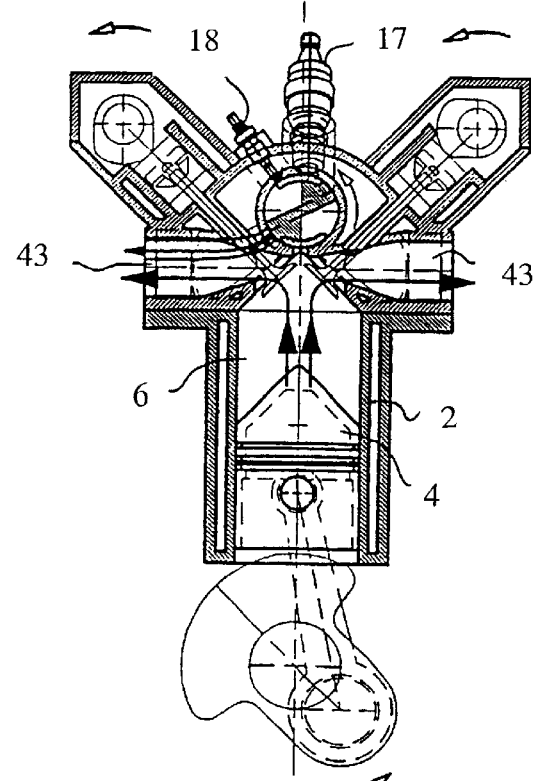
Fig. 4b
Fig. 4d
Fig. 4a
Fig. 4c

375°

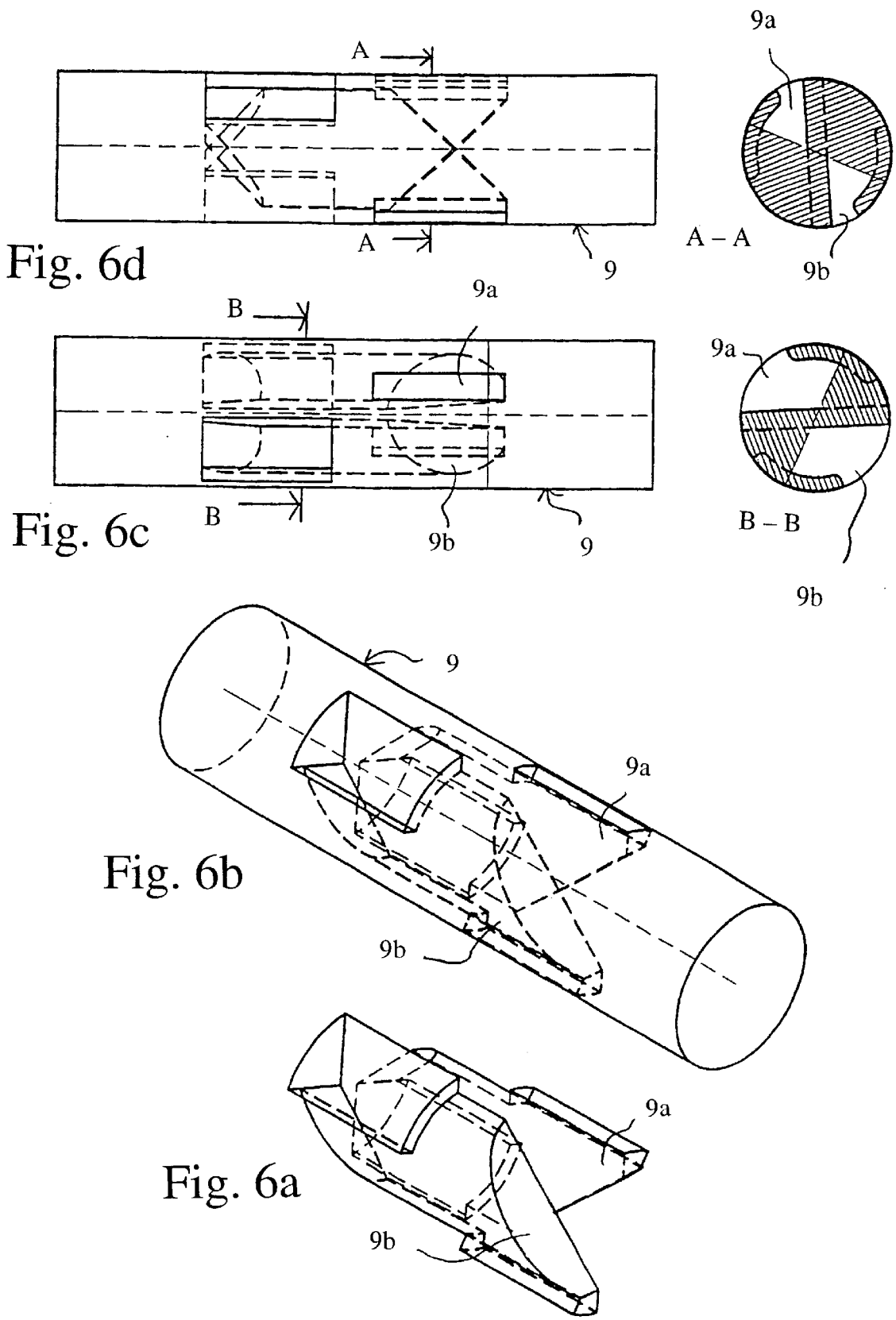

0°

90°

90°

180°
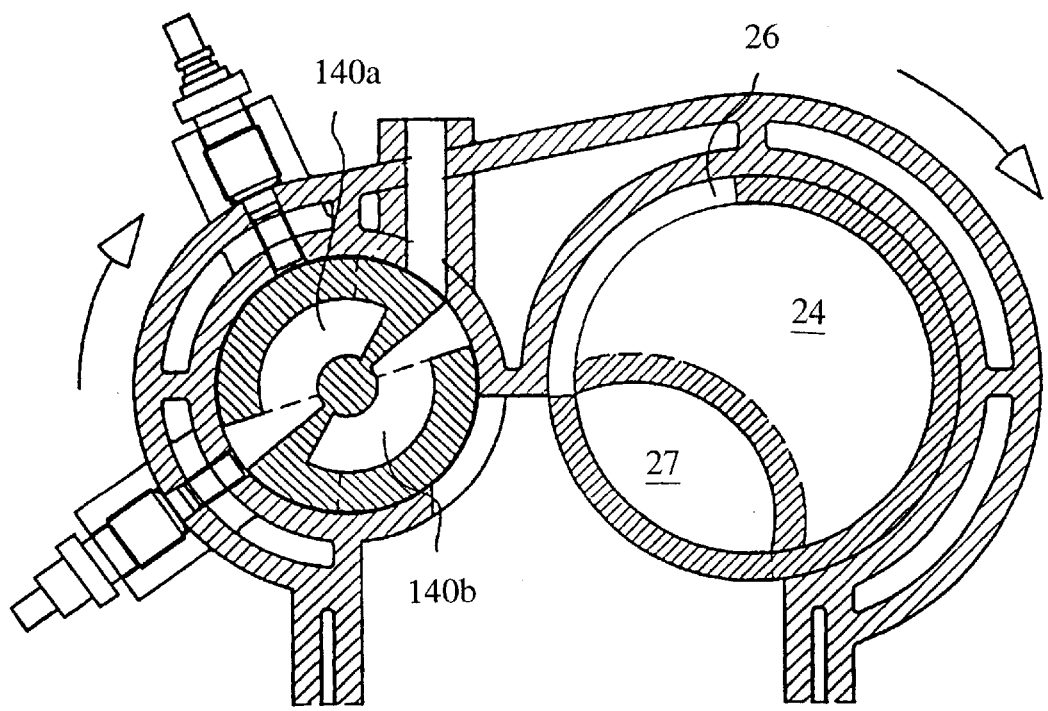
Fig. 11b
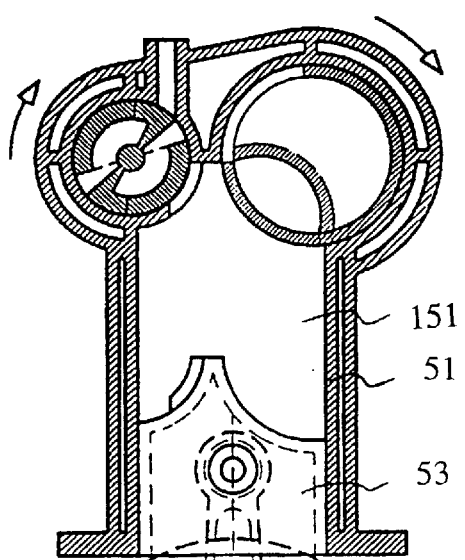
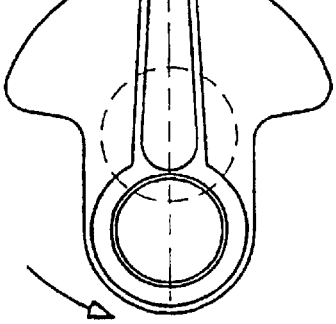
Fig. 11a

180°

270°

270°

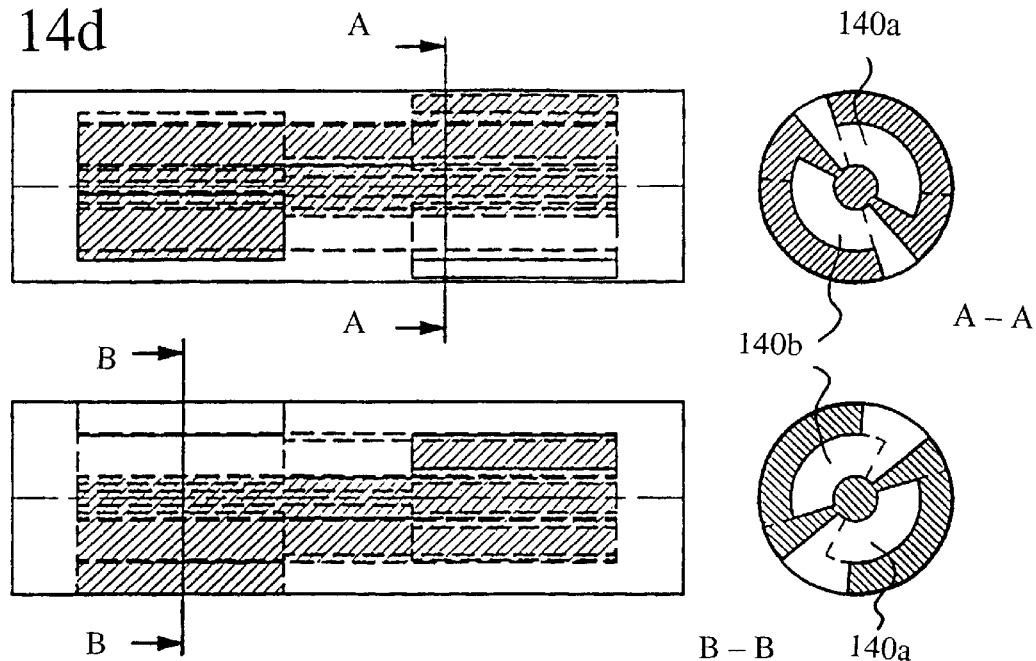
Fig. 14d
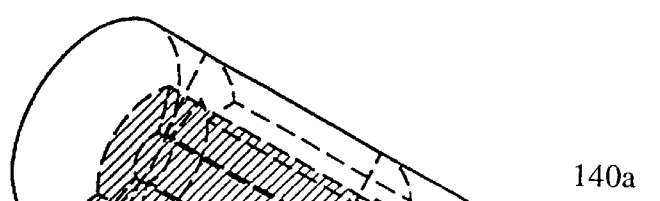
Fig. 14c
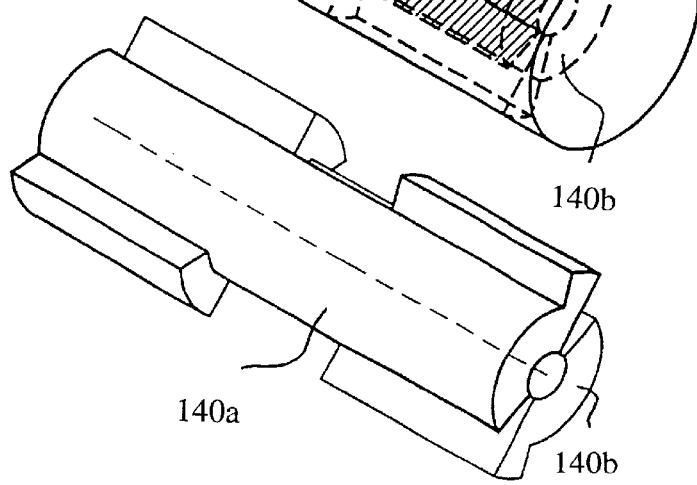
Fig. 14b
Fig. 14a

0°

90°

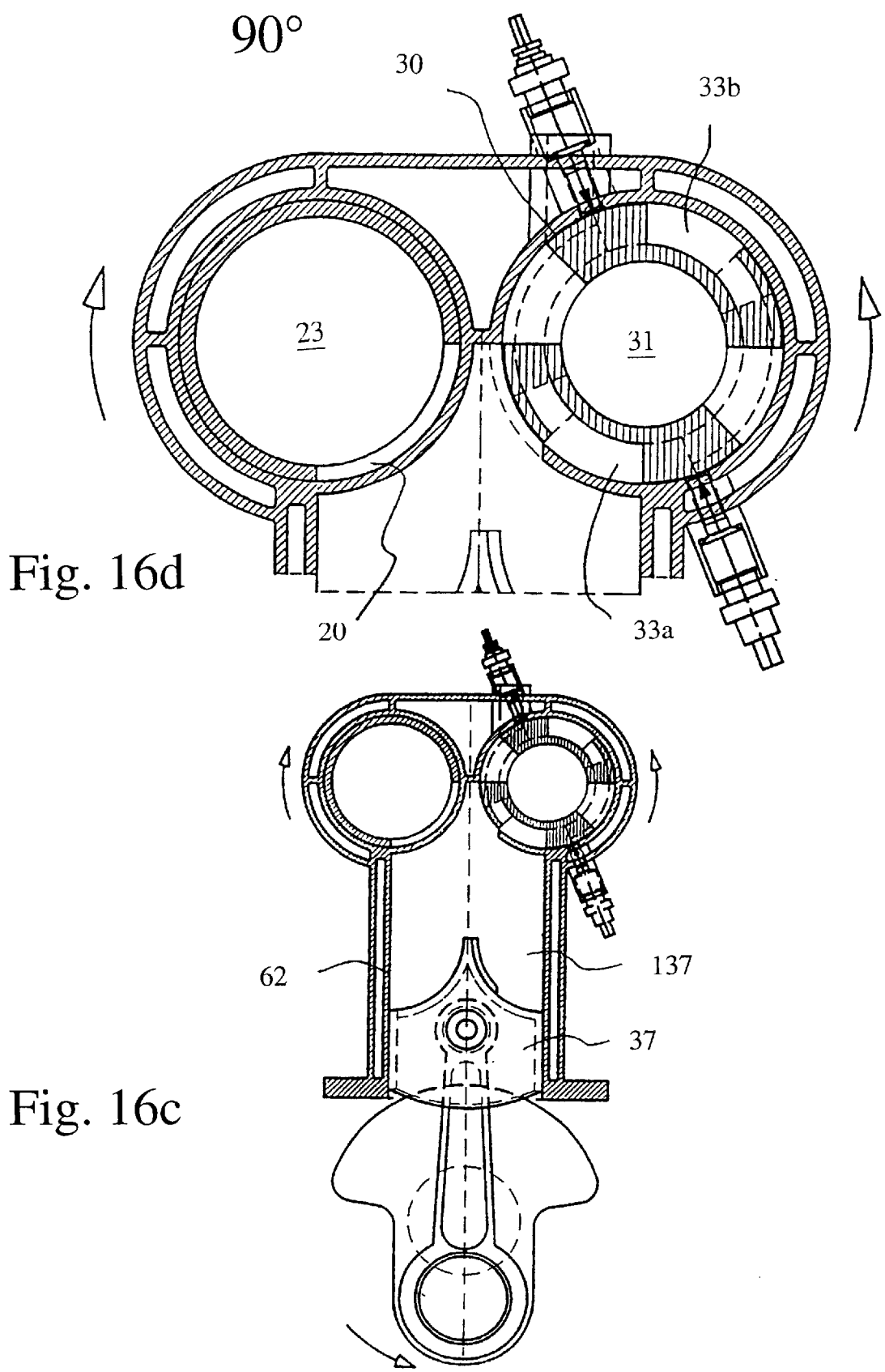

180°

180°

270°

270°

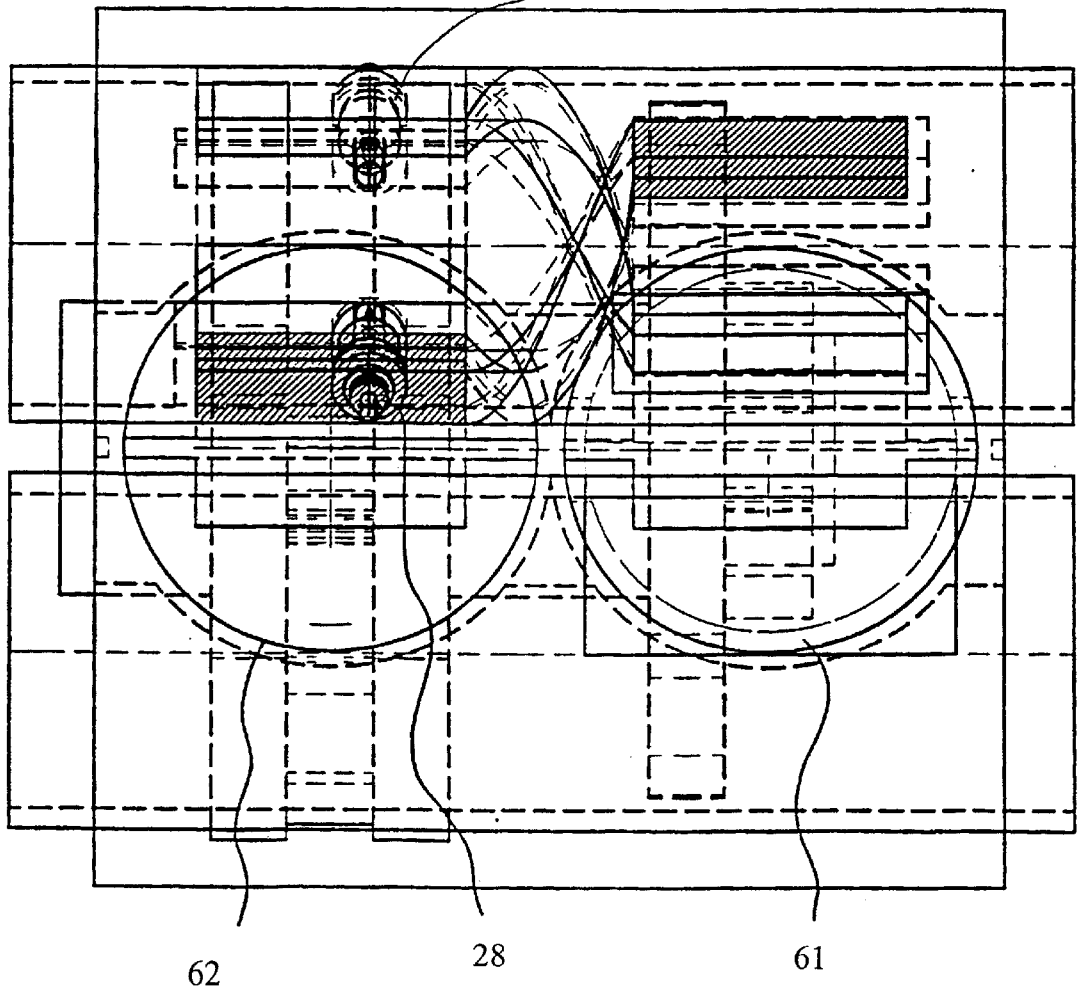

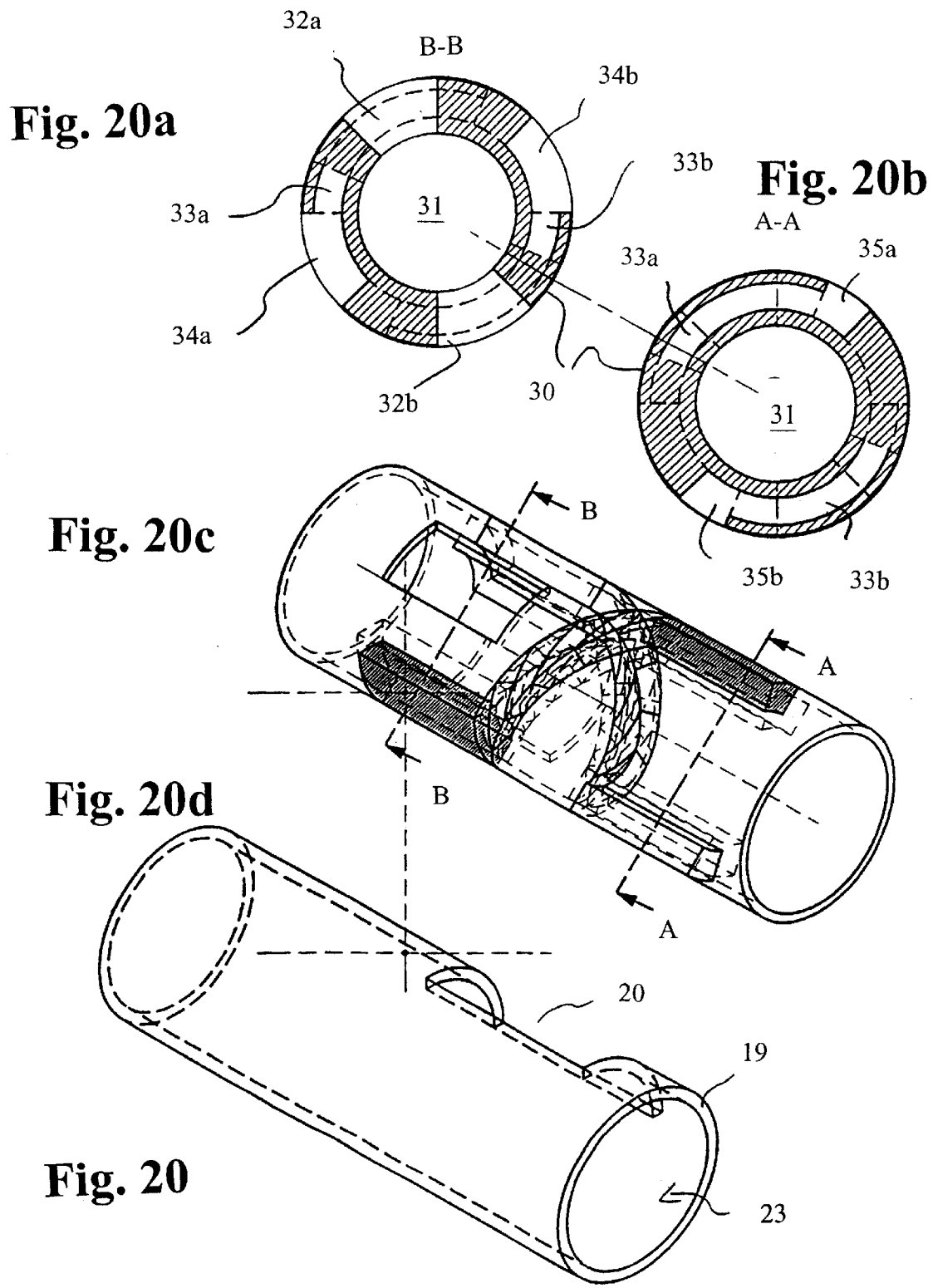

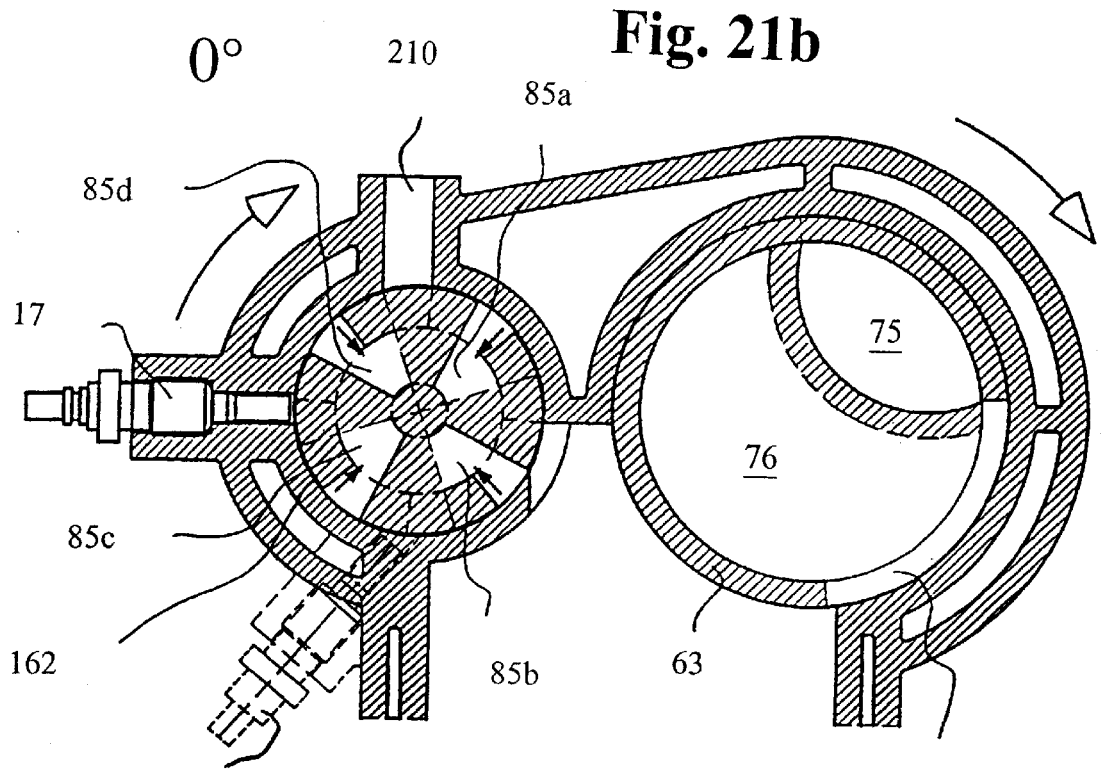
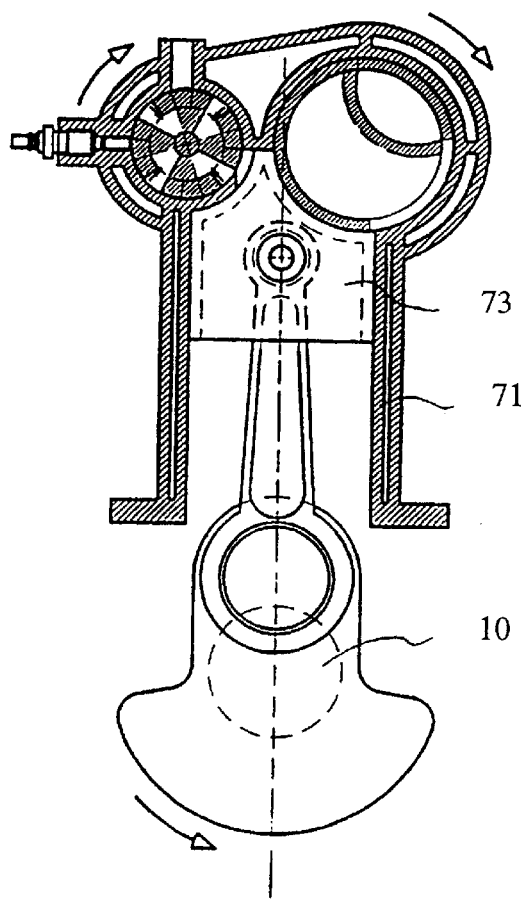
Fig. 21b
Fig. 21a

0°

Fig. 23b 85d 85a 180°
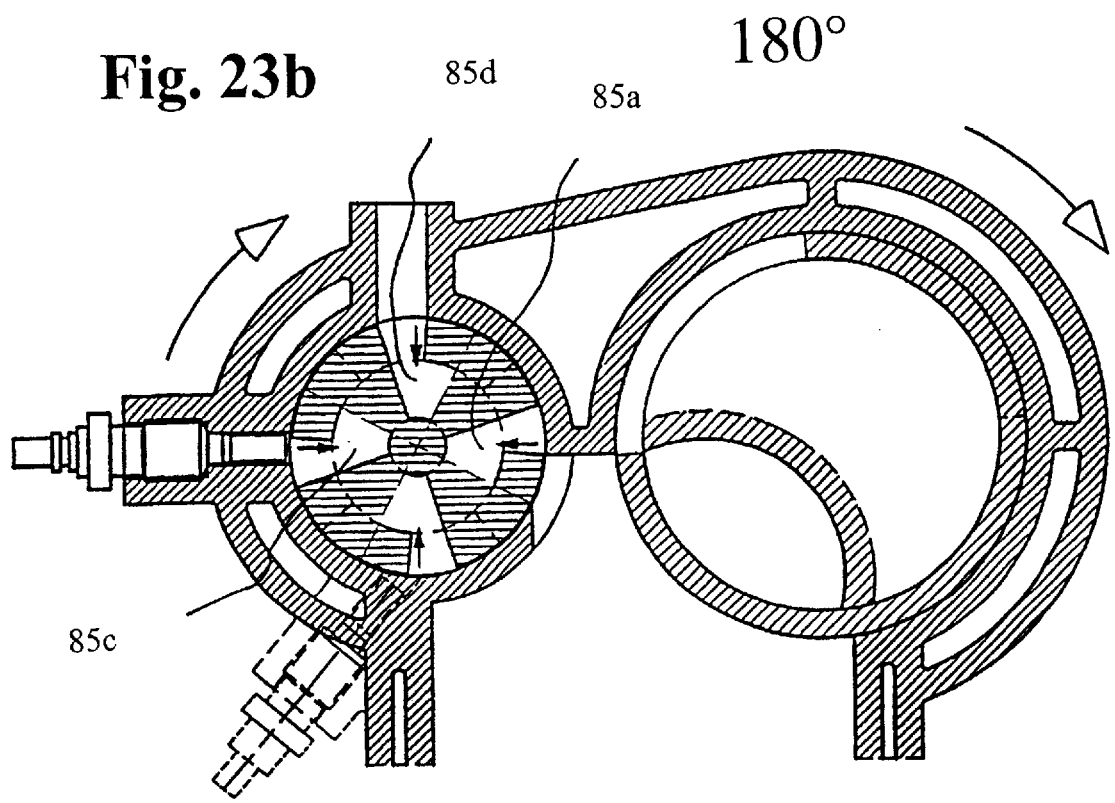
85c
Fig. 23a
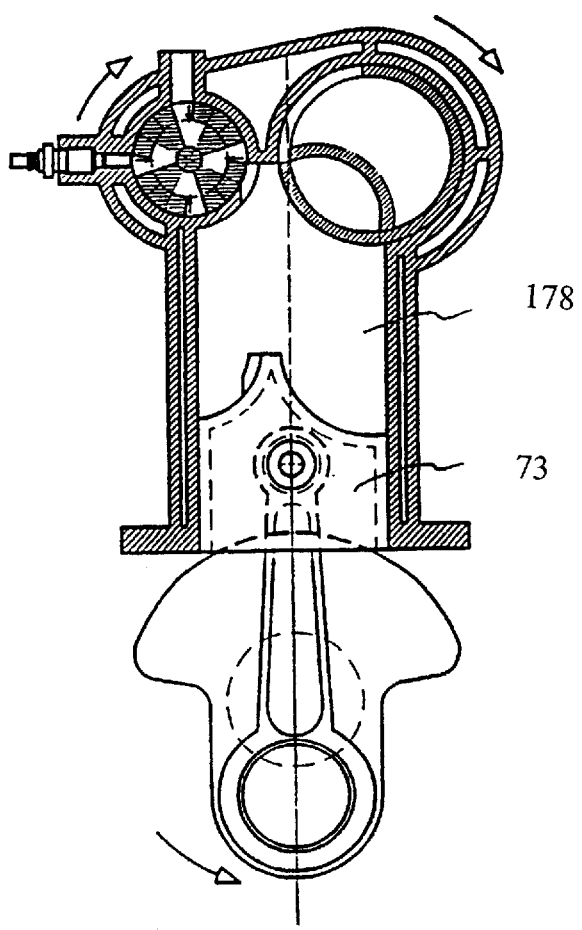

270°

270°

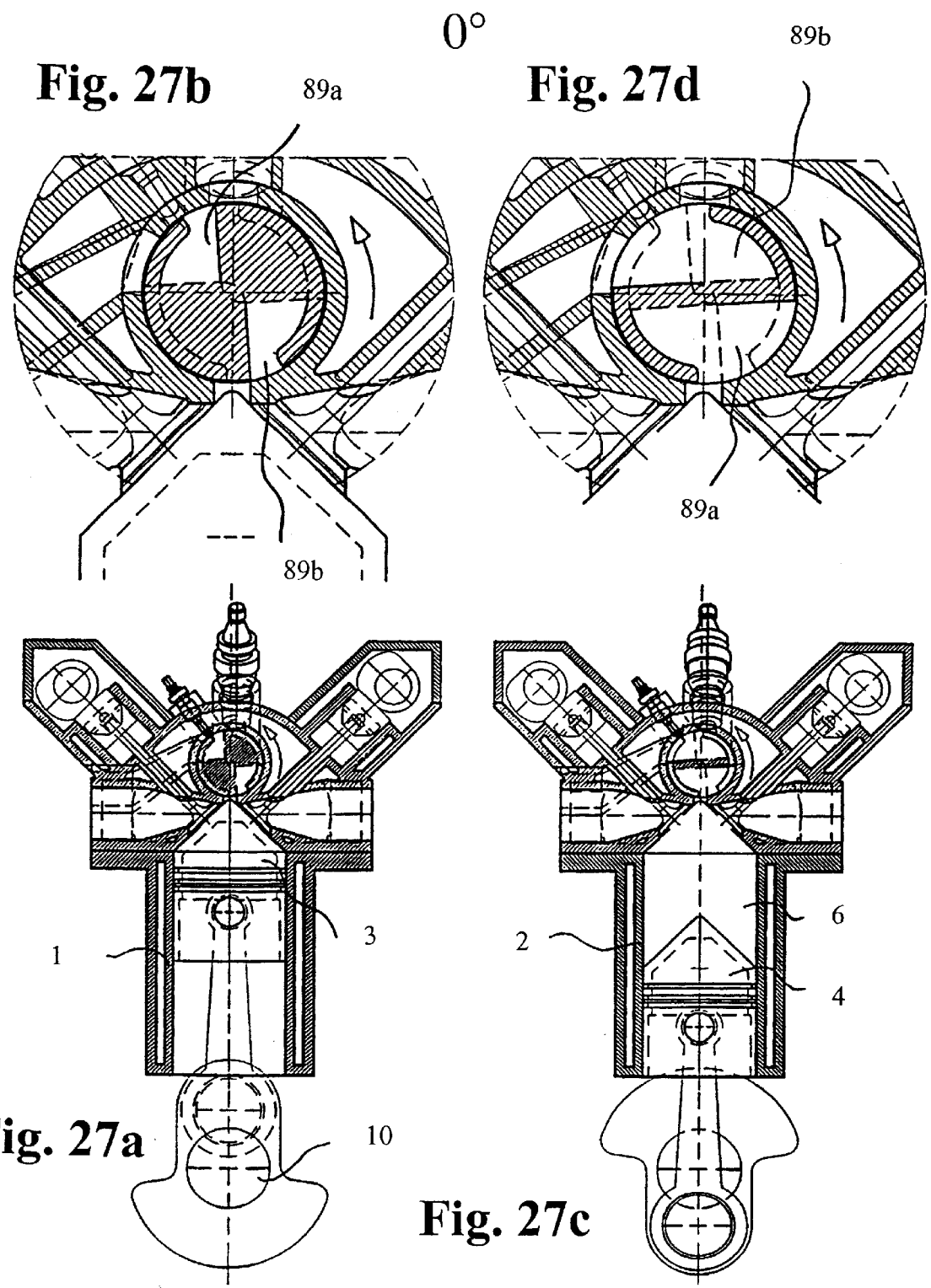

90°

180°

Fig. 29d 89a
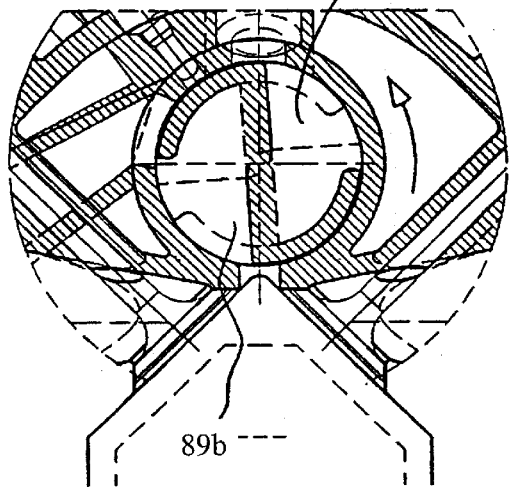
89b
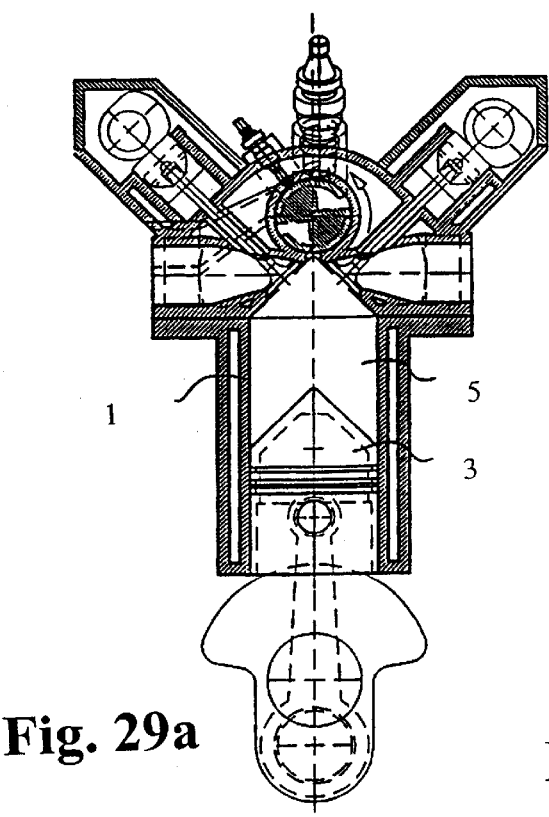
Fig. 29a
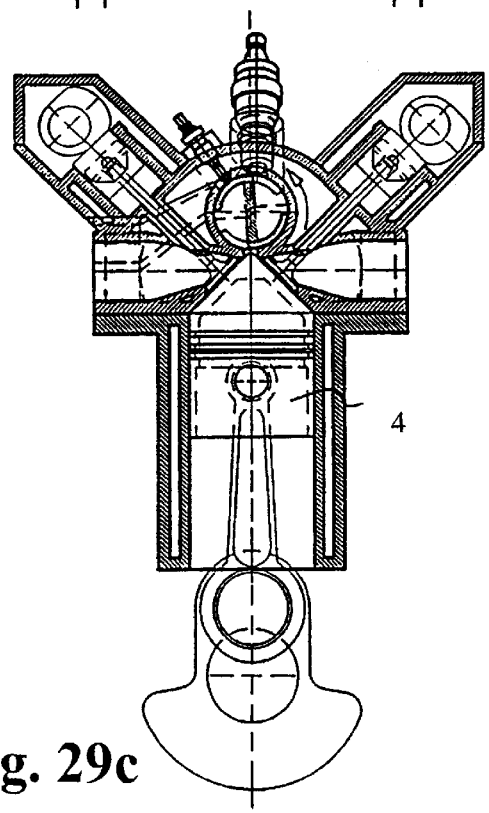
Fig. 29c

270°
Fig. 30b
Fig. 30d
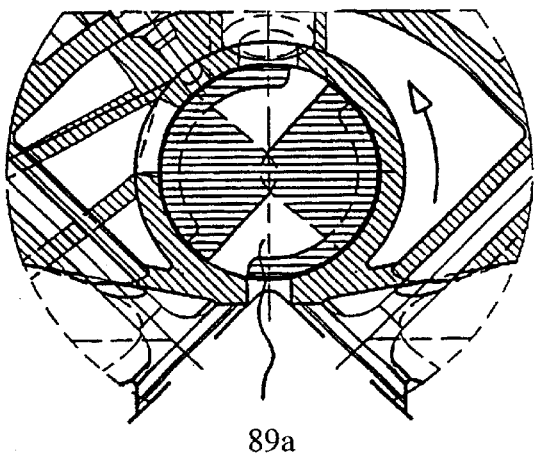
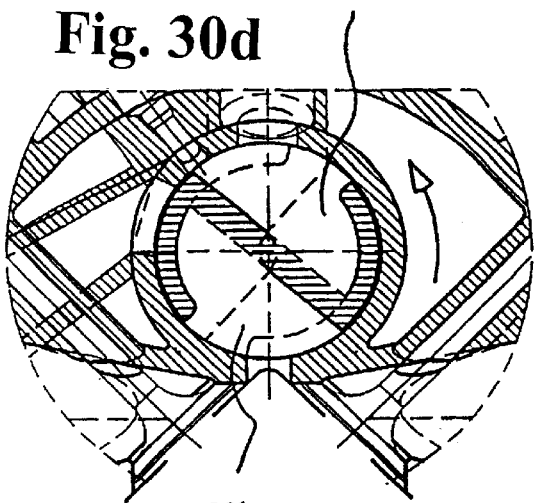
89a
89a  89b
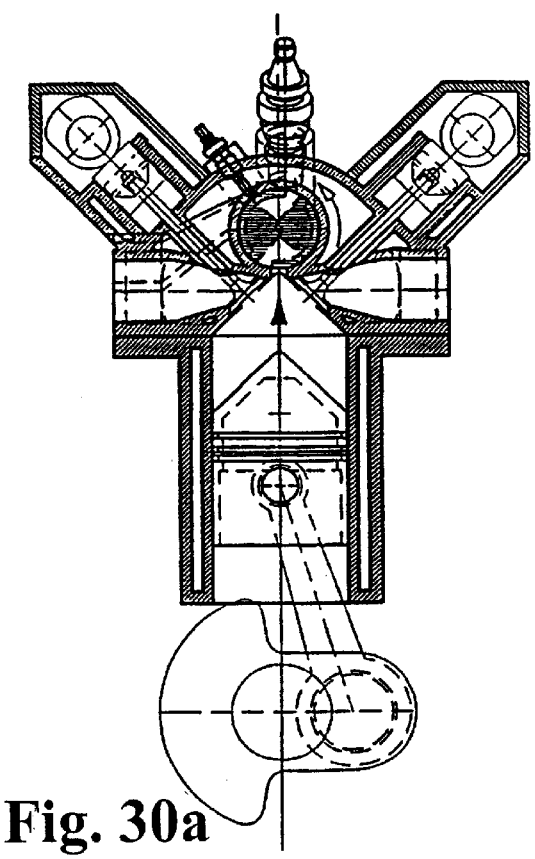
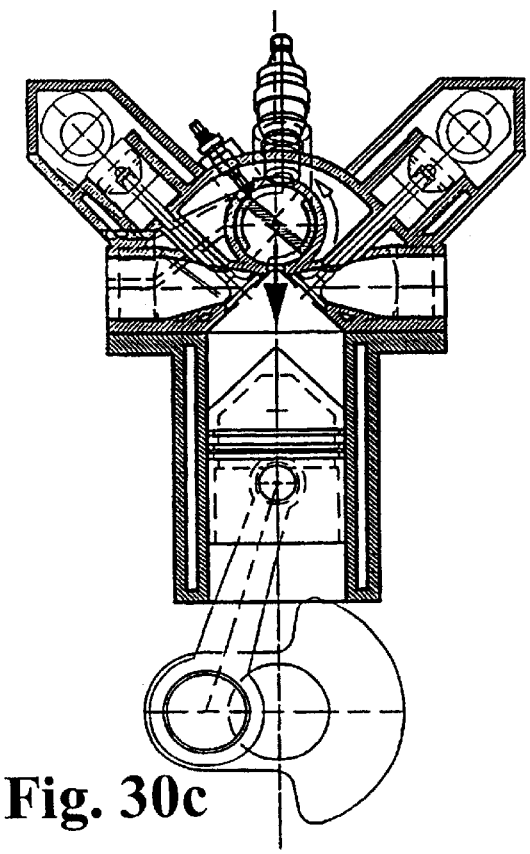
Fig. 30a  Fig. 30c

INTERNAL COMBUSTION ENGINE

TECHNICAL FIELD

The invention relates to a working procedure for an internal combustion engine and in particular this invention relates to an internal combustion engine incorporating a first cylinder having a displaceable first piston therein which is connected to a crank shaft, and a first cylinder volume which is formed between the first piston and the first cylinder and which is adapted to be filled via a fresh gas inlet with fresh gas during the expansion thereof in the course of a suction stroke, whereby the fresh gas is adapted to be compressed during a subsequent compression stroke where the first cylinder volume is reduced in size.

BACKGROUND OF THE INVENTION

In the case of known combustion engines using internal combustion, the combustion chambers relating to a respective cylinder (e.g., amongst others, engines of the Ricardo, Perkins, Hercules, Deutz, ACO type) are arranged statically in the cylinder head, the engine block and/or in the engine pistons. A proposal, which remains theoretical but which envisaged, includes a rotating combustion chamber in which a partial quantity of a fatty mixture was to be burnt, was disclosed in European Patent Application No. EP-A-0 074 174, it being intended that this mixture should then be used as an igniter for a weaker mixture contained in the conventional combustion chamber.

A feature common to all the embodiments was the short time period that was available for the evaporation of the fuel and the burning thereof, which was necessitated by the construction and the procedures adopted. A further disadvantage was that the combustion process took place in a variable volume and that it had to occur at approximately −15° before and up to +35° after the top dead center position. As a consequence thereof, there was incomplete combustion of the fuel, which results in the production of harmful exhaust gases. In the case of fuels which require more time for the preparation of the mixture (diesel) or for the combustion thereof (alcohol), there is an additional limitation with regard to the maximum possible rotational speed. The available combustion period is in the general order of magnitude of approximately 0.001 seconds. The compromises created include as illustrative examples: increasing the excess quantity of air or accepting an incomplete combustion process lead to a lowering of efficiency as well as an increase in the emission of harmful materials. In the case of the known working procedures, a reduction in the quantity of excess air would lead to incomplete combustion, to further energy losses and also to an increase in the emission of harmful substances. An increase in the theoretical efficiency by reducing the temperature of the exhaust gas is only made possible through increased expenditure for the apparatus.

In order to prolong the time required for preparing the mixture and for prolonging the combustion period, the fuel may be premixed with air in a carburetor, or, in the case of indirect fuel injection, in the suction channel intake, although the problems can only be reduced to a limited extent thereby.

SUMMARY OF THE INVENTION

An aspect of the present invention is to achieve improvements and especially higher performances, a higher level of efficiency and preferably good exhaust gas values in comparison with the conventional working procedures and internal combustion engines.

In accordance with the present invention, this aspect is achieved in the case of the working process or procedure mentioned hereinabove in that a fresh gas is compressed in a first cylinder volume incorporating a first piston during successive compression strokes and the compressed gas is then forced into one of at least two combustion chambers in which combustion of a mixture consisting of the compressed fresh gas and at least partially evaporated fuel is initiated after the combustion chamber has been closed relative to the first cylinder volume, whereafter the combustion chamber is opened relative to a second cylinder volume and the expanding combustion gases from the combustion chamber are applied to a second piston in the second cylinder volume for performing a working stroke and following the completion of the working stroke, exhaust gases are expelled from the second cylinder volume.

In the case of the internal combustion engine mentioned hereinabove, this aspect is achieved in that, outside the first cylinder volume, there are provided at least two mutually separated combustion chambers into which a compressed fresh gas, which is chargeable with fuel and is ignitable therein, is adapted to be alternately fed from the first cylinder volume during successive compression strokes, and, following the ending of a respective compression stroke, each of the combustion chambers is connectable during a working stroke to a second cylinder volume which is formed between a second cylinder and a second piston that is connected to the crank shaft, whereby the second piston is displaceable by the ignition of the compressed fresh gas that is charged with fuel in such a manner that the second cylinder volume will be expandable, and exhaust gas will be expellable by the second piston from the second cylinder volume during an exhaust stroke occurring subsequent to the working stroke.

Thus, in accordance with another aspect of the present invention, it is envisaged that the suction intake port and compression strokes should be spatially separated from the working and the exhaust strokes and that they should be carried out in two different cylinders. Between these two cylinders, there are disposed at least two combustion chambers into which the fresh gas that was compressed by the first cylinder is successively, i.e., in a cyclical sequence, fed during the compression stroke or towards the end of the compression stroke.

Advantageously, the combustion chambers are closed relative to the first cylinder volume towards the end of the compression stroke, for example, at the top dead center position of the first piston following the compression stroke. Since the combustion process is not initiated in the first cylinder volume used for compression purposes, the engine is not inclined to ignite the compressed fresh gas mixture prior to the top dead center position of the first piston and thus to premature formation of a high pressure.

Thereafter, fuel can be supplied, by means of an injection nozzle for example, into the combustion chambers, which are separated from the two cylinder volumes, at a selected time point in dependence on the desired evaporation period and ignition period and following the desired evaporation period, the ignition process can be initiated by means of a spark plug. Due to the fact that the fuel is injected into the previously emptied hot combustion chamber, the process of evaporation or mixture-preparation and distribution of the fuel in the fresh gas is extremely efficient, such efficiency not generally being attainable, for example, in the case of a conventional internal combustion engine using an injection process prior to the top dead center position. The ignition process, which is effected by means of a spark plug, can take place at a desirable time point prior to the opening of the combustion chamber relative to the second cylinder volume which is then at the start of the working stroke, whence the combustion process will have been completed or finished to a sufficient extent before the gas reaches the second cylinder volume. Hereby, the ignition process can be initiated at a suitable position within the combustion chamber so that the combustion gases will expand in an appropriate manner into the second cylinder volume. Advantageously, the flame front will expand in a direction opposite to this expansion of the combustion gases flowing into the second cylinder volume.

It is also possible for the ignition process to take place at a time point at which the combustion volume is already open relative to the second cylinder volume.

Basically, it is possible for the first cylinder and the second cylinder to have different capacities so that one can then optimize the compression and the working strokes. However, it is also possible to use a construction involving equal cubic capacities. It is advantageous if the cylinder volumes correspond to the swept volumes so that the first cylinder will have a practically negligible compression space and the compressed gas will be transferred in its entirety into the combustion chamber. Since the first cylinder volume, i.e., compression volume is subsequently refilled with fresh gas or air; the residual amounts of air will not cause interference. The compressive power stored in the residual air can be ritualized during the suction stroke. Due to the fact that the capacity of the second cylinder volume, advantageously, substantially corresponds thereto and that a negligible compression space remains in the second cylinder volume at the top dead center position of the second piston, the exhaust gases can be transferred to an exhaust channel port virtually in their entirety at the upper dead center position of the second piston. The residual exhaust gases do not lead to power losses since the power stored therein is ritualized during the following working stroke.

The combustion chambers can be arranged, advantageously, in a rotatably mounted body which is driven in synchronism with the crank shaft and thus in synchronism with the first cylinder and the second cylinder. Consequently, a good match between the stroke cycles of the cylinders and the combustion volume can be obtained. In the case of an Otto engine it is advantageous to have exactly two combustion chambers and to have four combustion chambers in the case of a diesel engine, these chambers being filled alternately with equal amounts of fresh gas and initiating the combustion process. In particular, the rotatably mounted body may be a combustion shaft that, for example, has a circular cross-section and is advantageously mounted in parallel with the crank shaft. Consequently, it can be filled in the radial direction thereof with fresh gas from the first cylinder through its upper outlet and it can transfer the ignited fresh gas in the radial direction thereof into the second cylinder volume. To this end, a respective portion of the circular cross-section combustion shaft projects by an appropriate amount into the cylinders, for example, a 90° segment of the circular cross-section of the combustion shaft, so that it can receive or expel gases over a large boundary surface area when a combustion chamber is opened. It is advantageous if the piston is adapted to this shape of the portion of the combustion shaft projecting into the cylinders so as to at least generally close the cylinder volumes at the top dead center position.

The two cylinders may be mutually separated in the axial direction of the combustion shaft so that it will be possible to transport the fresh gas more easily from the first cylinder volume to the second cylinder volume via the combustion shaft. The combustion shaft may, for example, comprise two combustion chambers and be rotated utilizing a step-down ratio of 2:1 relative to the crank shaft, preferably, being directly driven thereby. Consequently, the two combustion chambers can be alternately filled with compressed fresh gas, receive the fuel and expel substances into the second cylinder volume after the ignition process. The magnitude of the combustion chambers can be adapted to the desired degree of compression. In the case of diesel engines, more than two combustion chambers, four combustion chambers for example, may be formed and a step-down ratio of 4:1 be used so that there will be more time available for the evaporation process.

The injection nozzle and possibly also an ignition device may be arranged around the periphery of the combustion shaft in such a manner that the combustion chambers of the combustion shaft are exposed via an opening to the injection nozzle or the ignition device at a desired time point. In the case of a cylindrical combustion shaft, the injection process is advantageously effected, directly in the radial direction or mainly in the radial direction of the combustion shaft so that an efficient distribution of the fuel in the combustion chamber, which extends in the axial direction of the combustion shaft, can be achieved.

The combustion shaft may, in particular, be in the form of a combustion rotary valve, which advances the compressed fresh gas from the first cylinder volume to the second cylinder volume by virtue of its transporting effect.

For the purposes of supplying fresh gas to the first cylinder volume and/or, if necessary, for discharging the exhaust gas from the second cylinder volume, a suction rotary valve may be provided which is arranged, advantageously, in parallel with the combustion shaft. For example, it may likewise have a portion e.g. a 90° segment of its circular cross-section, projecting into the two cylinders, thereby ensuring an efficient supply of fresh gas and possibly a discharge of the exhaust gas over the large connecting surface to the cylinder volumes.

Hereby however, the exhaust gas channel may also be formed in the combustion shaft, advantageously, in the radial center thereof. It is advantageous if only a suction channel and an exhaust gas channel are formed so that the cross sections of these channels need not be made too small thereby maintaining a very low flow resistance. In this case, the suction rotary valve rotates, advantageously, without any step-down ratio relative to the crank shaft so as to enable the fresh gas supply opening therein and possibly also the exhaust gas reception opening therein to be opened relative to the cylinder volume at precisely defined times.

In dependence on the shape of the combustion shaft and possibly that of the suction rotary valve, these may be driven in the same sense or in the opposite sense relative to the crank shaft. In dependence on the angular displacement between the fresh gas supply opening and the expansion opening for expelling the ignited, compressed fresh gas from the combustion shaft, the pistons in the two cylinders may be rotated relative to one another with or without an arbitrary displacement of the tappets or an angular difference of the crank shaft e.g., 90°, 180°, 270° and so forth. Furthermore, combustion moderators may be employed or catalyzers may be used for the combustion process for the purposes of achieving flameless combustion in the combustion chamber, such as, e.g., a nickel insert element for a mixture of naphtha and water or ceramic inserts, without thereby affecting the cylinder volumes. For example, water may be injected into the combustion chamber in order to lower the temperature of the exhaust gases without thereby causing a considerable loss of pressure.

If the combustion shaft is in the form of a rotary valve, the connecting channels to the plurality of combustion chambers may, in particular, be in the form of a screw thread over the periphery of the rotary valve, whence they are also axially adjacent to one another, so as to increase the advancing effect produced thereby.

Advantageously, the rotary valve is surrounded in sealed manner by a stationery rotary valve housing, which comprises connector openings to the two cylinder volumes.

Due to the use of a rotary valve, whose combustion chambers are only connected to the outlet opening of the first cylinder volume and the inlet opening of the second cylinder volume in certain positions, the construction of valves for controlling these inlets and outlets can be dispensed with so that the manufacturing costs can then be reduced. In addition, due to the fact that the supply of fresh air to the first cylinder volume and the process of expelling the exhaust gases is effected by this or a further rotary valve, the use of valves for controlling the inlets and outlets of the two cylinders can be completely dispensed with so that a cam shaft for these valves will not be necessary. Consequently only the rotary valve or the rotary valves need to be driven by the crank shaft, but a cam shaft having corresponding valves projecting into the cylinder volumes does not need to be driven.

These are merely some of the innumerable illustrative aspects of this present invention and should not be deemed an all-inclusive listing.

BRIEF DESCRIPTION OF THE DRAWINGS

The invention will be explained in more detail hereinafter with the help of some embodiments taken in conjunction with the accompanying drawings.

FIGS. 2a–d are sectional views through the first and second cylinders in the embodiment of FIG. 1 wherein the crank shaft is in the 45° position;

FIGS. 3a–d are corresponding sectional views for the case where the crank shaft is in the 135° position;

FIGS. 4a–d are corresponding sectional views for the case where the crank shaft is in the 225° position;

FIGS. 6a–d is an illustration of the two combustion chambers in the first embodiment;

FIGS. 11a–d are sectional views depicting the first and second cylinders in the 180° position;

FIGS. 14a–d are illustrations of the combustion chambers in the second embodiment; a, b: perspective, c, b: perspective, c: side view, sectional view; d: top view, sectional view;

FIG. 19 is a top view of the internal combustion engine in the third embodiment;

FIGS. 20a–d are illustrations of the combustion chambers in the third embodiment;

FIGS. 27a–d through 30a–d are sectional views of the first and second cylinders of an internal combustion engine in a fifth embodiment depicting the crank shaft in the 0°, 90° 180°, 270° positions;

DETAILED DESCRIPTION OF THE INVENTION

Figure 1:
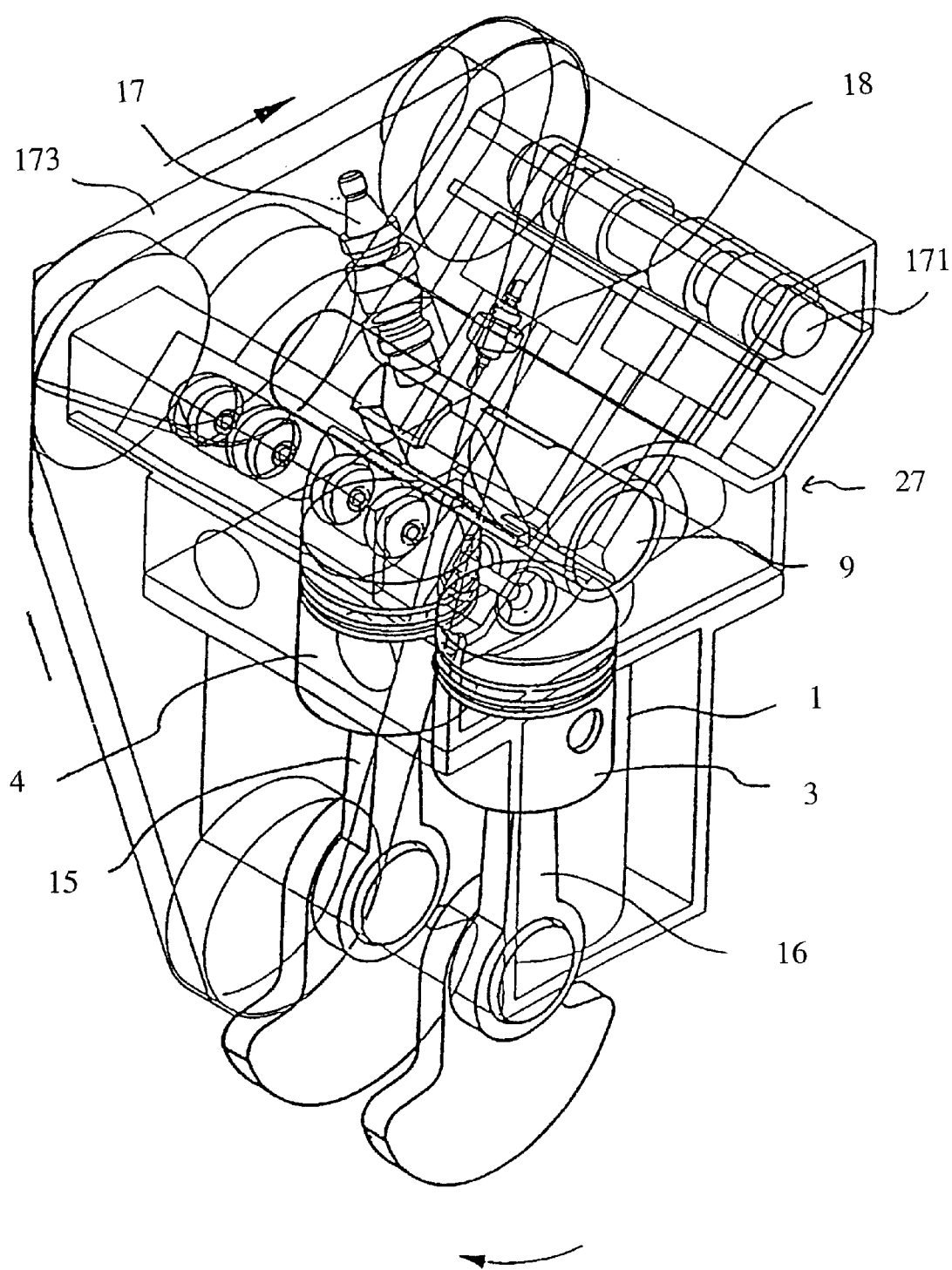
FIG. 1 is a perspective view of an internal combustion engine according to a first embodiment of the invention.

According to FIG. 1, an internal combustion engine includes at least a first and a second cylinder although only the first cylinder 1, which serves as a compression cylinder, is indicated in FIG. 1. A first piston 3 is displaceably mounted in known manner in the first cylinder 1 serving as a compression cylinder. A second piston 4 is mounted in corresponding manner in the working cylinder 2. The two pistons are mounted on a crank shaft 10, which are not illustrated in FIG. 1 by means of piston connecting rods 15, 16. The cylinder volumes forming the respective cylinders above the two pistons 3, 4 are connected via valves to a supply means.

In accordance with the present invention, a combustion rotary valve 9 is rotatably mounted in the cylinder head 21 above the two cylinders and it comprises combustion chambers in the form of recesses which are illustrated in detail in FIGS. 6a–d and these will be explained in greater detail with reference to the FIGS. 2–5.

The arrangement of the working cylinder and the combustion rotary valve 9 with the crank shaft 10 in a first 45° position is depicted in FIGS. 2a–d. The compression cylinder 1 is in the suction stroke phase so that the first piston 3 will be moved downwardly by the indicated rotation of the crank shaft 10 whereby fresh air will flow into the expanding first cylinder volume 5 through the fresh air supply lines 7 and the opened inlet valves 11, 12. To this end, the inlet valves 11, 12 are controlled in known manner by the cam shafts 171, 172 which are connected to the crank shaft 10 by means of an e.g. cam belt, e.g., v-belt 173 as depicted in FIG. 1. In accordance with FIGS. 2c, 2d, the working cylinder 2 is in the working stroke phase whereby combustion gases, i.e., a burnt mixture of fresh gas and fuel will be expelled from the first combustion chamber 9a of the combustion rotary valve 9 through an expansion opening 40 into the second cylinder volume 6 as depicted by the black arrow in FIG. 2d. According to FIG. 2d, the exhaust valves 13, 14 are closed at this point. Consequently, the combustion gases will flow into the second cylinder volume 6 from the second combustion chamber 9b and thereby force down the second piston 4.

The combustion rotary valve 9 rotates with a step-down ratio of 2:1 relative to the crank shaft 10. In this embodiment, the directions of rotation of the crank shaft 10 and the combustion rotary valve 9 are the same and, moreover, they correspond to the directions of rotation of the cam shafts 171, 172. The pistons 3, 4 and the inner walls of the cylinders 1, 2 are shaped in such a manner that virtually the entire cylinder volume will be formed by the swept volume so that only a negligible residual region in the form of a compression volume will remain since, in accordance with the present invention, it is intended that the compressed air be forced into the combustion chambers of the combustion rotary valve 9.

Advantageously, the pistons 3, 4 taper inwardly in the form of a wedge whilst the upper ends of the cylinders taper in corresponding manner into a wedge-like boring in the form of a frustum of a cone which may be formed in the cylinder head for example as depicted in the drawings, so that only the cylindrical cylinder tracks have to be formed in the crankcase of the engine. Cylinder liners may also be inserted in a known manner e.g. in cylinder blocks consisting of aluminium alloys.

As seen in FIGS. 3a–d, the crank shaft 10 is located in a position rotated through 90° relative to that in FIGS. 2a–d, this being referred to in corresponding manner as the 135° position. The first cylinder 1 is still in the suction stroke phase so that there is still no open connection between the first cylinder volume 5 and one of the combustion chambers of the combustion rotary valve 9. In correspondence with FIG. 3b, the first combustion chamber 9a of the combustion rotary valve 9 is still blocked off relative to the first cylinder volume 5 in this position in which it is rotated through a further 45° relative to that of FIG. 2b. As depicted in FIGS. 3c and d, the second cylinder 2 is approaching the end of the working stroke so that the second piston 4 continues to be pressed downwardly. However, the expansion opening 40 in the first combustion chamber 9a is slowly closing and is already half closed in FIG. 3d.

FIGS. 4a–d show the 225° position of the crank shaft wherein the residual exhaust gases remaining in the first combustion chamber 9a after the working stroke are expelled into an exhaust channel 41 via an outlet opening 42 in the first combustion chamber 9a. At the same time, the compression stroke is initiated in the first cylinder 1 wherein the first piston 3 is moved upwardly and compresses the fresh gas that was sucked in previously during the suction stroke of FIGS. 2, 3. The inlet valves 11, 12 are correspondingly closed here.

Furthermore, the first cylinder volume 5 is also closed relative to the two chambers in the combustion rotary valve 9.

The second cylinder 2 is then in the exhaust stroke phase wherein the exhaust gases are expelled into an exhaust channel 43 through the opened outlet valves 13, 14 as indicated by the black arrows. The ignition process in the second combustion chamber 9b is started by the spark plug 18.

In the 315° position shown in FIGS. 5a–5d, the first cylinder 1 is reaching the end of the compression stroke phase wherein the compressed air is forced into the first combustion chamber 9a through an inlet opening 44 as depicted by the black arrow. Hereby, the inlet valves 11, 12 continue to remain closed.

Figures 5A, 5B, 5C, 5D:
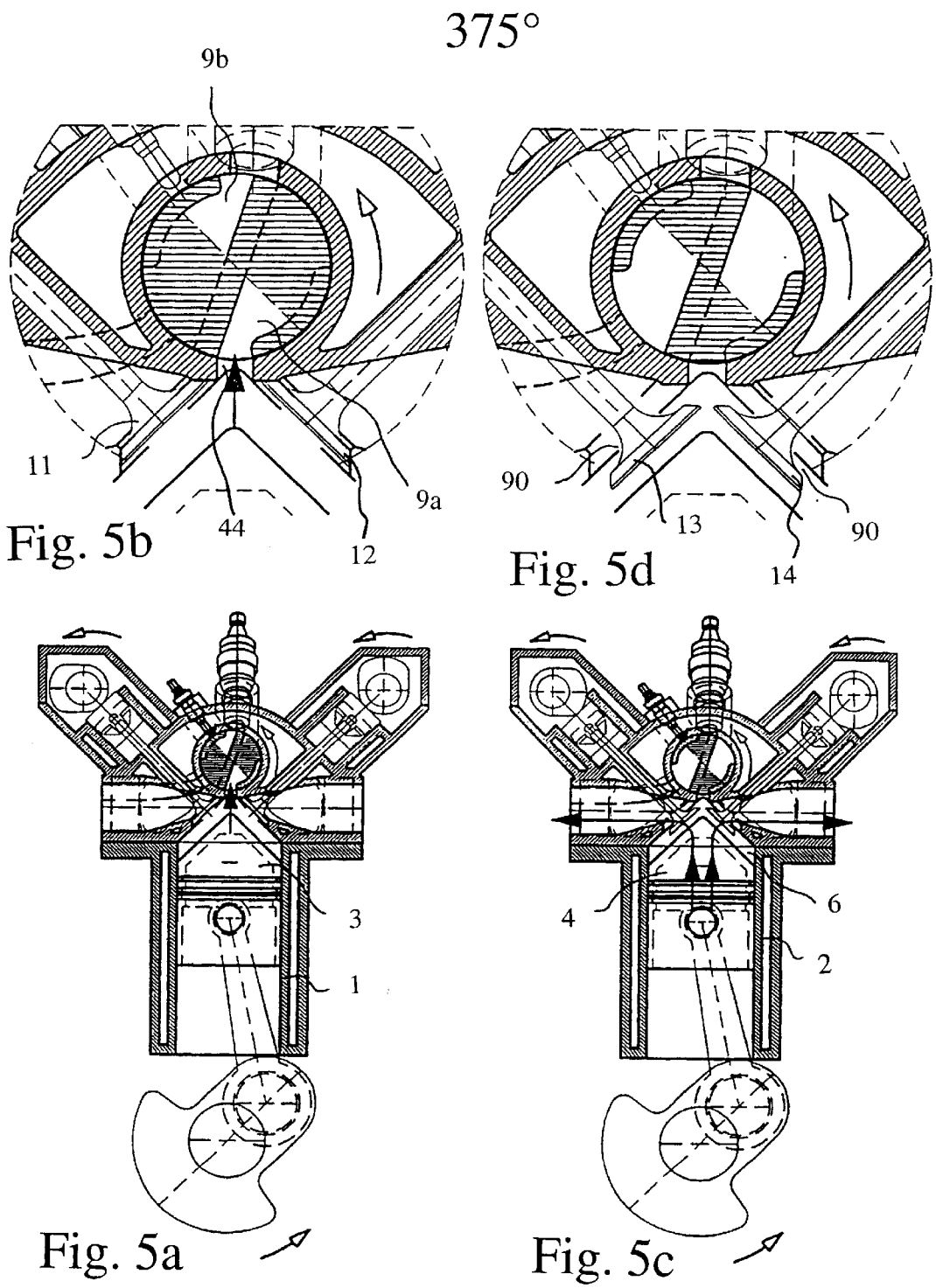
FIGS. 5a–d are corresponding sectional views for the case where the crank shaft is in the 315° position.
Figure 7:
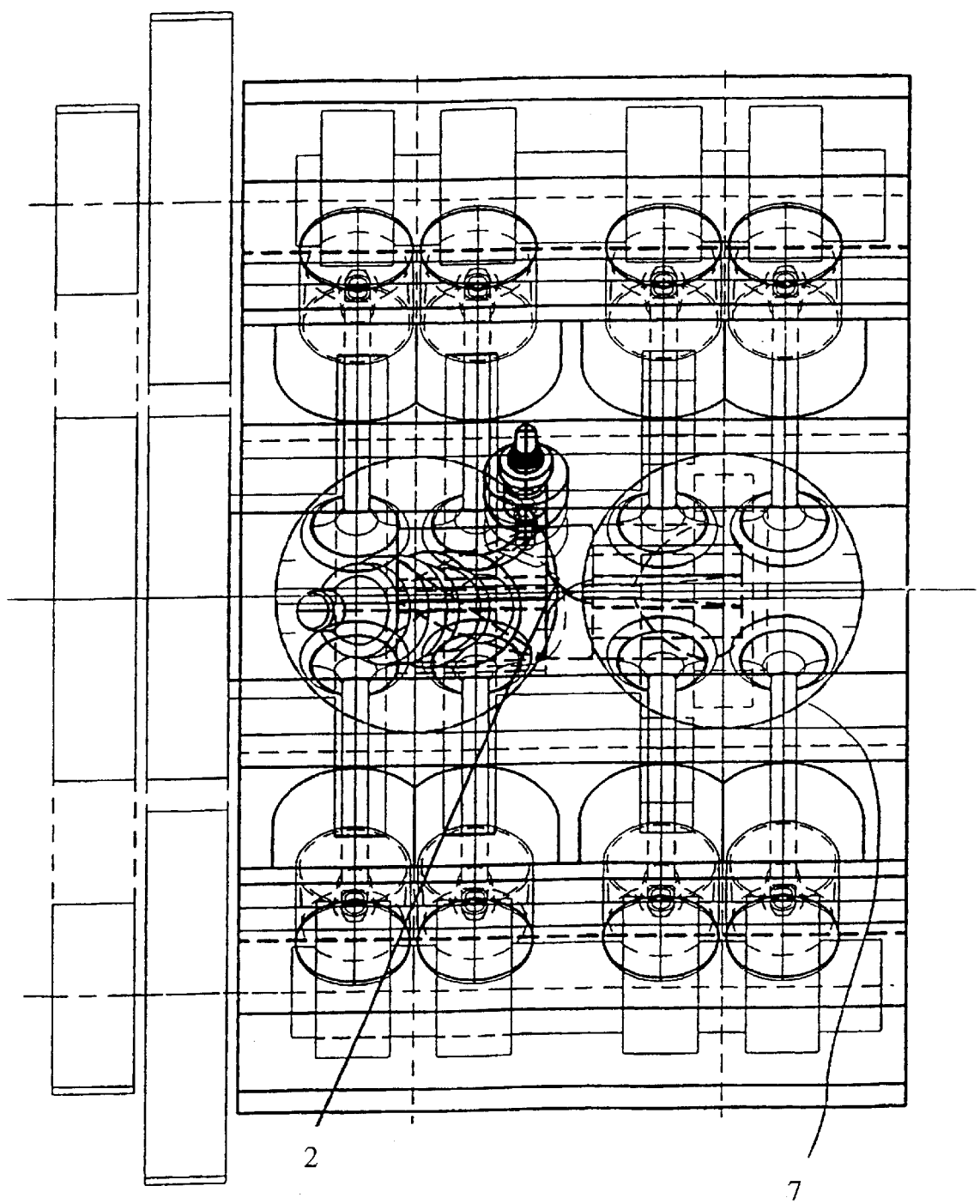
FIG. 7 is a top view of the internal combustion engine in the first embodiment.

As depicted in FIGS. 5c and d, the working cylinder 2 has reached the end phase of the exhaust stroke so that the outlet valves 13, 14 continue to be opened, whereas there is no open connection between the second cylinder volume 6 and one of the combustion chambers in the rotary valve.

The subsequent position of the crank shaft after rotation through 90° is not shown, but this corresponds to the arrangements shown in FIGS. 2a–d, although the combustion rotary valve 9 has only executed a 180° rotation due to its step-down ratio and thus the combustion chambers 9a and 9b are reversed relative to FIGS. 2a–d. However, since these combustion chambers 9a and 9b are formed in the same manner, a similar cycle then commences.

Figure 8:
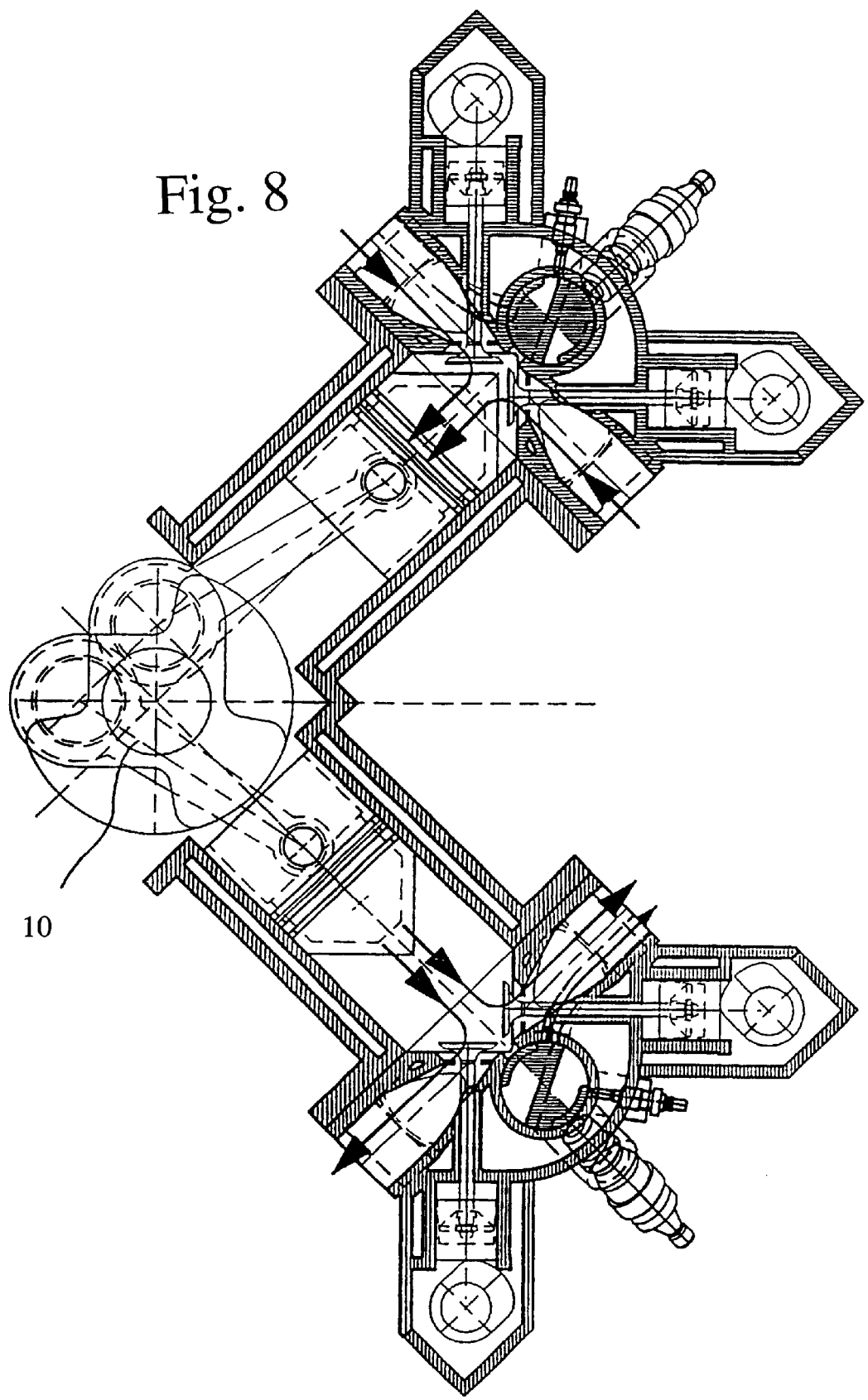
FIG. 8 is a sectional illustration of a V-engine incorporating two arrangements of the first embodiment each comprising two cylinders.

FIG. 8 shows one example of a V arrangement of two units in accordance with the invention. Furthermore, in-line engines or Boxer engines are also possible.

Figure 9B:
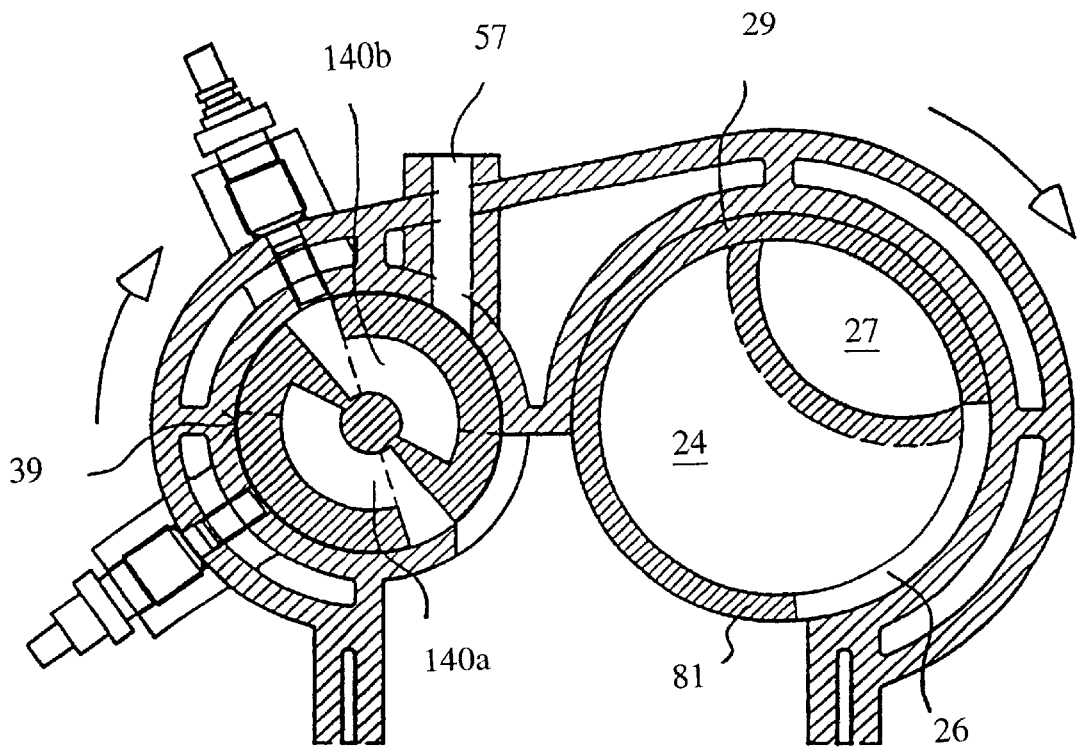
FIGS. 9a, b is a sectional view through the first cylinder of an internal combustion engine in a second embodiment of the invention depicting the crank shaft in the 0° position thereof.
FIGS. 9c–d are sectional views through the second cylinder in the 0° position.
Figure 9A:
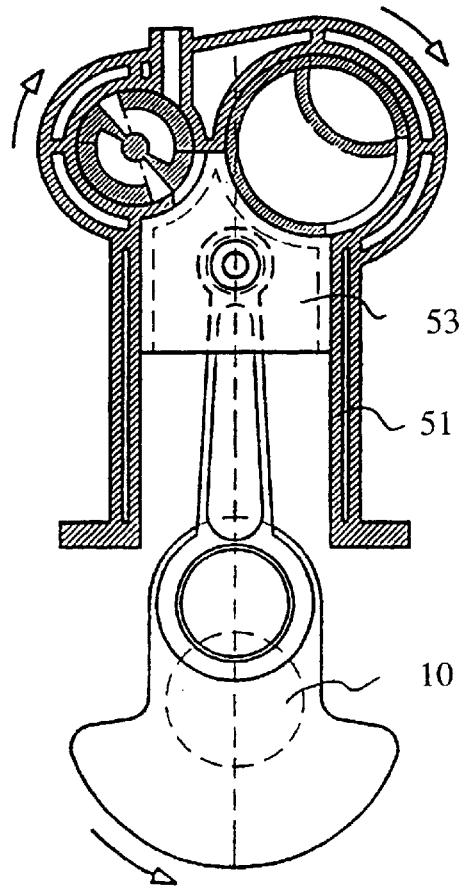
Figure 9D:
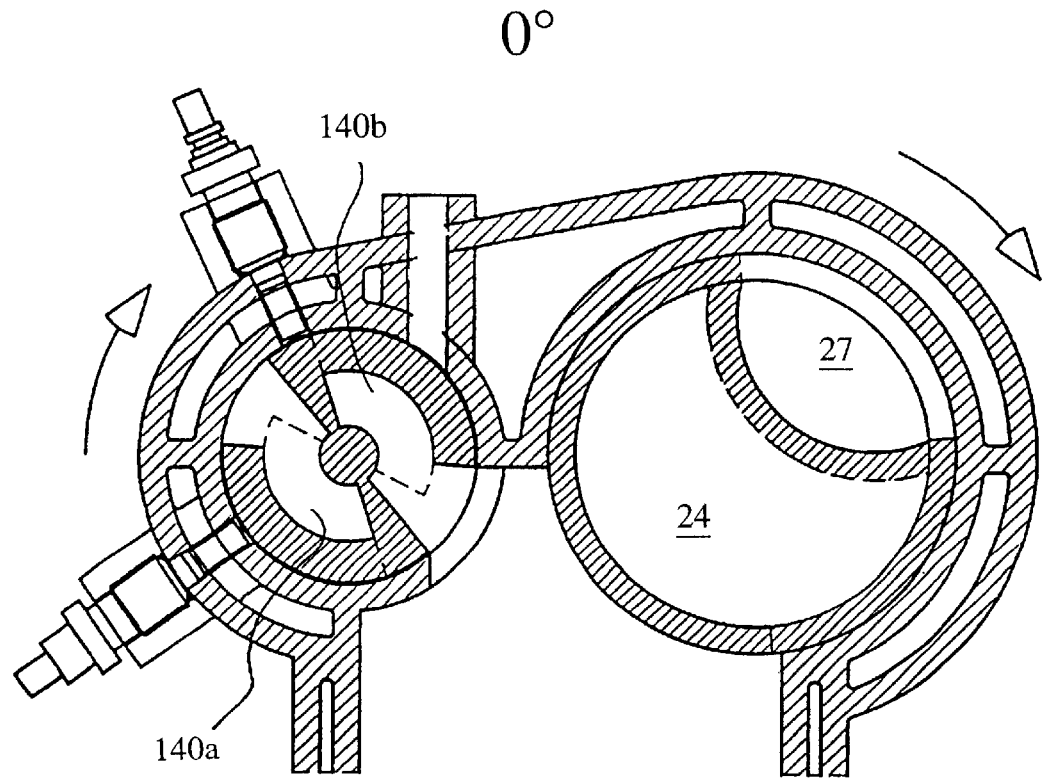
Figure 9C:
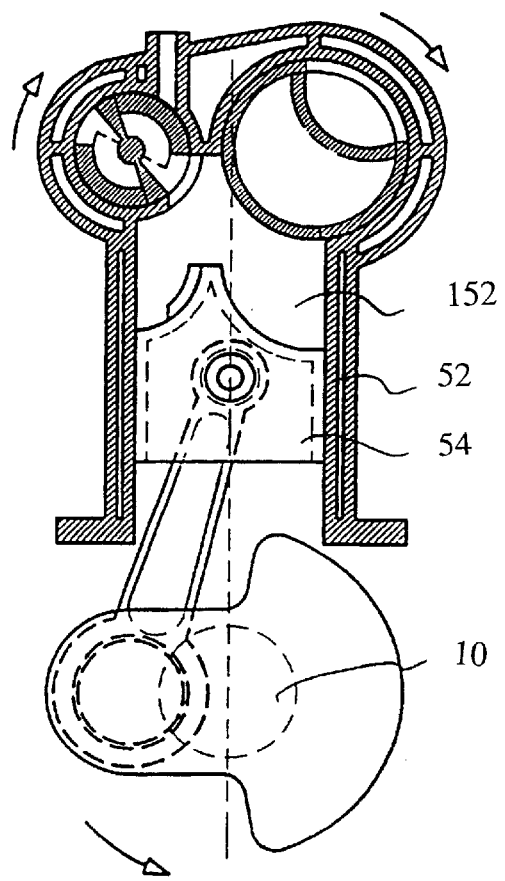
Figure 10B:
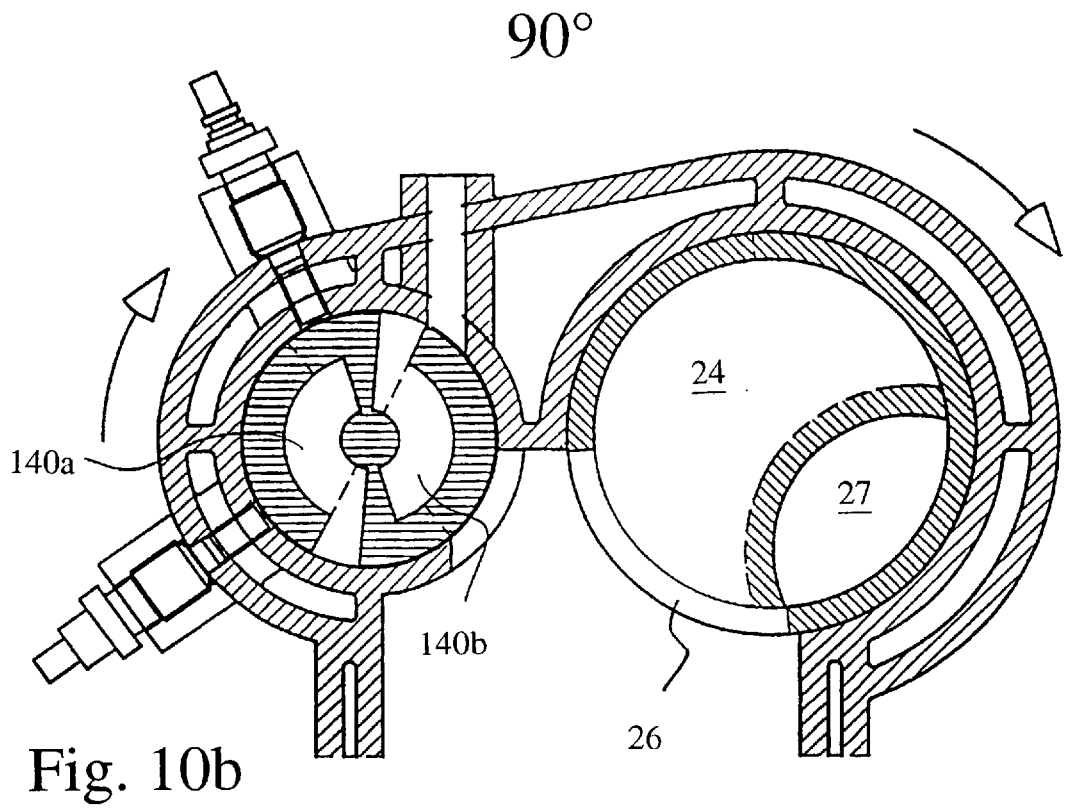
FIGS. 10a–d are sectional views depicting the first and second cylinders in the 90° position.
Figure 10A:
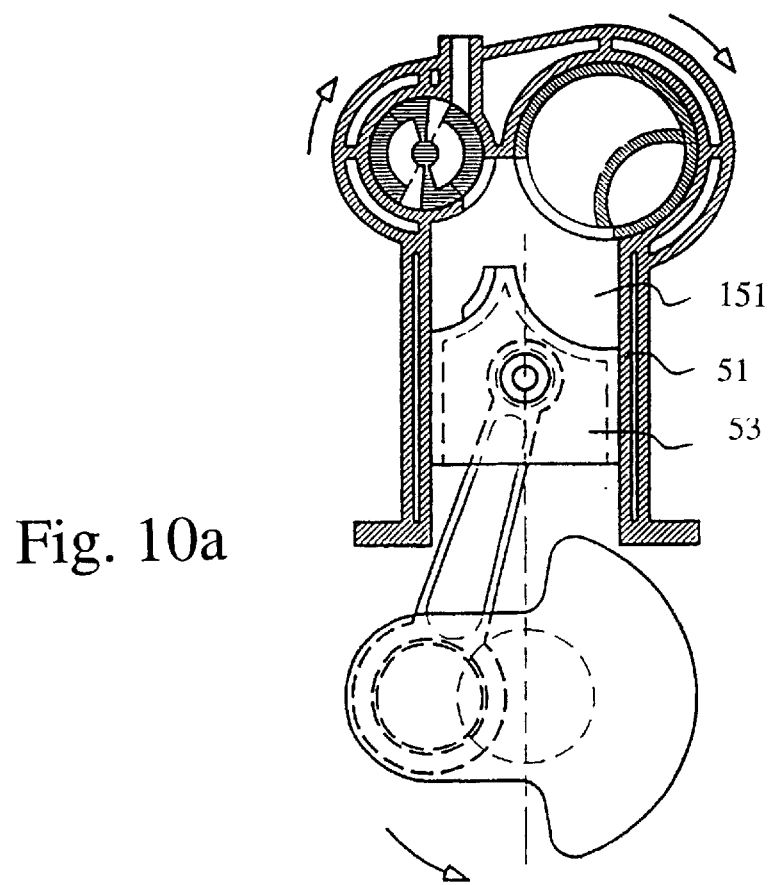
Figure 10D:
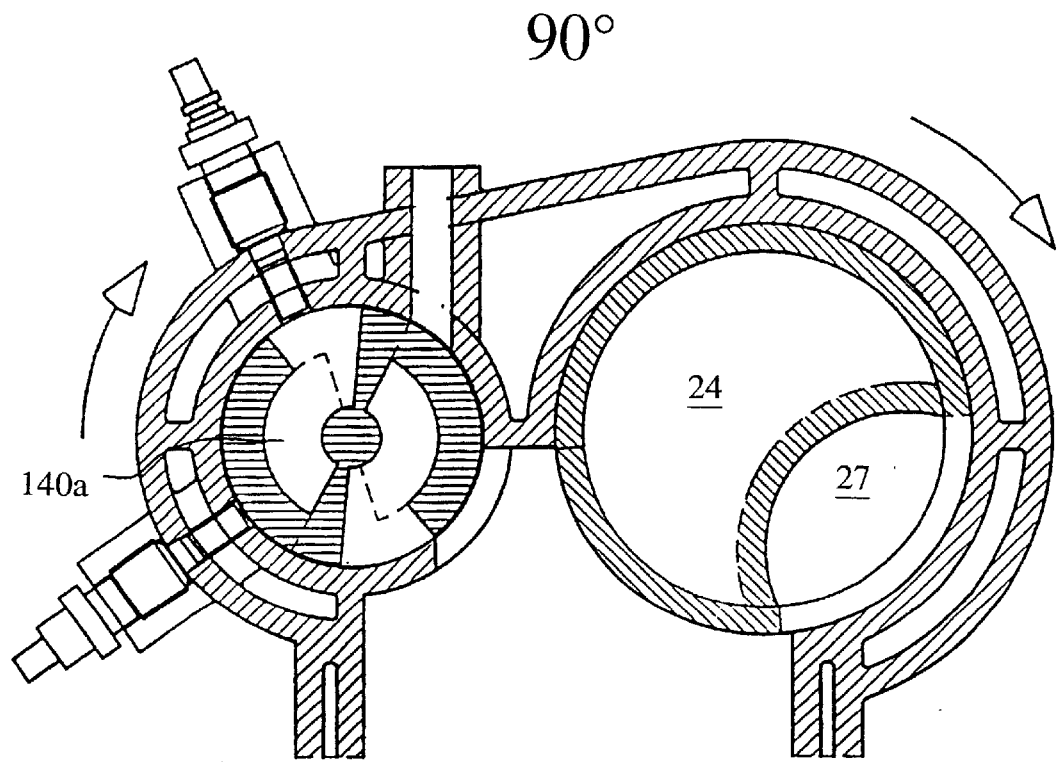
Figure 10C:
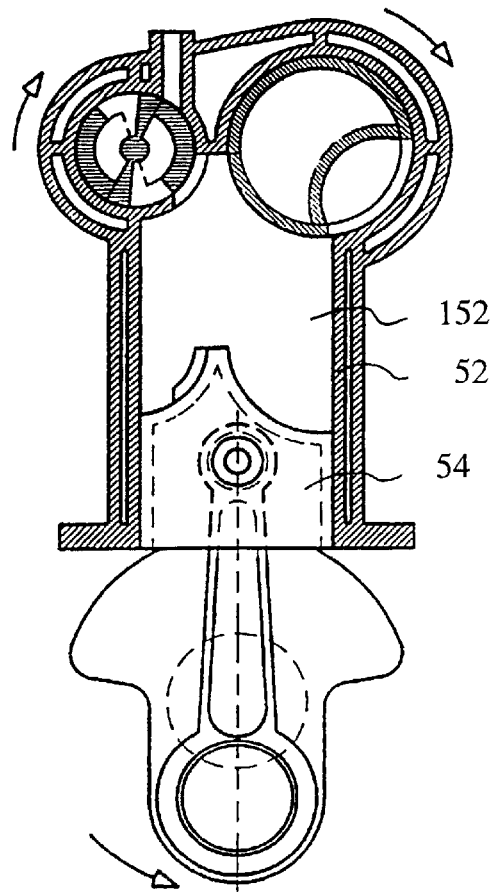

Whereas inlet and outlet valves, which were controlled in an appropriate manner by means of the cam shafts 171, 172, were used in the first embodiment, such types of valves and cam shafts can be dispensed with in this next embodiment. In the second embodiment depicted in FIGS. 9–14, a suction rotary valve 29, which comprises a suction channel 24 and an exhaust gas channel 27 through respective ones of which the fresh gas or the exhaust gas is advanced in the axial direction of the suction rotary valve during the rotation thereof, is used in addition to a combustion rotary valve 39. The combustion rotary valve 39 and the suction rotary valve 29 rotate in opposite directions of rotation relative to the crank shaft 10. Here, the combustion rotary valve 39 is subjected to a step down ratio of 2:1 relative to the rotational speed of the crank shaft, whereas the suction rotary valve 29 rotates at the same speed as the crank shaft 10, as is apparent from FIGS. 9–12. In FIGS. 9a, b wherein the crank shaft is in the 0° position, the compression cylinder 51 and the compression piston 53, depicted in the Figures, are at the starting point of the suction stroke wherein fresh gas flows through the suction channel 24 of the suction rotary valve 29 into the cylinder volume 151, the flow being in the axial direction of the suction rotary valve and extending through a suction opening 26 therein. The rearwardly located working cylinder and the working piston 54, depicted in FIGS. 9c and d, are in the working stroke phase wherein the burnt mixture of fuel and air is forced out of the second combustion chamber 140b into the second cylinder volume 152 where it presses the working piston in the downward direction.

The 90° position of the crank shaft and of the suction rotary valve at the corresponding 45° position of the combustion shaft 39 is depicted in FIG. 10. The compression cylinder 51 is still in the suction stroke phase but the suction opening 26 is now fully open relative to the cylinder volume 151 of the compression cylinder. At the same time, the working cylinder 52 is approaching the end of the working stroke (bottom dead center position). Thereafter, the residual exhaust gases are expelled from the chamber 140b into the exhaust gas outlet channel 57 as shown in FIG. 10b. Fuel is already being injected into the chamber 140a by the injection nozzle in FIG. 10b.

Figure 11D:
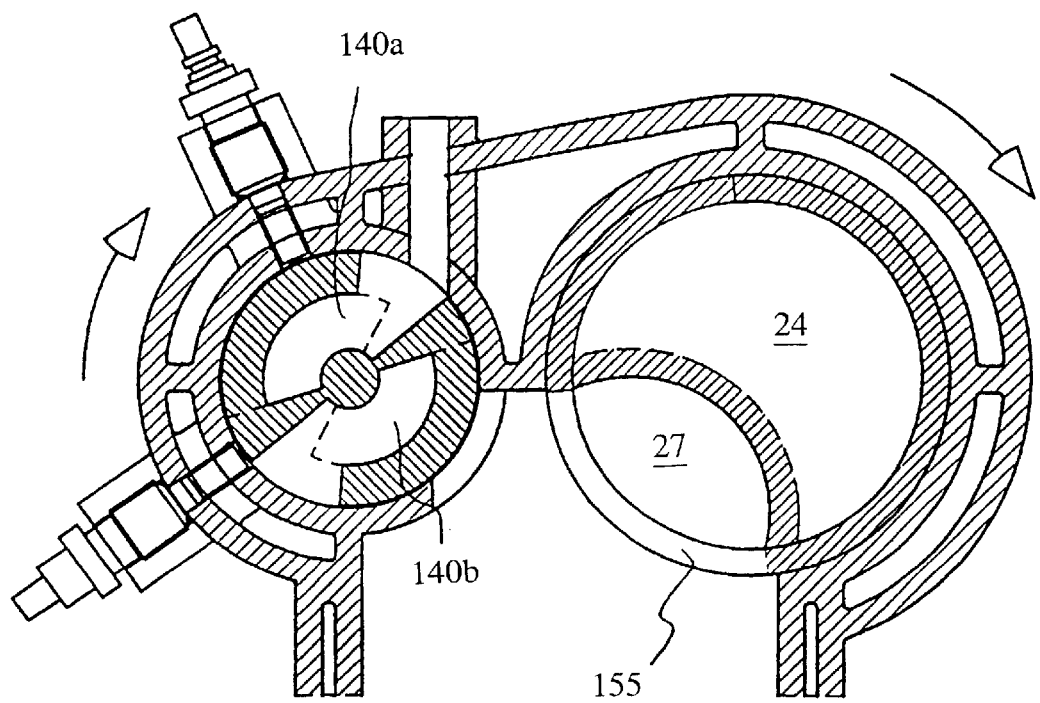
Figure 11C:
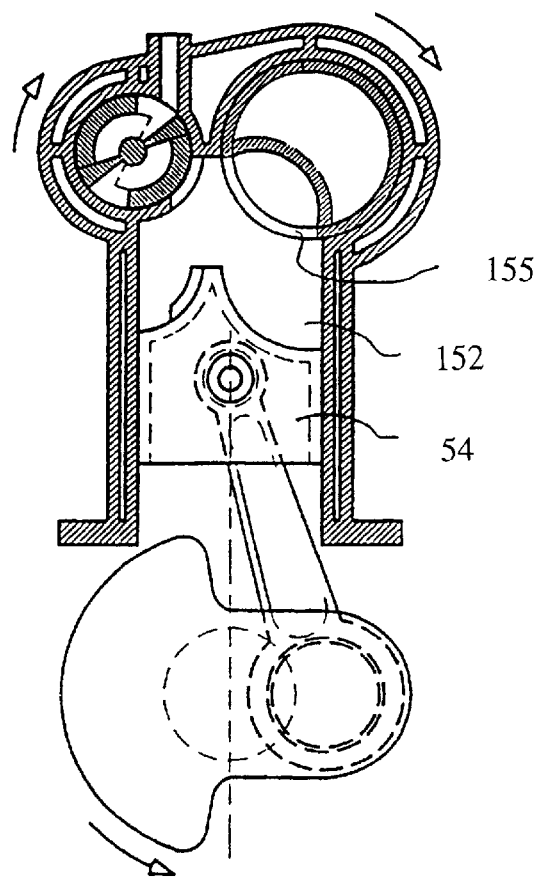
Figure 12B:
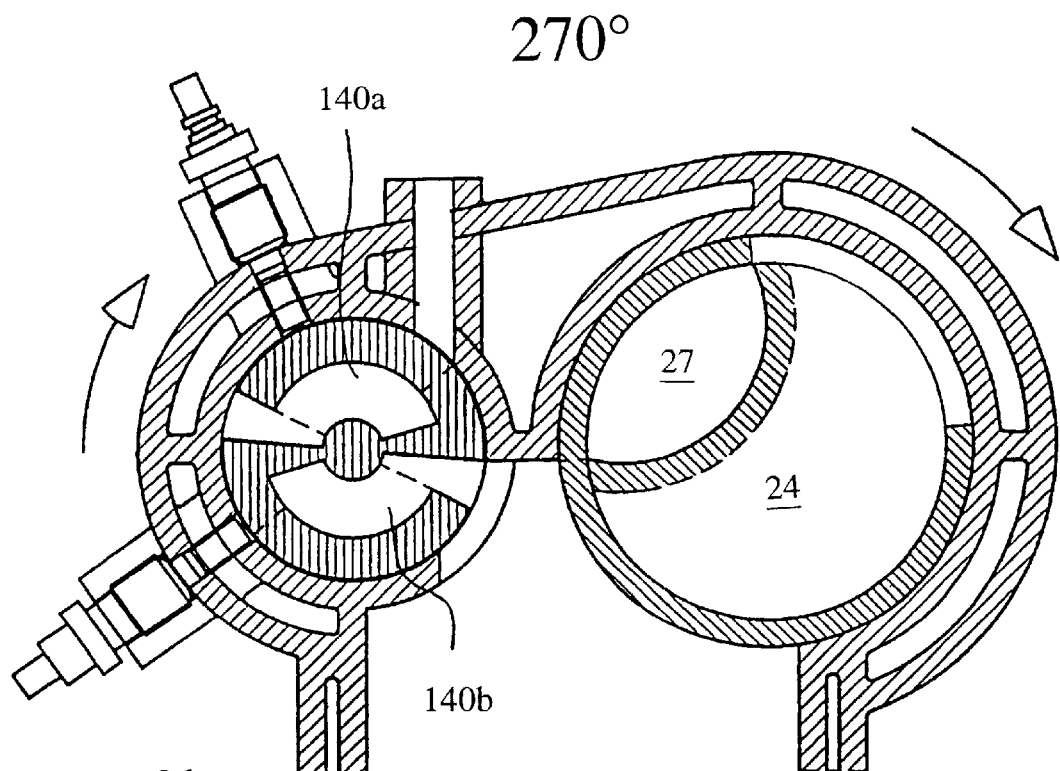
FIGS. 12a–d are sectional views depicting the first and second cylinders in the 270° position.
Figure 12A:
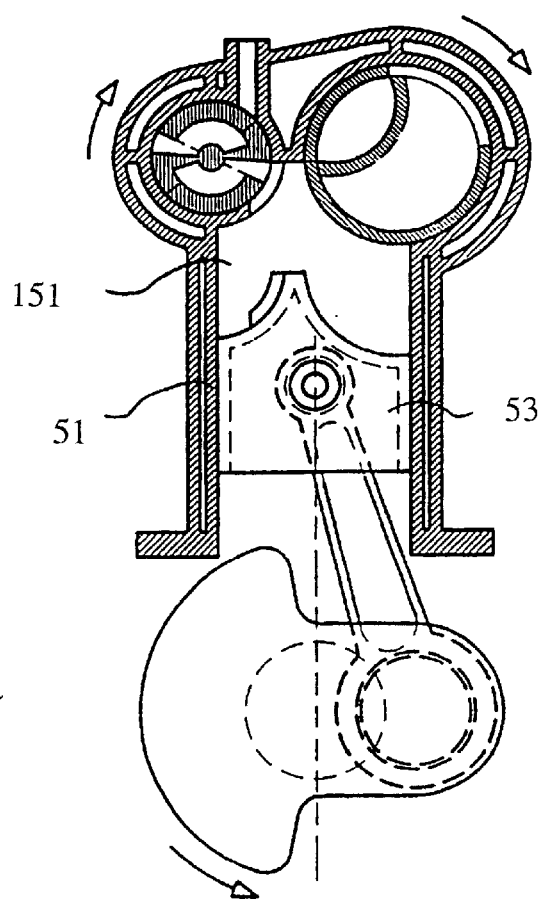
Figure 12D:
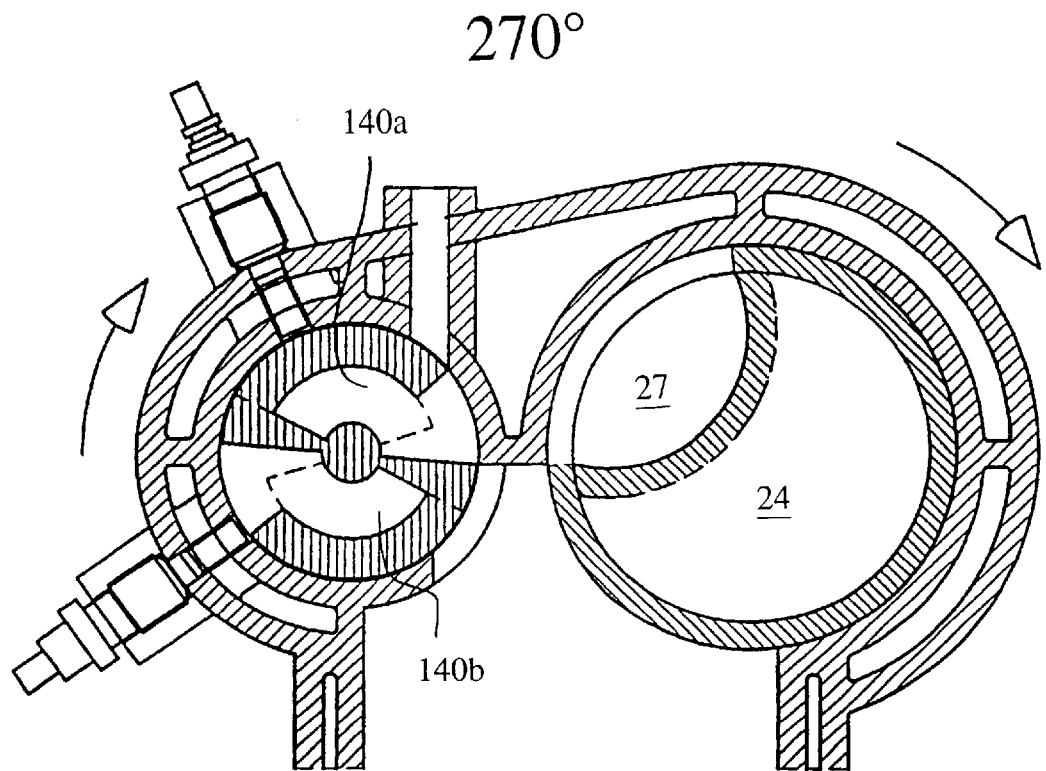
Figure 12C:
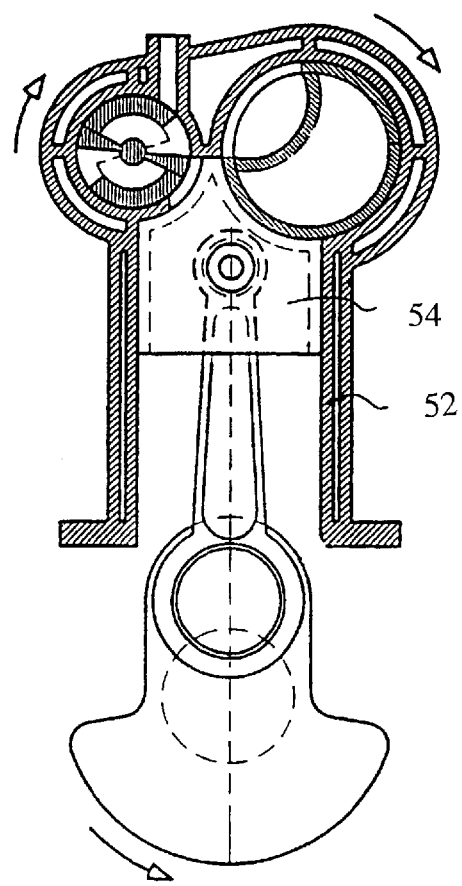

The 180° position of the crank shaft and the suction rotary valve and also the 90° position of the combustion shaft 39 are depicted in FIG. 11. Whilst the compression cylinder is now approaching the end of the suction stroke phase and the suction opening 26 has just closed or is in the process of closing, the working cylinder has already commenced the exhaust stroke phase wherein the exhaust gases are forced through an exhaust channel opening 155 into the exhaust channel 27 of the suction rotary valve 29 by the upwardly moving piston 54, these gases being transported away in the axial direction of the suction rotary valve 29.

In FIG. 12 (the 270° position), the compression cylinder is in the compression stroke phase wherein the cylinder volume thereof is closed relative to the suction rotary valve. The combustion chamber 140b is open relative to the first cylinder volume 151 so that it can receive fresh gas from the first cylinder volume 151. The working cylinder is approaching the end (OT) of the exhaust stroke phase and is at the start of the working stroke phase at the top dead center position. The opening into the exhaust channel 27 is now closed and a combustion chamber with the compressed, fuel-charged and ignited gas of the combustion chamber 140a is open relative to the cylinder volume of the working cylinder. The subsequent 360° position corresponds to the 0° position shown in FIG. 9, although the combustion chambers are reversed.

Figure 13:
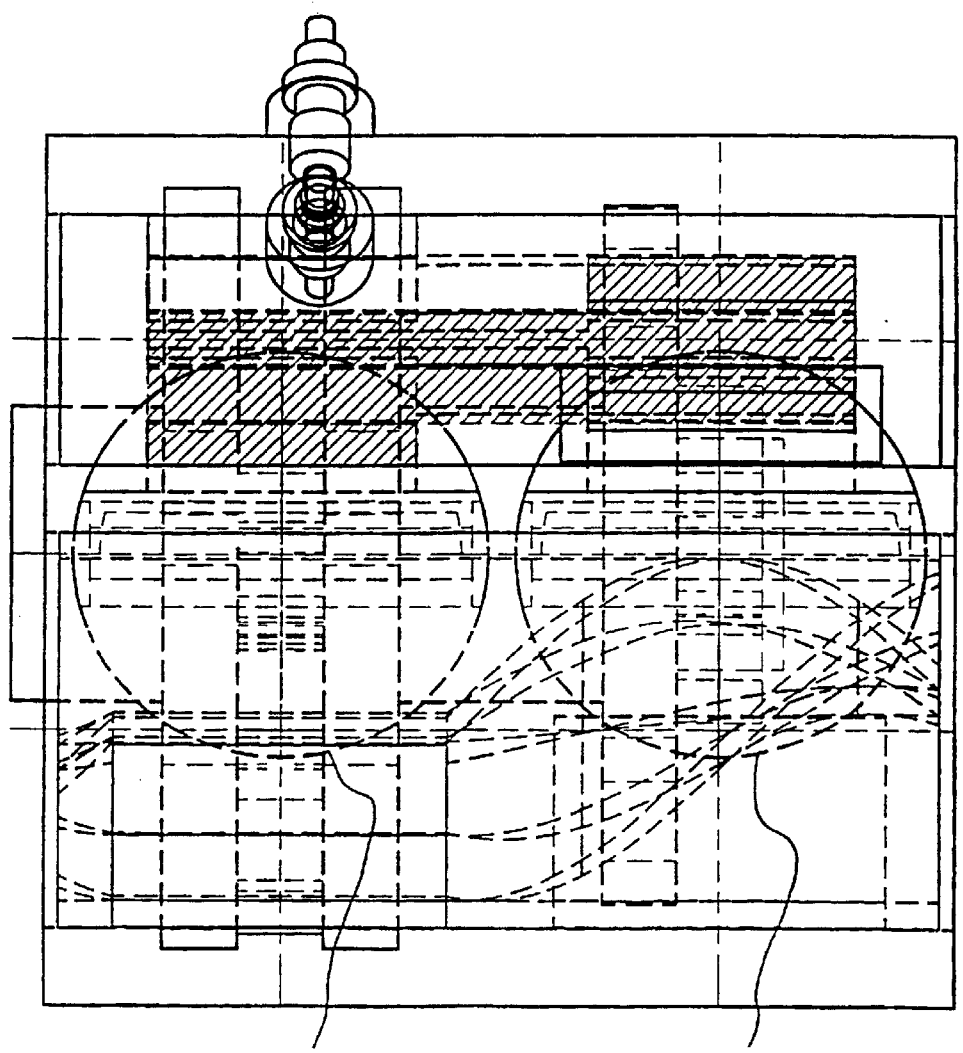
FIG. 13 is a top view of the internal combustion engine in the second embodiment.
Figure 15B:
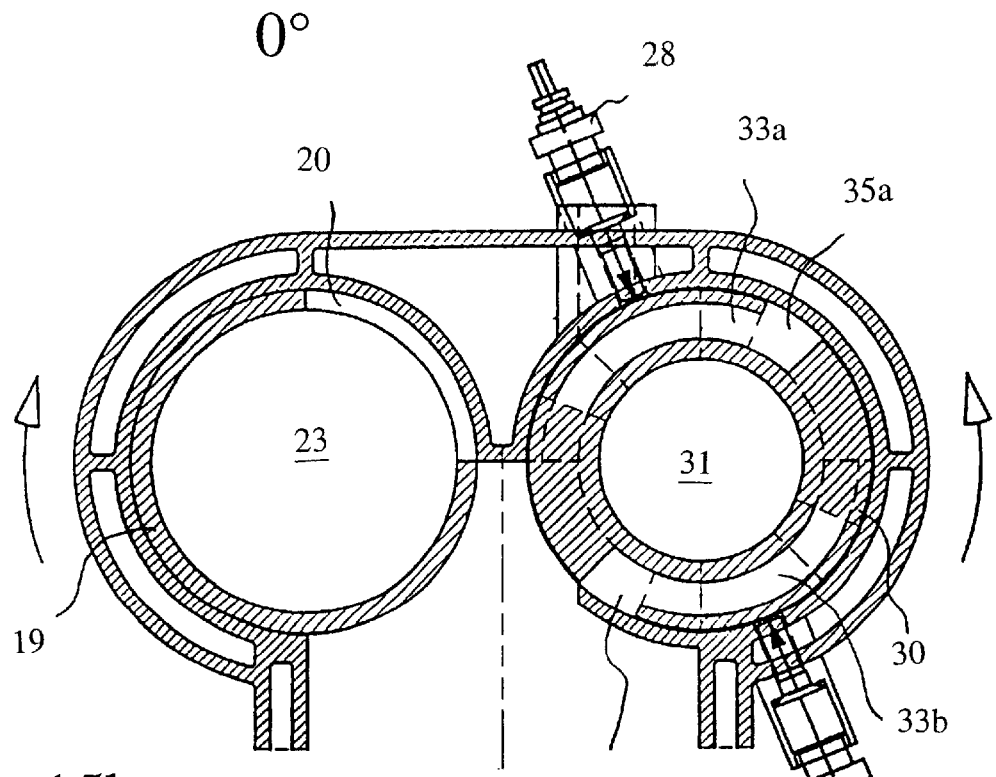
FIGS. 15a–d through 18a–d are respective sectional views of the first and second cylinders of an internal combustion engine in a third embodiment depicting the crank shaft in the 0°, 90° 180°, 270° positions.
Figure 15A:
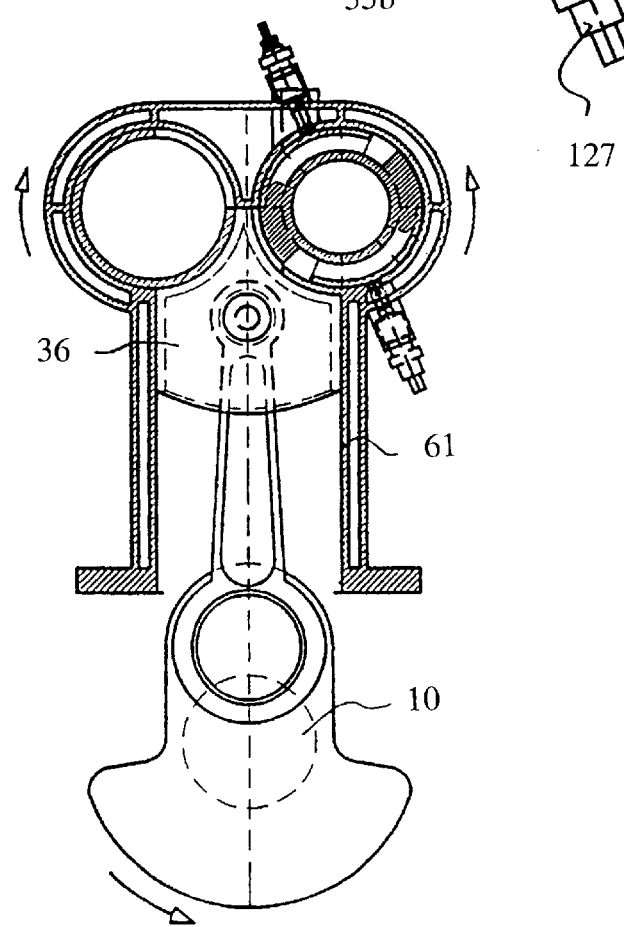
Figure 15D:
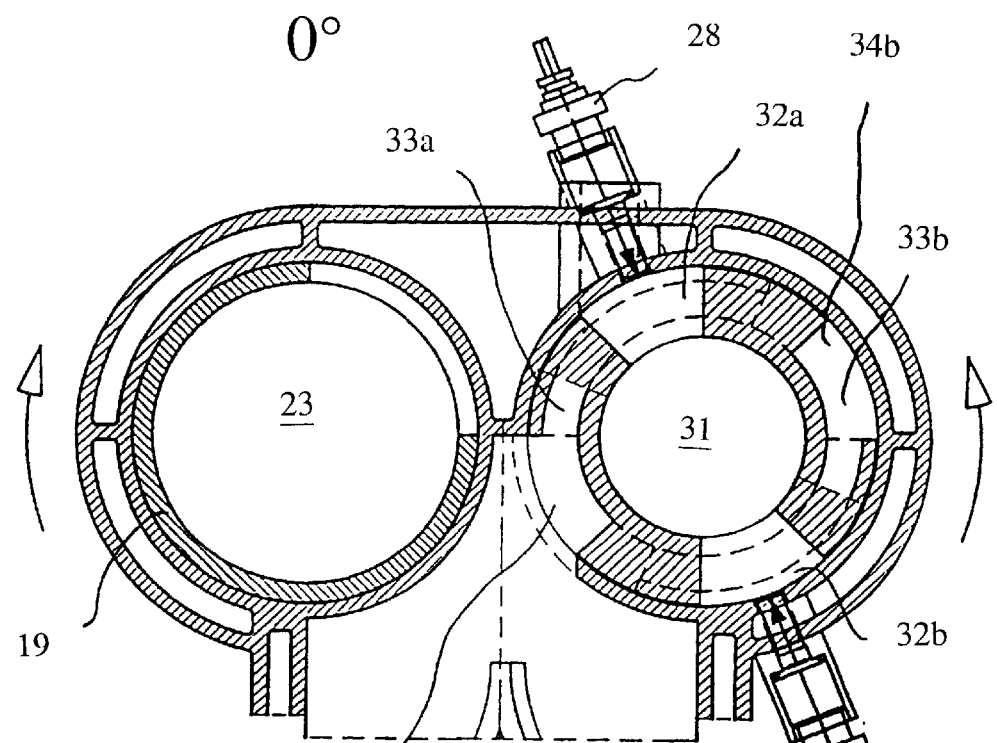
Figure 15C:
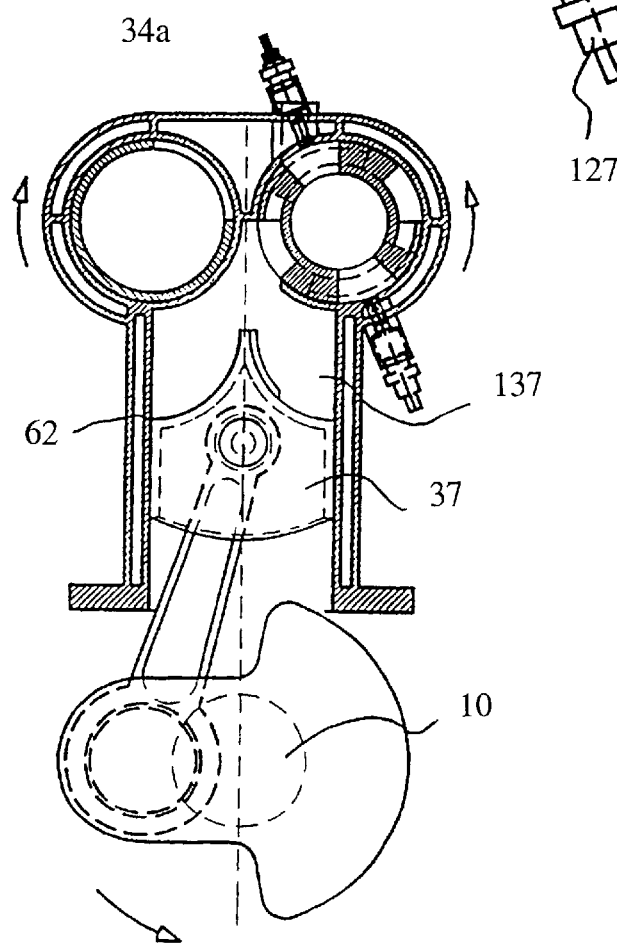

FIGS. 13 and 14 shown a top view of the engine and an illustration of the combustion chambers 140a and b.

FIGS. 15 to 20 show a third embodiment in which valves may likewise be dispensed with by using a suction rotary valve 19 having a suction channel 23 in the interior thereof whereby fresh air can be supplied to the cylinder volume of the compression cylinder through a suction opening 20. In this case too, the suction rotary valve 19 rotates in the opposite sense to that of the crank shaft but at the same speed thereas. The combustion shaft 30 rotates in the same sense as the crank shaft using a step down ratio of 2:1. In this third embodiment, an exhaust channel 31 is arranged in the interior of the combustion shaft 30, preferably concentrically in the center thereof in accordance with FIG. 15. The combustion chambers 33a, 33b are arranged concentrically around the exhaust channel 31 in a corresponding manner. The piston positions of the compression piston and the working piston are displaced by 90° as was the case in the second embodiment. The construction of the combustion chambers is also apparent from the perspective view of FIG. 20 wherein only the combustion chambers 33a, 33b are shown, in addition to the radial sectional view of FIG. 15 for example. The intake of compressed fresh air is effected during the compression stroke through respective compression openings 35a, 35b, which are opened relative to the cylinder volume of the compression cylinder. Fuel is supplied to the compressed gas in the combustion chambers through an injection nozzle 127 that is used for both combustion chambers and the fuel/air mixture is ignited by a spark plug 28. Shortly after the ignition process or even during the ignition process, the combustion chamber is opened through the expansion openings 34a, 34b with respect to the cylinder volume of the working cylinder, which is at the start of the working stroke. The exhaust gases are expelled through the outlet 32a and 32b and the exhaust channel 31 during the exhaust stroke.

Accordingly, in the 0° position of the crank shaft and the suction rotary valve 19 and the 0° position of the combustion shaft shown in FIG. 15, the compression cylinder 61 is at the top dead center position and, following the compression stroke that has just ended, a suction stroke now begins in the combustion chamber 35b whereby the piston 36 in the compression cylinder 61 is moved downwardly and thus releases the cylinder volume 136; at the same time, the inlet opening 20 of the suction rotary valve 19 is rotated towards the first cylinder volume so that the suction channel 23 is opened relative to the cylinder volume. The working piston 37 in the working cylinder 52 depicted in FIGS. 15c and 15d is now performing a working stroke wherein the first combustion chamber 33a is connected through the expansion opening 34a to the cylinder volume of the working cylinder. The expansion opening 34a is fully opened in this position whilst the working piston is in its mid-stroke position.

Figure 16B:
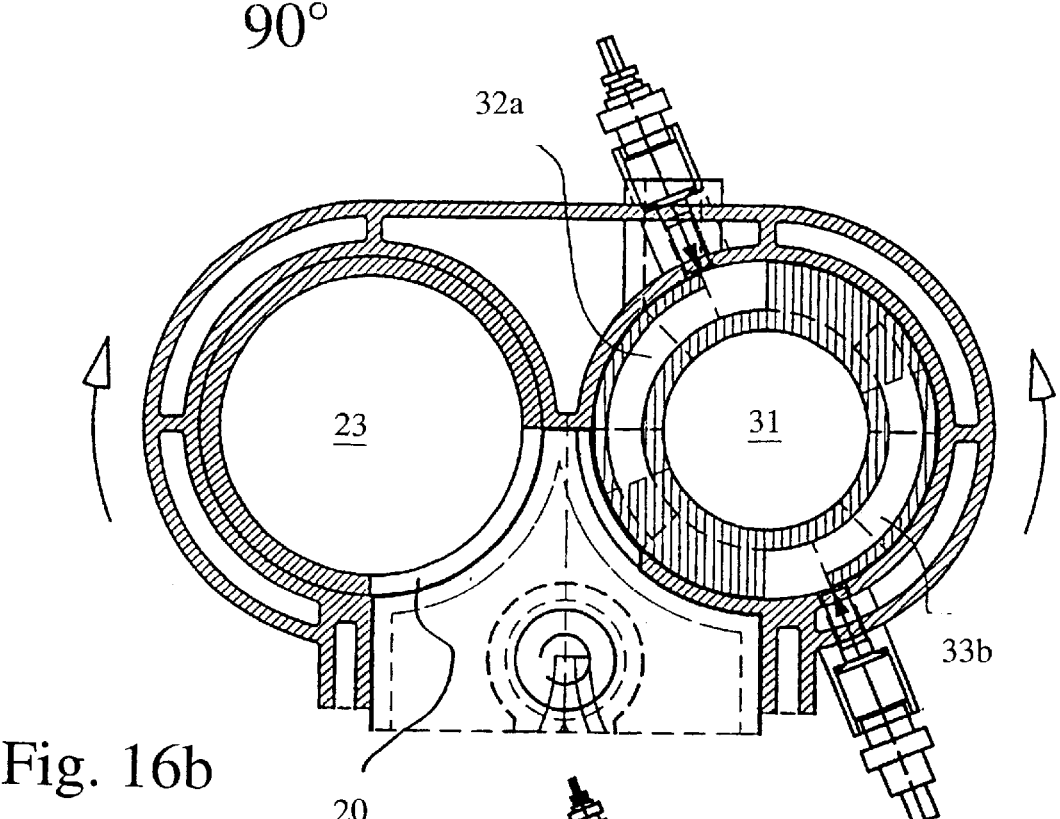
Figure 16A:
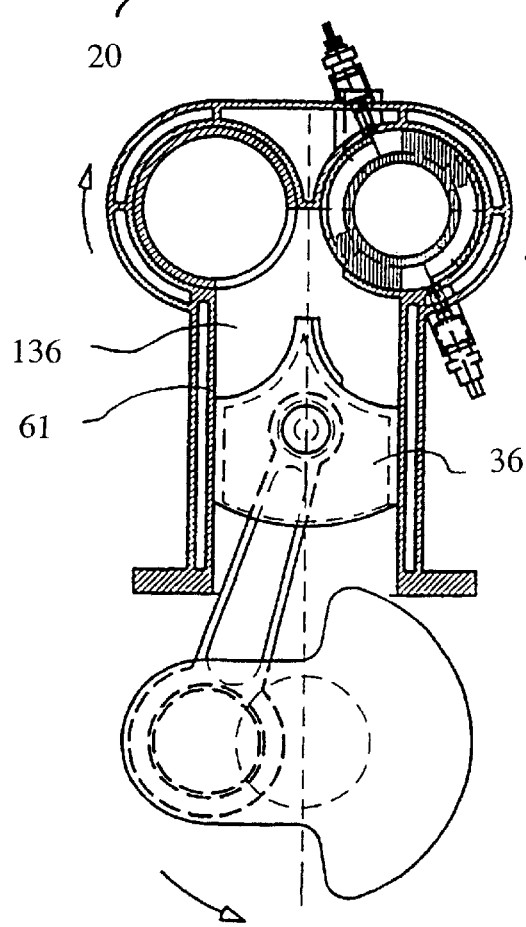
Figure 17B:
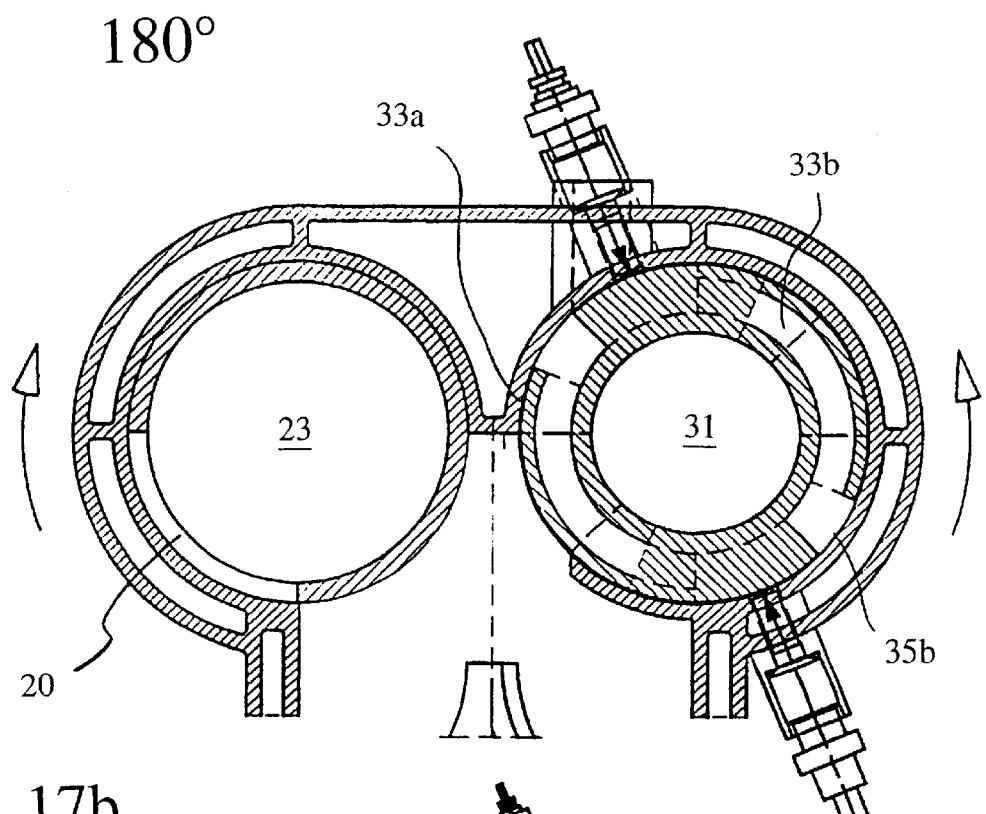
Figure 17A:
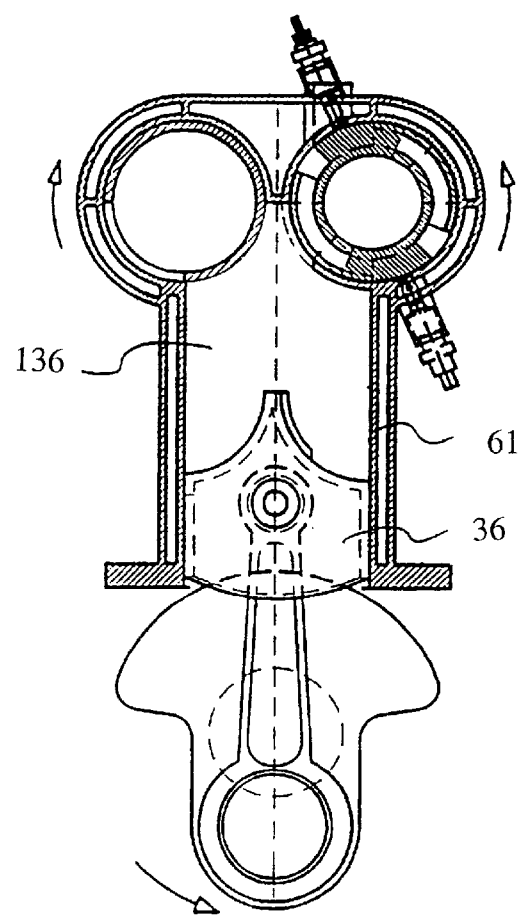
Figure 17D:
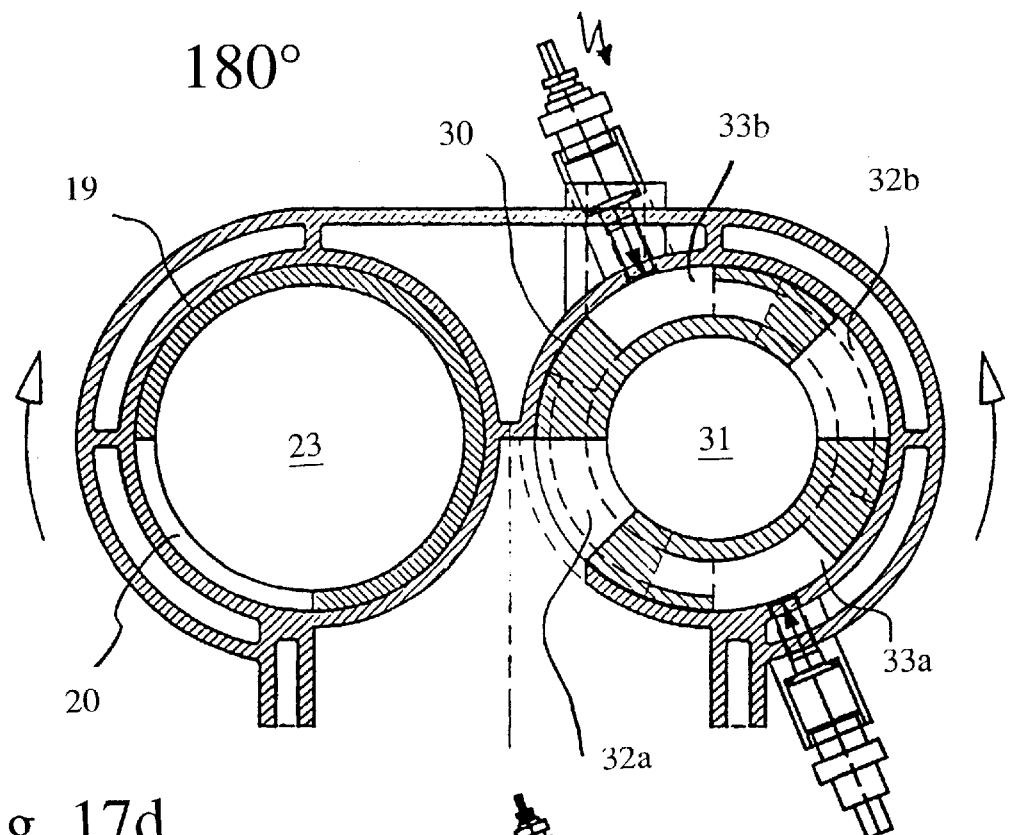
Figure 17C:
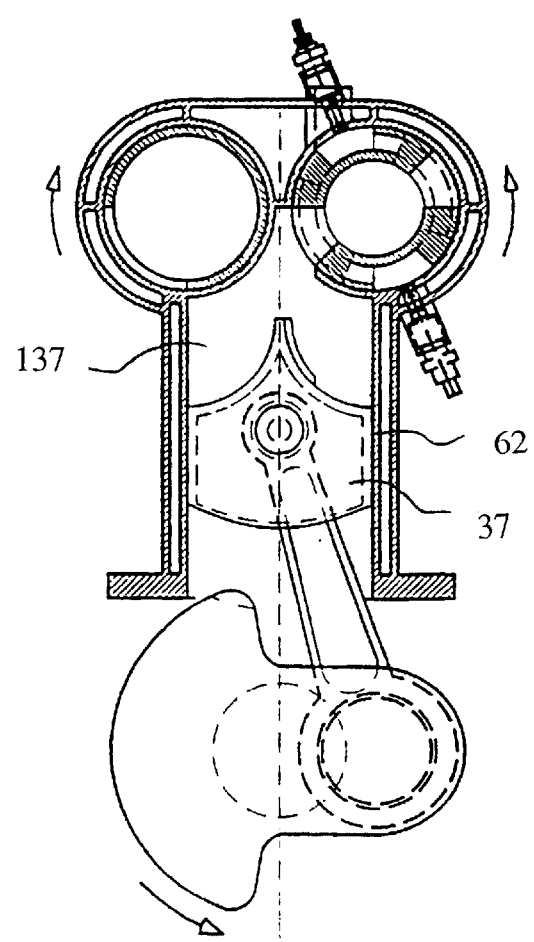
Figure 18B:
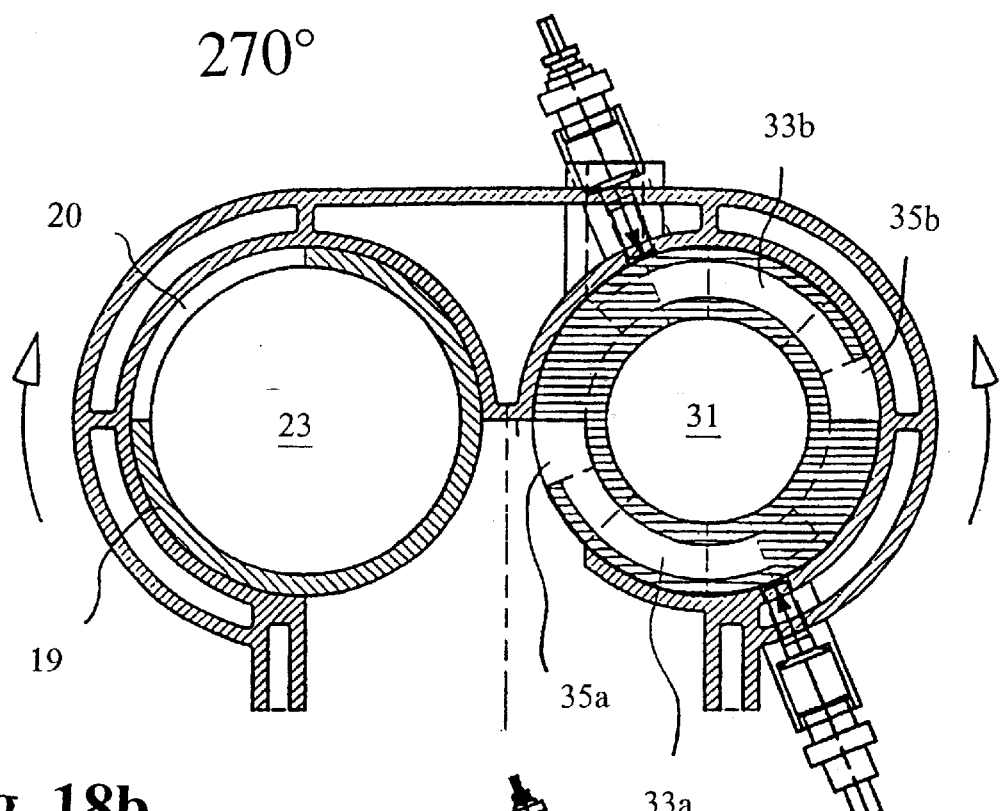
Figure 18A:
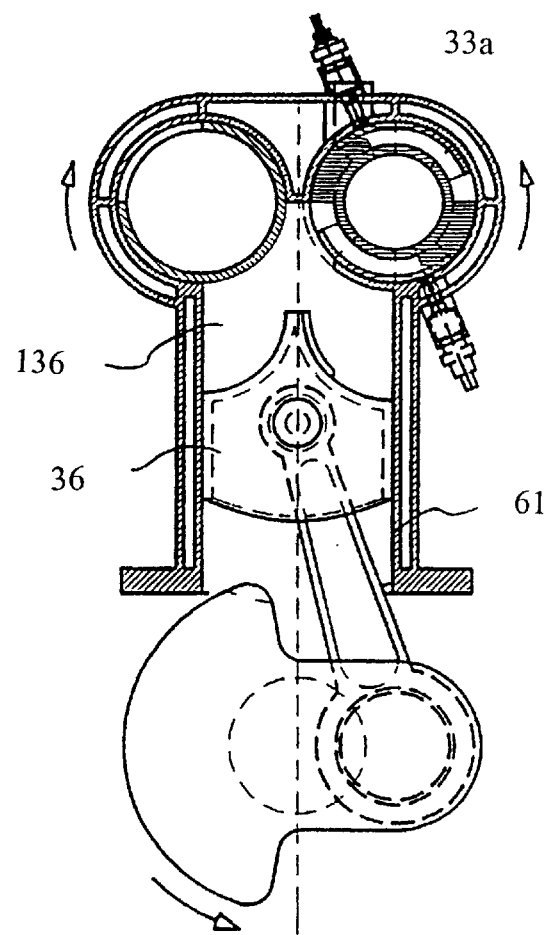
Figure 18D:
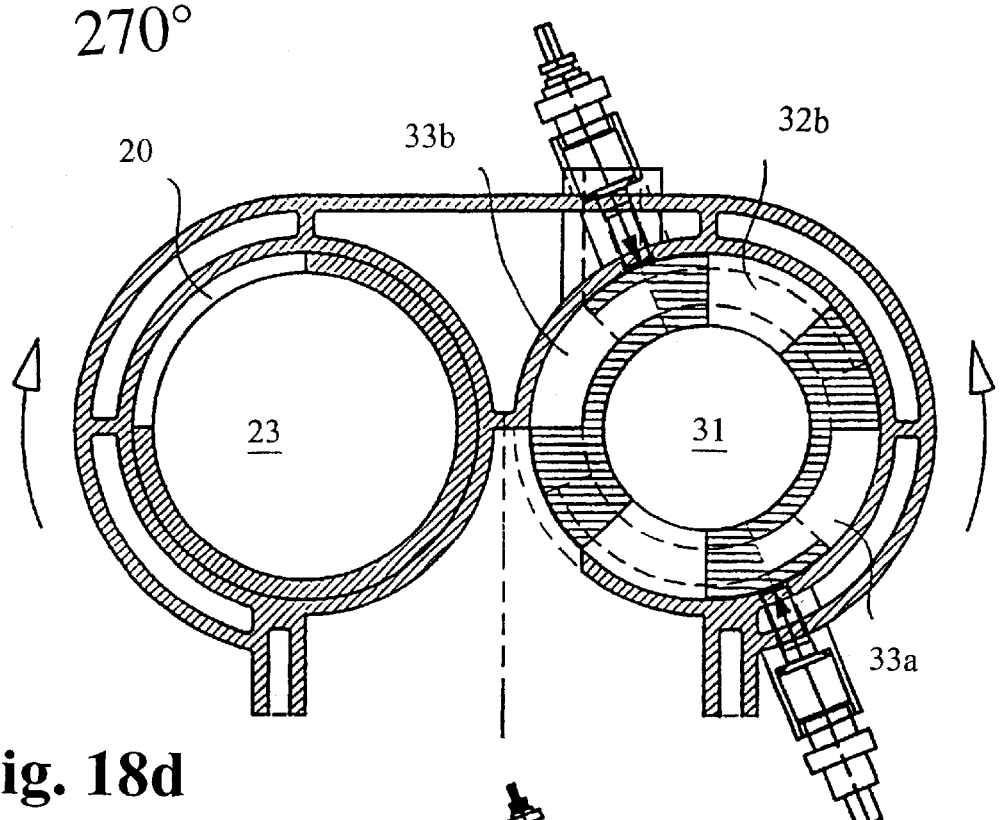
Figure 18C:
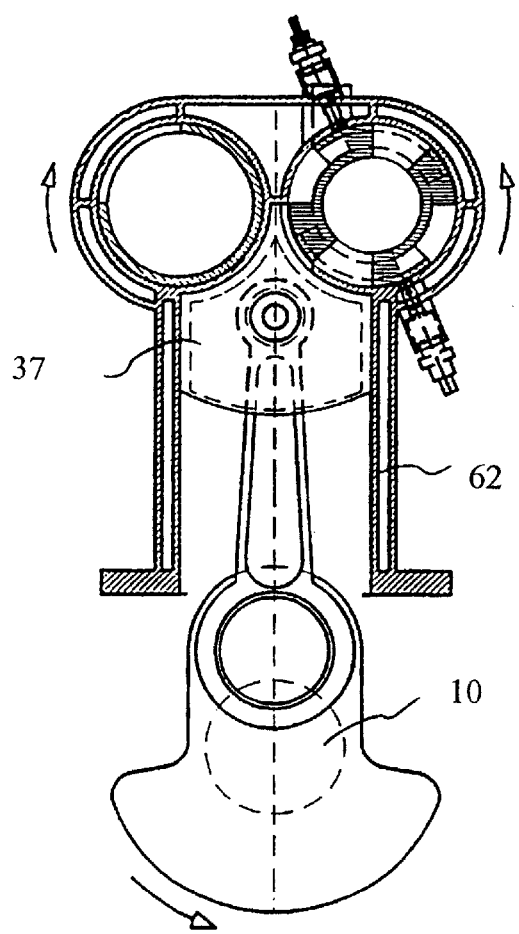

In the 90° position of the crank shaft and the suction rotary valve and the corresponding 45° position of the combustion shaft shown in FIG. 16, the compression cylinder 61 is in its mid-position i.e. the mid-stroke position of the working stroke. The suction opening 20 is fully open relative to the cylinder volume of the compression cylinder 61. The working piston is in the bottom dead center position at the end of the working stroke whereby the combustion chambers are closed relative to the cylinder volume of the working cylinder. Thereafter, the residual exhaust gases are transferred from the chamber 33a to an exhaust channel in FIG. 16b.

In the 180° position shown in FIG. 17, the compression cylinder 61 is in the bottom dead center position at the start of the compression process wherein the suction opening 20 has just been closed. The working cylinder is now in the exhaust stroke phase wherein the exhaust gas is transported to the exhaust channel 31 through the outlet opening 32a in the combustion shaft 30. Simultaneously, in FIG. 17d, an ignition process is initiated in the chamber 33b by the spark plug 28, and fuel is injected into the chamber 33a by the injection nozzle 127.

FIG. 18 shows the 270° position of the crank shaft and the suction rotary valve and also the corresponding 135° position of the combustion shaft. The compression cylinder is in its compression phase wherein the compression opening 35a in the second compression chamber 33a is fully open relative to the cylinder volume of the compression cylinder so that compressed fresh gas can flow into the first combustion chamber. The working piston is in the top dead center position at the end of the exhaust stroke and, correspondingly, at the start of the subsequent working stroke wherein the outlet opening in the combustion shaft for the reception of the exhaust gases is closed; the expansion opening in the combustion chamber 33b is now opened relative to the working volume so that the ignited fuel-gas mixture can be transferred to the cylinder volume of the working cylinder. The cylinder volume of the working cylinder is at least virtually completely closed in this position. Thereafter, a 360° position is adopted, which corresponds to the 0° position shown in FIG. 15, but wherein the combustion chambers are reversed relative thereto. The course of action in the combustion chambers 33a, 33b is depicted in FIG. 20. The sectional view along the line A', A in FIG. 20c, which is shown in FIG. 20b, corresponds to a section through the first cylinder, whilst the sectional view along the line B', B shown in FIG. 20a corresponds to a section through the second cylinder.

Also, in this embodiment, the shape of the piston is matched to the shape of the cylinder so that the cylinder volume disappears completely or to an overwhelming extent at the top dead center position. To this end, the piston is advantageously provided with recesses as depicted in the Figures, the recesses corresponding to the corresponding sections of the cylindrical combustion shaft 30 and the cylindrical suction rotary valve 19.

FIGS. 21 to 26 show a fourth embodiment of the invention. Here, in addition to a combustion shaft, a suction rotary valve is likewise used once more. Advantageously, this engine may be used in the form of a diesel engine.

Figure 21D:
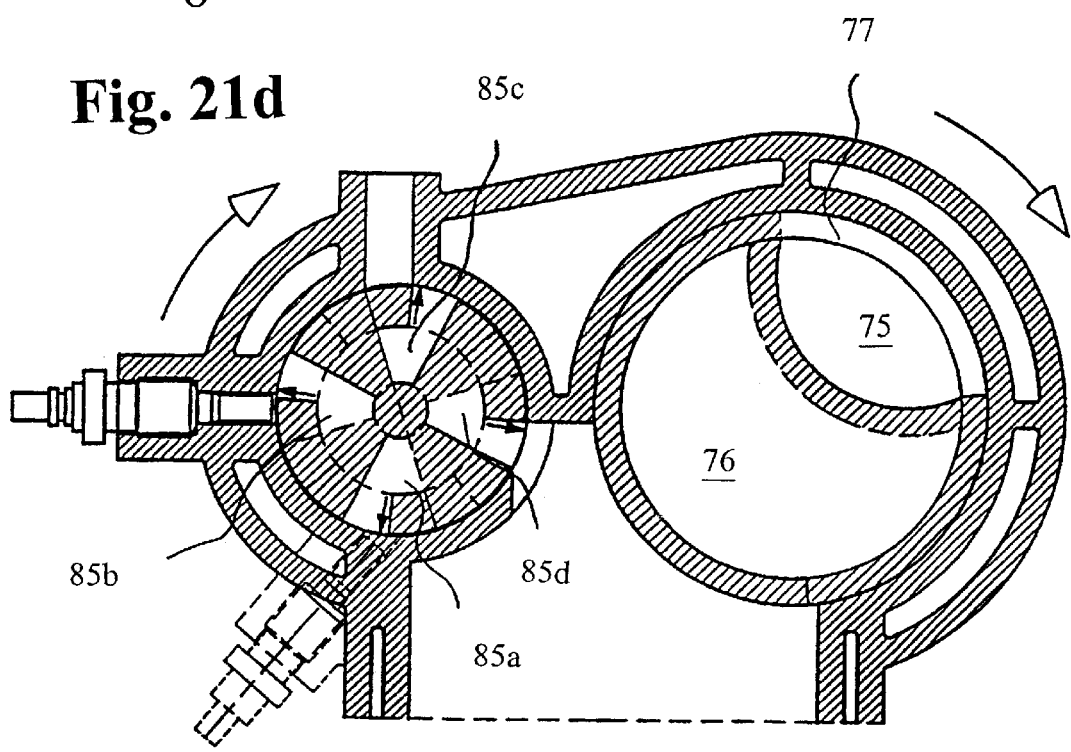
FIGS. 21 a–d through 24a–d are sectional views of the first and second cylinders of an internal combustion engine in a fourth embodiment of the invention.
Figure 21C:
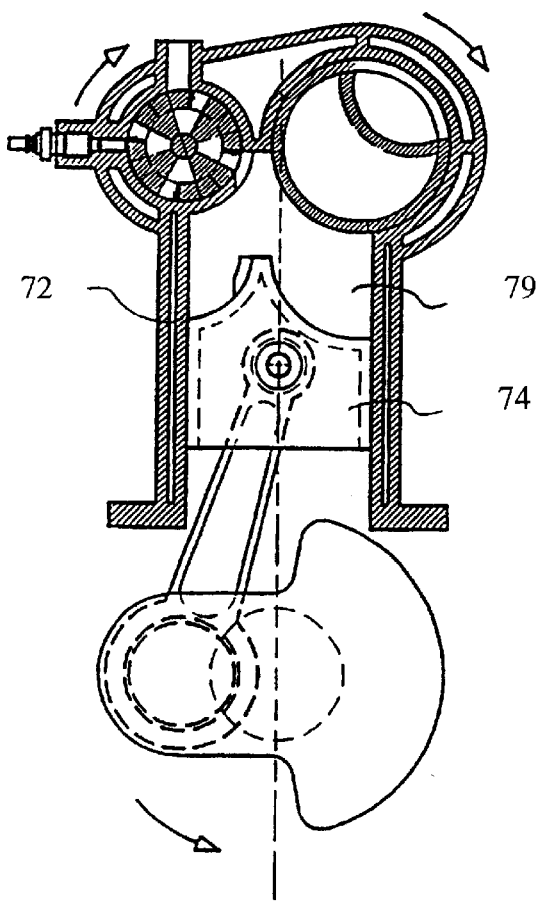
Figure 22B:
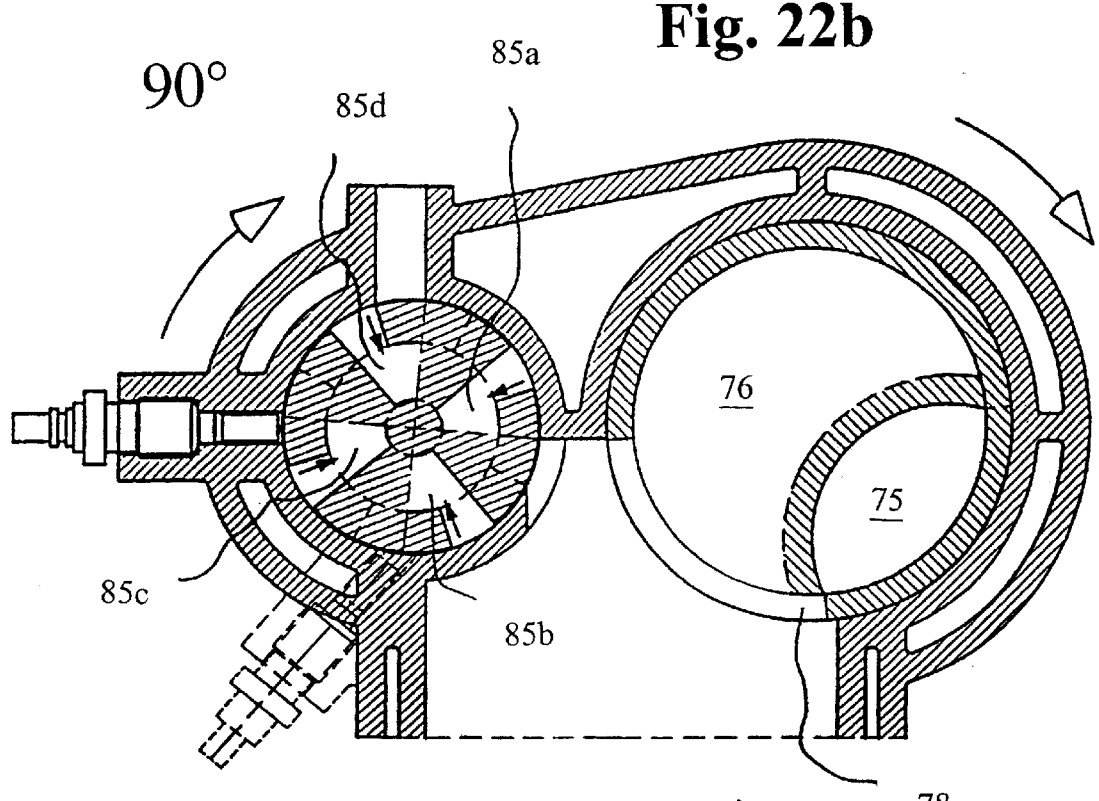
Figure 22A:
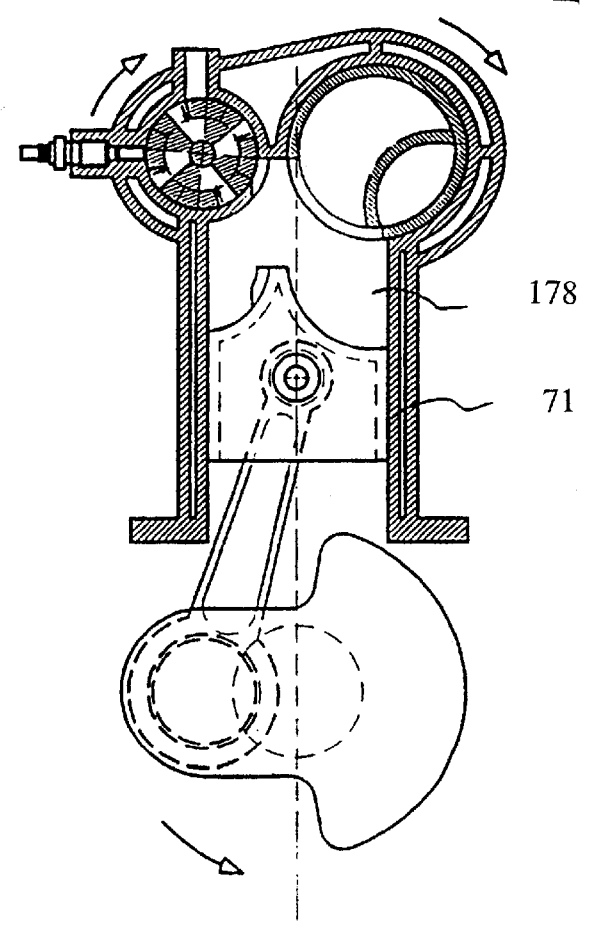
Figure 22D:
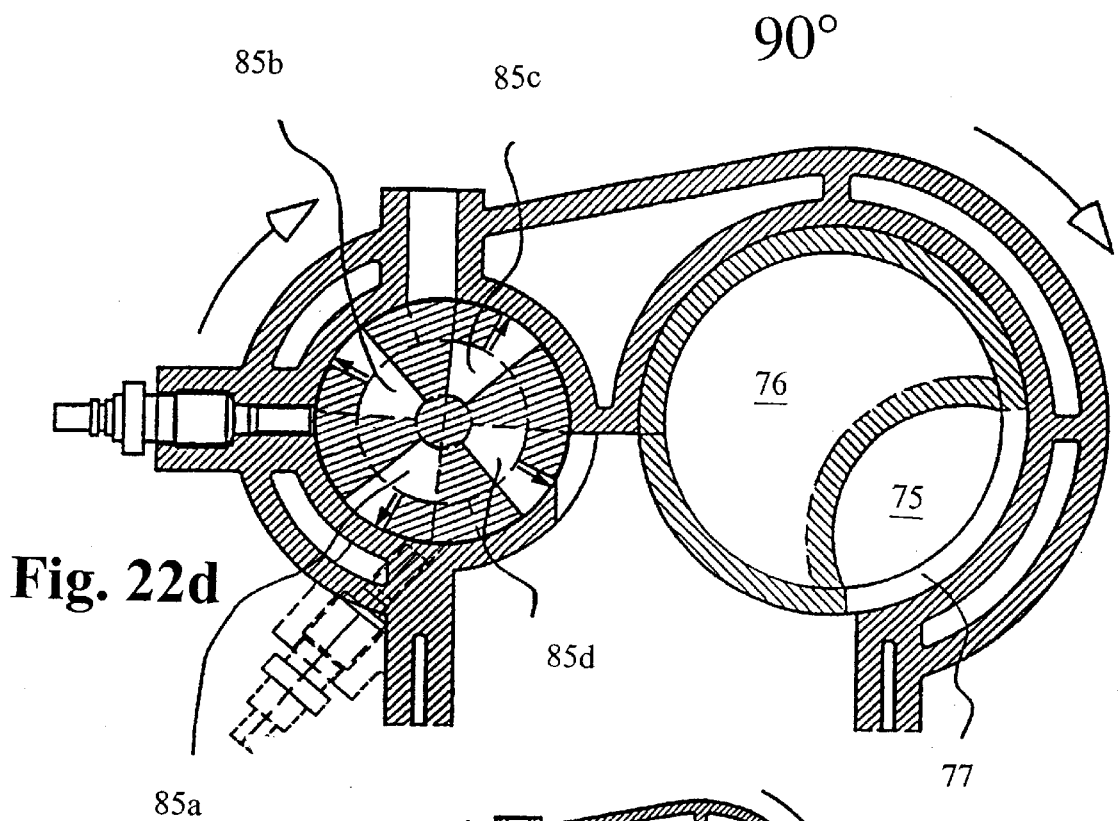
Figure 22C:
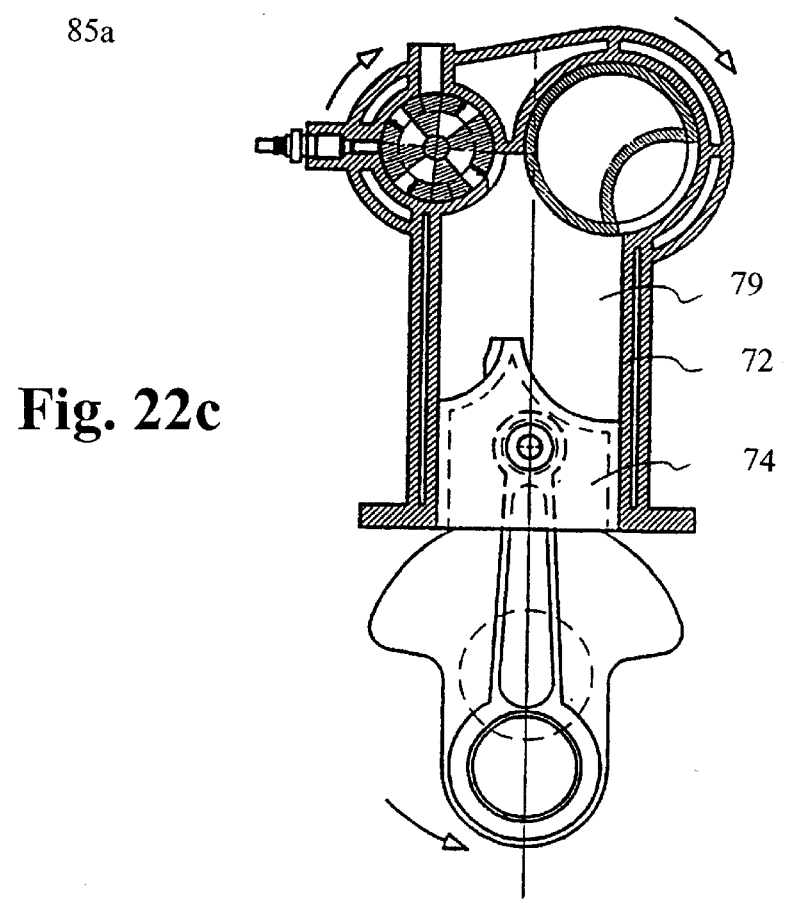

This fourth embodiment is similar to the construction of the second embodiment shown in FIGS. 9 to 13. However, the combustion shaft 162 comprises four combustion chambers 85*a, b, c, d* which are arranged in 90° segments of the cylindrical combustion shaft 162. Accordingly, the combustion shaft rotates at a quarter of the rotational speed of the crank shaft 10 and, advantageously, in the opposite rotational sense thereto as is depicted in the Figures. Due to the construction using four rather than two chambers, that time period, which is available for evaporating and forming a gas mixture for the diesel-air mixture in accordance with diesel injection techniques can be increased since each combustion chamber is only opened during every fourth working stroke relative to the cylinder volume of the working cylinder 72. The injection process is effected by means of the injection nozzle 170, whilst the ignition process is effected by the spark plug 17. The supply of air and the removal of exhaust gases is effected in analogy with FIG. 6 by means of a suction rotary valve 63 incorporating a fresh air channel 76 and a fresh air supply opening 78 and also an exhaust channel 7 incorporating an exhaust gas opening 77. The suction rotary valve 63 rotates at the same rotational speed as the crank shaft 10. In FIG. 21, the first piston 73 is in the top dead center position following a compression stroke and prior to the suction stroke, whereby the fresh air supply opening 78 in the fresh air channel 76 is now opened relative to the first cylinder volume. The working cylinder is in the working stroke phase wherein the ignited, expanded and burnt gas flows out from the combustion chamber 85*d* and into the second cylinder volume 79 whilst the working piston 74 is forced downwardly. In the 90° position of the crank shaft depicted in FIG. 22, the compression cylinder 71 is in the suction stroke phase wherein fresh air is sucked into the first cylinder volume 178 through the fresh air channel 76 and the fresh air supply means 78. The working piston 74 is at the bottom dead center position during the transition from the working stroke phase to the exhaust stroke phase, so that, thereafter, the exhaust gas opening 77 will be opened relative to the second cylinder volume 79.

Figure 23D:
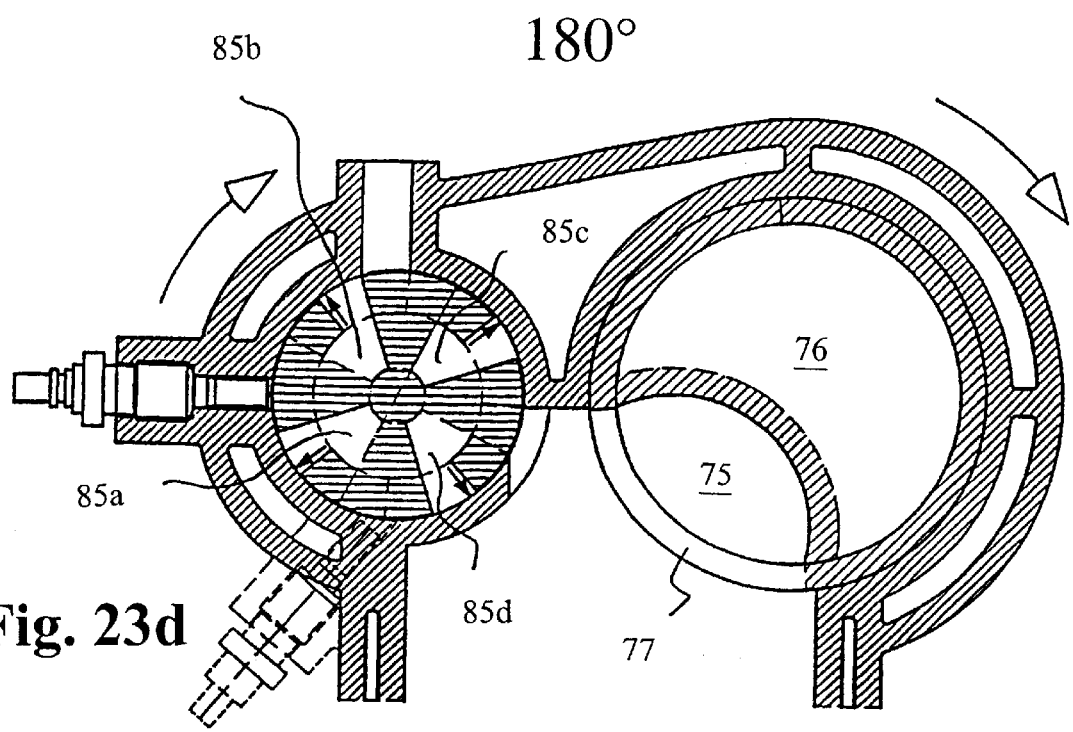
Figure 23C:
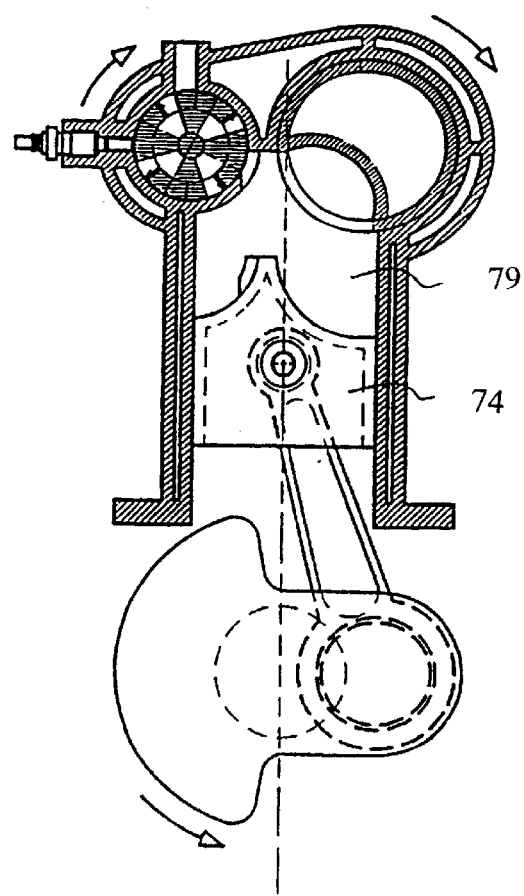
Figure 24B:
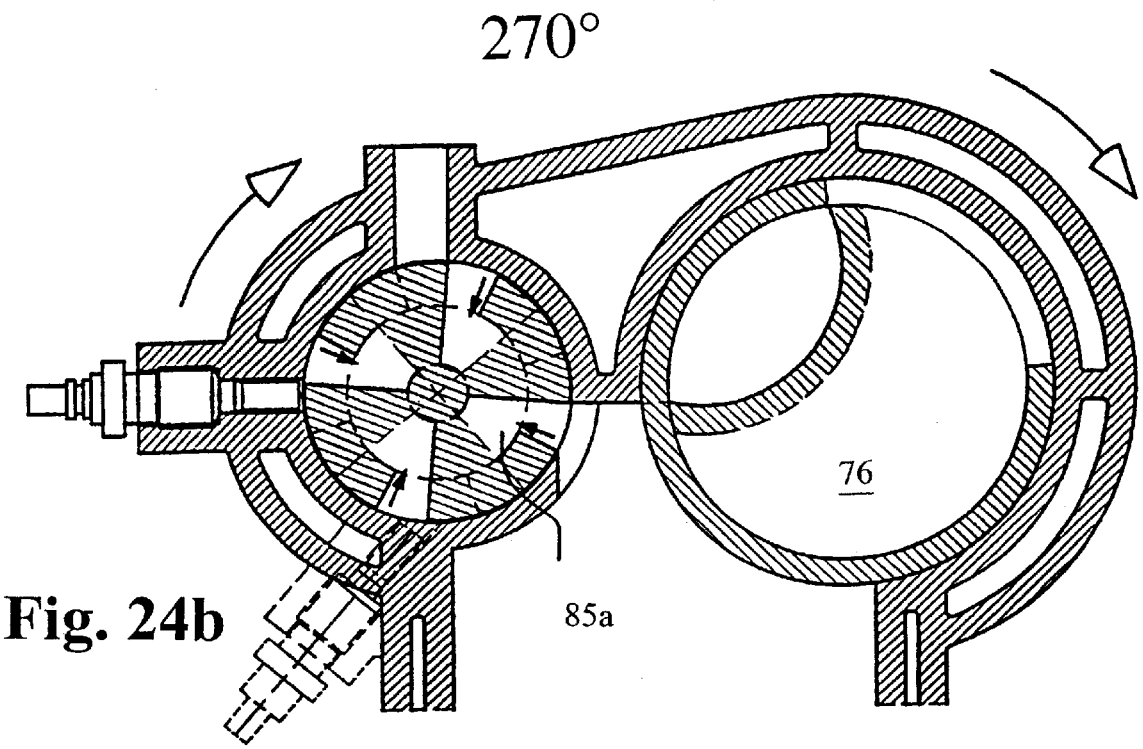
Figure 24A:
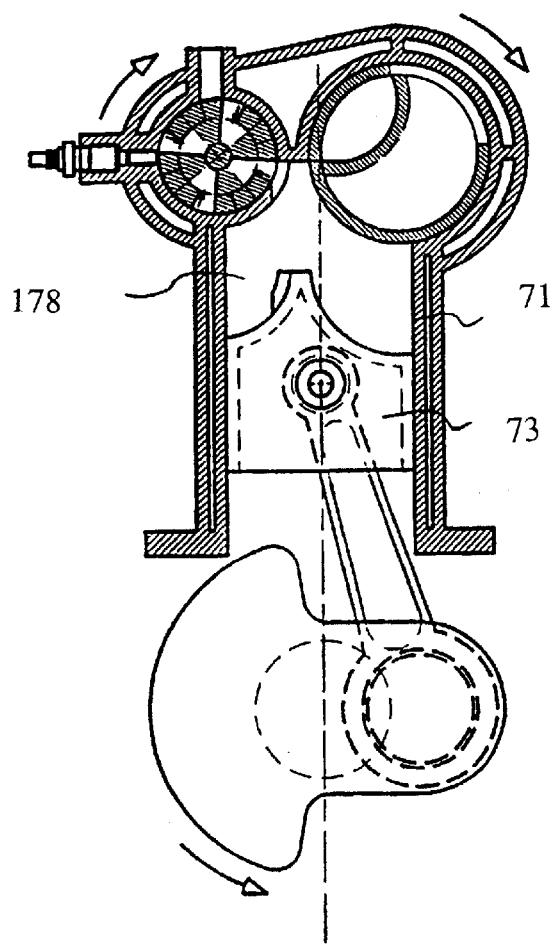
Figure 24D:
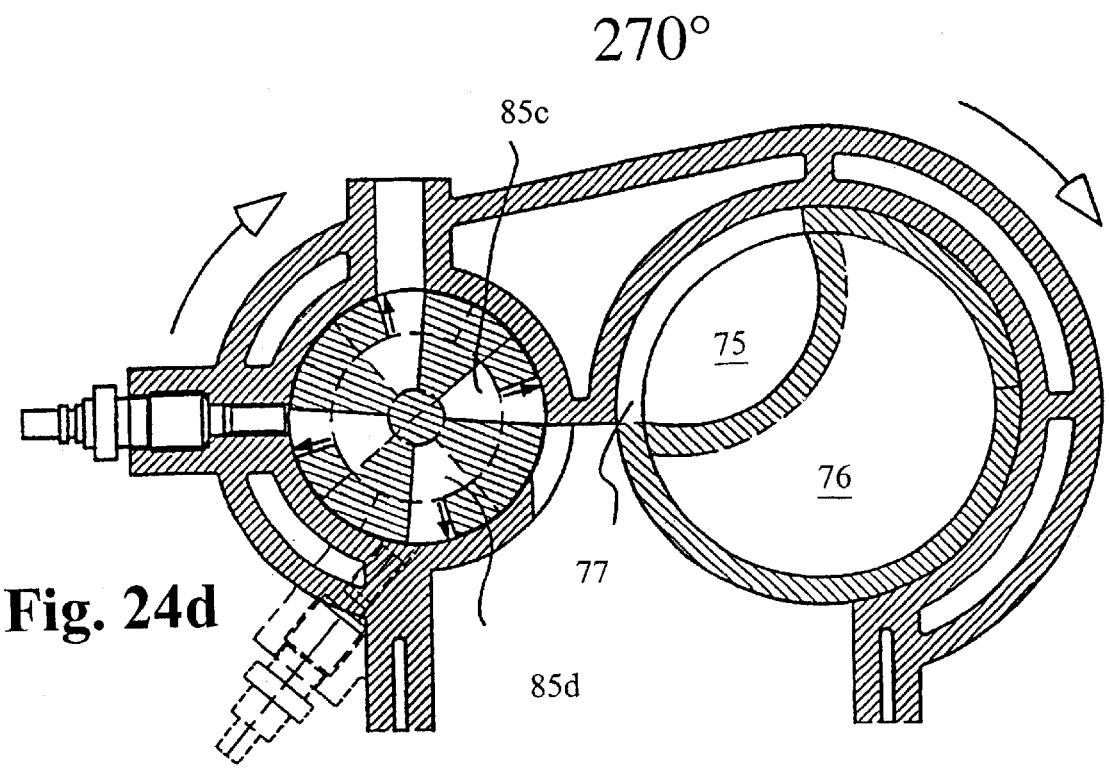
Figure 24C:
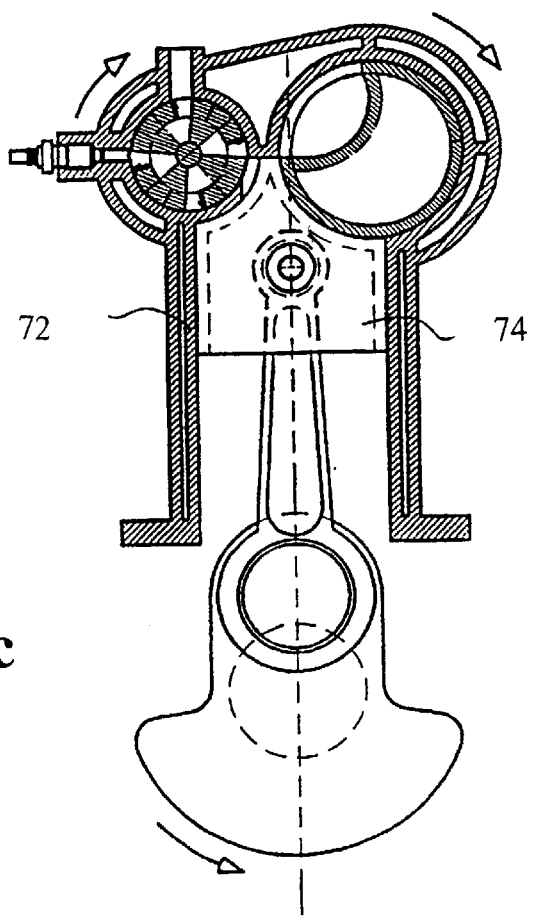
Figure 25:
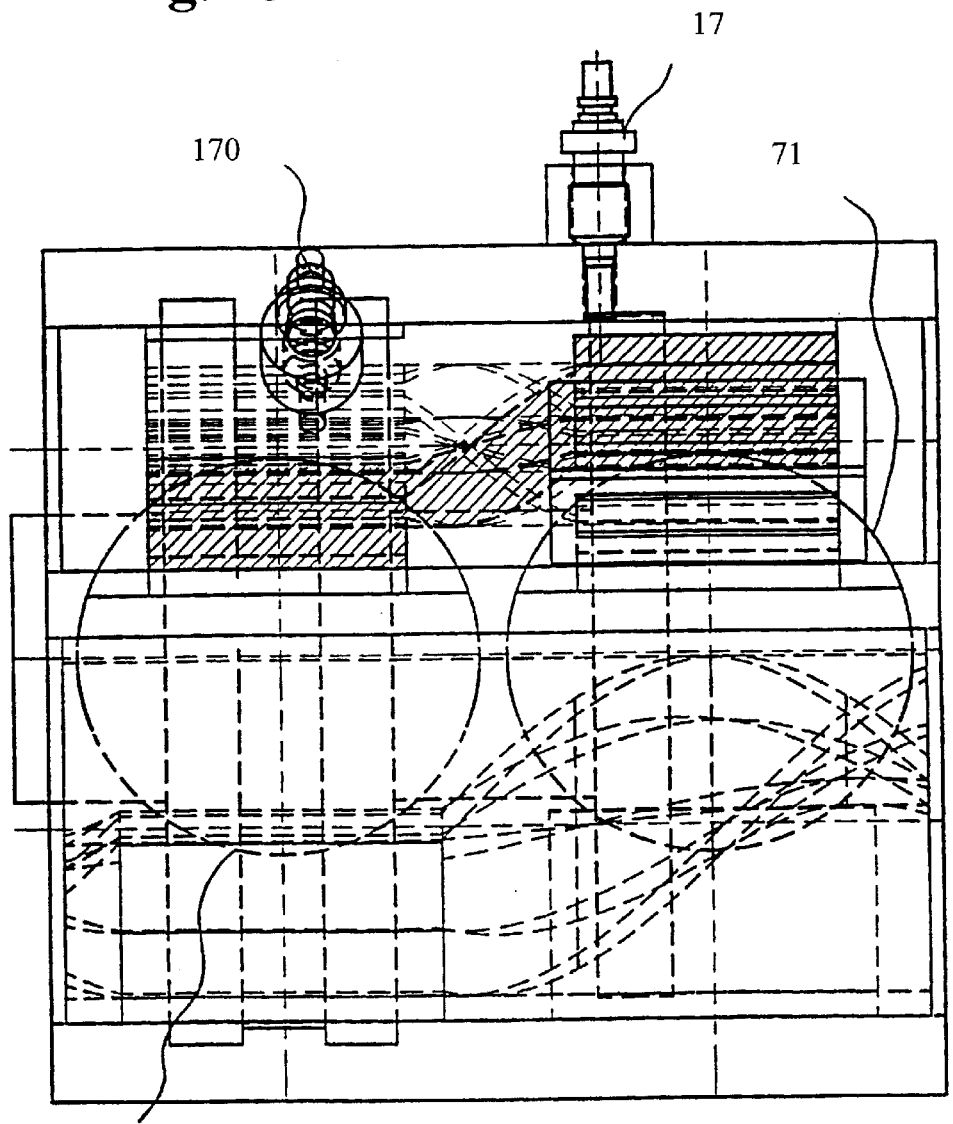
FIG. 25 is a top view of the internal combustion engine in the fourth embodiment.
Figure 26:
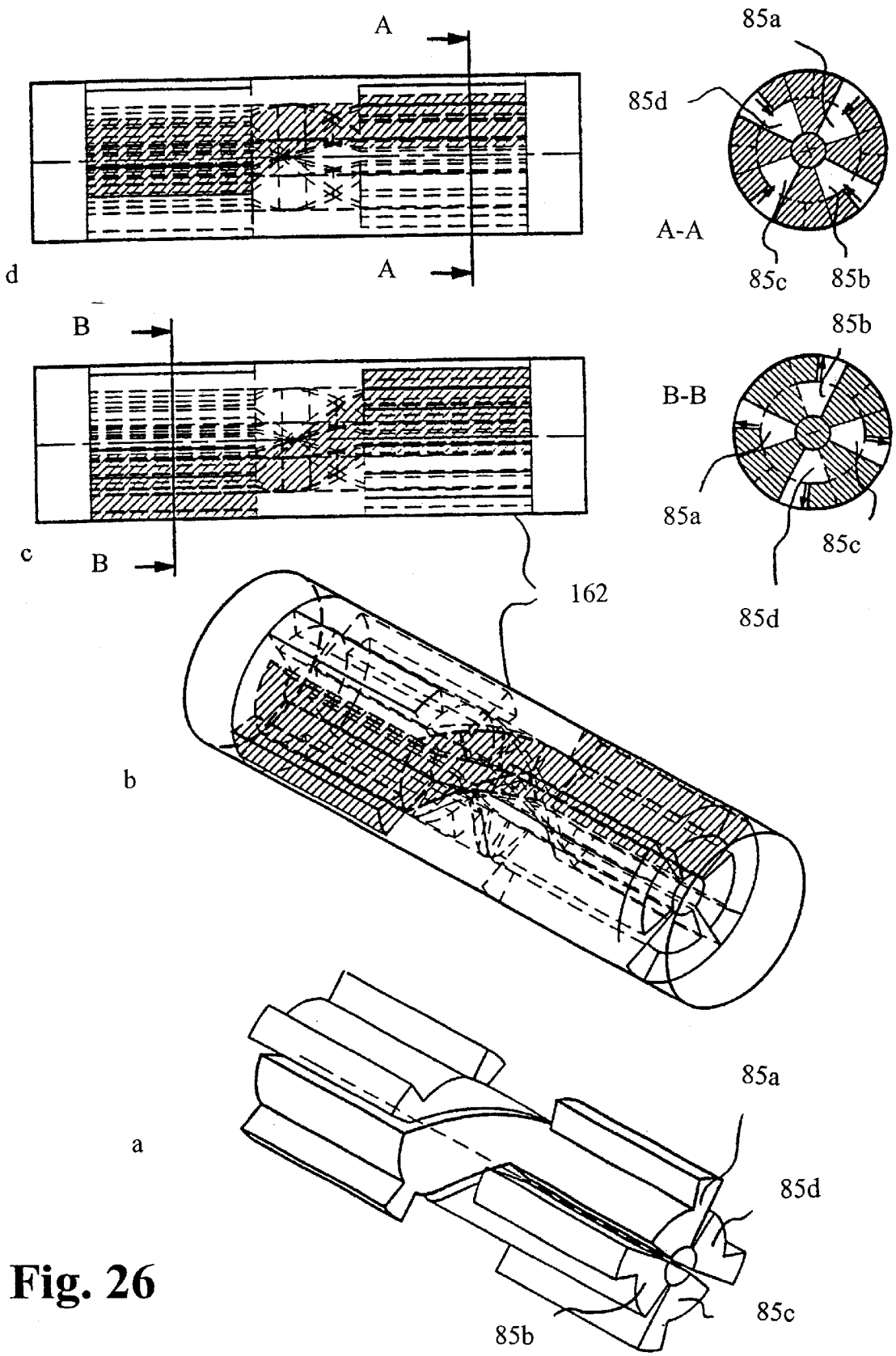
FIGS. 26a–d are illustrations of the combustion chambers in the fourth embodiment.
Figure 28B:
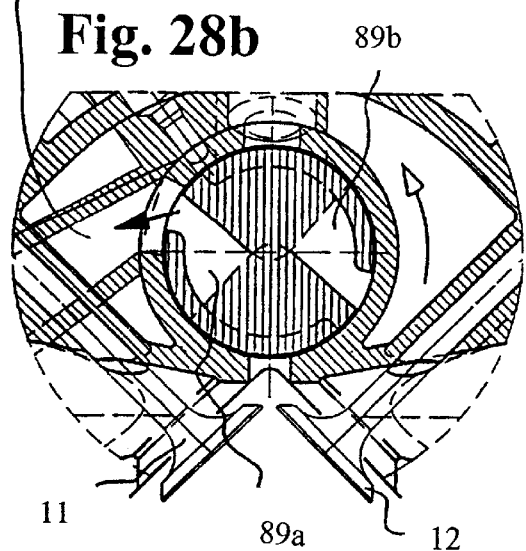
Figure 28D:
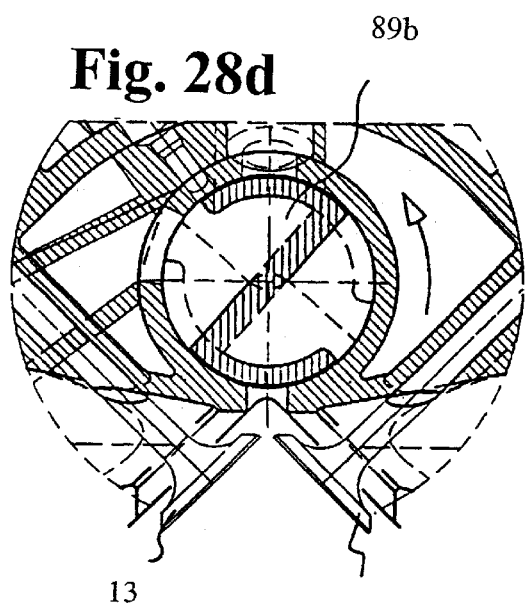
Figure 28A:
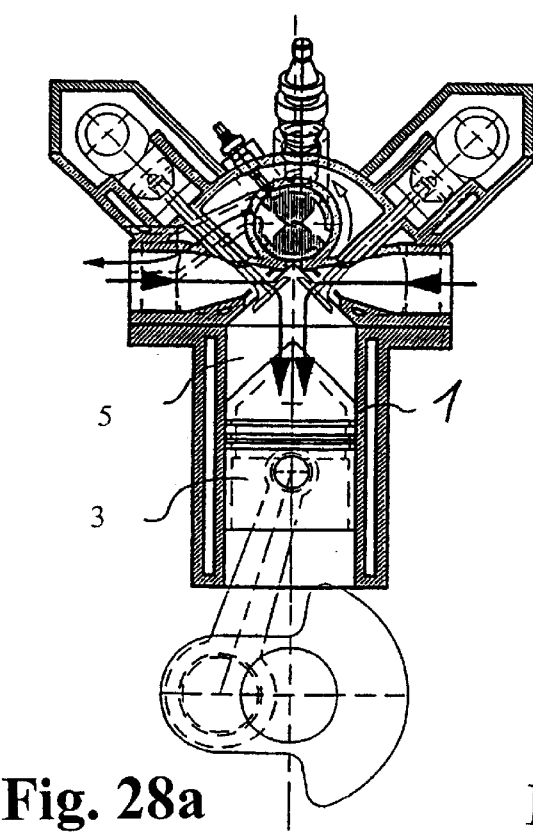
Figure 28C:
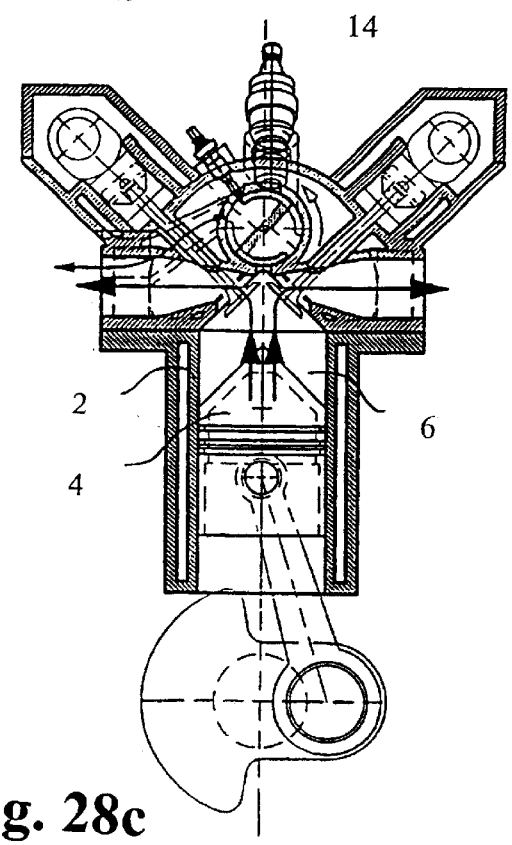

In the 180° position of the crank shaft depicted in FIG. 23, the compression piston 73 is in the bottom dead center position at the transition from the suction stroke phase to the compression stroke phase. The fresh air supply opening 78 is now closed relative to the first cylinder volume, and thereafter, the combustion chamber 85*a* will be opened relative to the first cylinder volume. The working piston is in the exhaust stroke phase wherein the exhaust gas is expelled through the exhaust gas opening 77 into the exhaust gas channel 75 by the working piston 74. In FIG. 23*b*, the load on the chamber 85*d* is removed and placed on the chamber 85*c*.

In the 270° position of the crank shaft depicted in FIG. 24, the compression cylinder 72 is in the compression stroke phase, wherein the compression piston 73 forces fresh air into the combustion chamber 85*a* which is now opened relative to the first cylinder volume 178. The working piston 74 in the working cylinder 72 is in the top dead center position following the exhaust stroke and prior to the working stroke so that the combustion chamber 85*c* will be opened thereafter relative to the second cylinder volume and the exhaust gas opening 77 in the exhaust gas channel 75 will just be closed.

In this embodiment, the first piston i.e. the compression piston 73 follows the second piston i.e. the working piston 74 by a crank shaft angular difference of 90°.

FIGS. 27 to 32 show a fifth embodiment, which corresponds to the first embodiment, whereby however, two combustion chambers 89*a* and 89*b* are provided in the combustion shaft. The combustion shaft runs with a step down ratio of 2:1 relative to the crank shaft so that by comparison with the first embodiment, twice the amount of time is available for the evaporation of the fuel in the combustion chambers. In contrast to the first embodiment, the second piston follows the first piston by a crank shaft angular difference of 180°. Accordingly, the combustion chambers 89*a* and 89*b* are twisted in the manner of a screw as is apparent from FIGS. 32*a*–32*d* for example. In the 0° position depicted in FIG. 27, the first piston 3 is in the top dead center position following a compression stroke and prior to the next suction stroke. The second combustion chamber 89*b* has just been filled with compressed fresh gas. The working piston 4 is in the bottom dead center position following a working stroke and prior to the exhaust stroke. The first combustion chamber 89*a* has just been closed relative to the second cylinder volume 6.

In the 90° position of the crank shaft depicted in FIG. 28, the first cylinder 1 is in the suction stroke phase wherein fresh gas is supplied to the first cylinder volume 5 by means of the inlet valves 11, 12. The first combustion chamber 89*a* expels part of the residual exhaust gas located therein through an exhaust line 114. The second cylinder 2 is in the exhaust stroke phase wherein the exhaust gas is expelled via the outlet valves 13, 14.

Figure 29B:
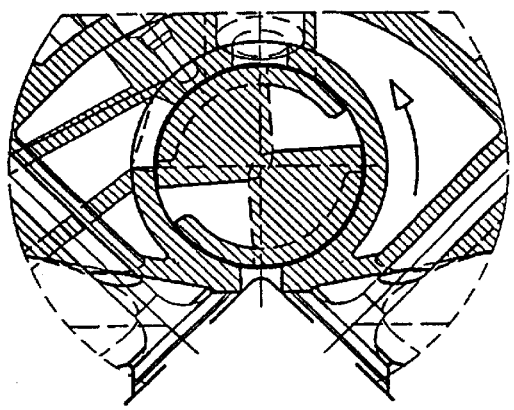
Figure 31:
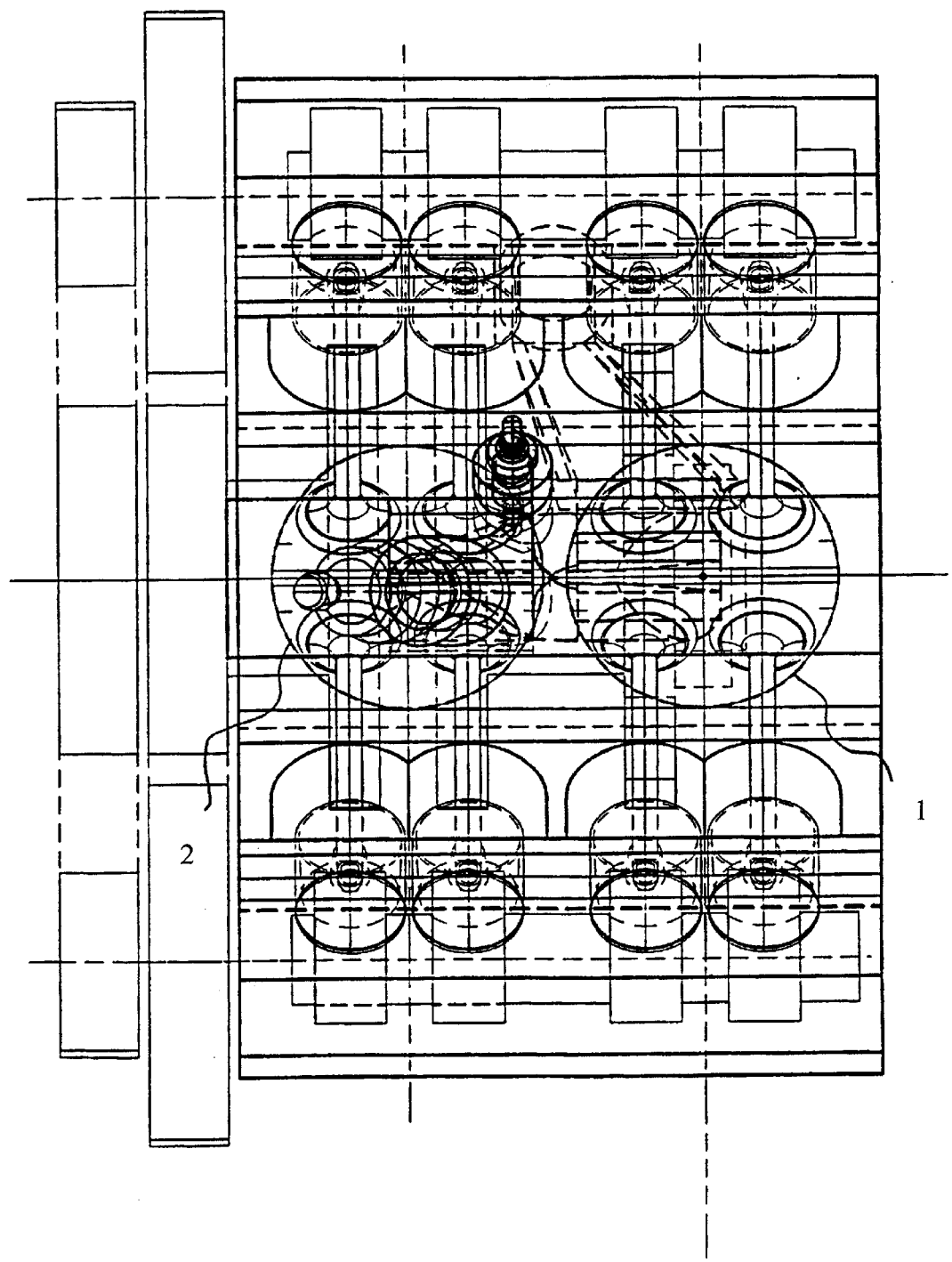
FIG. 31 is a top view of the internal combustion engine in the fifth embodiment.
Figures 32A, 32B, 32C, 32D:
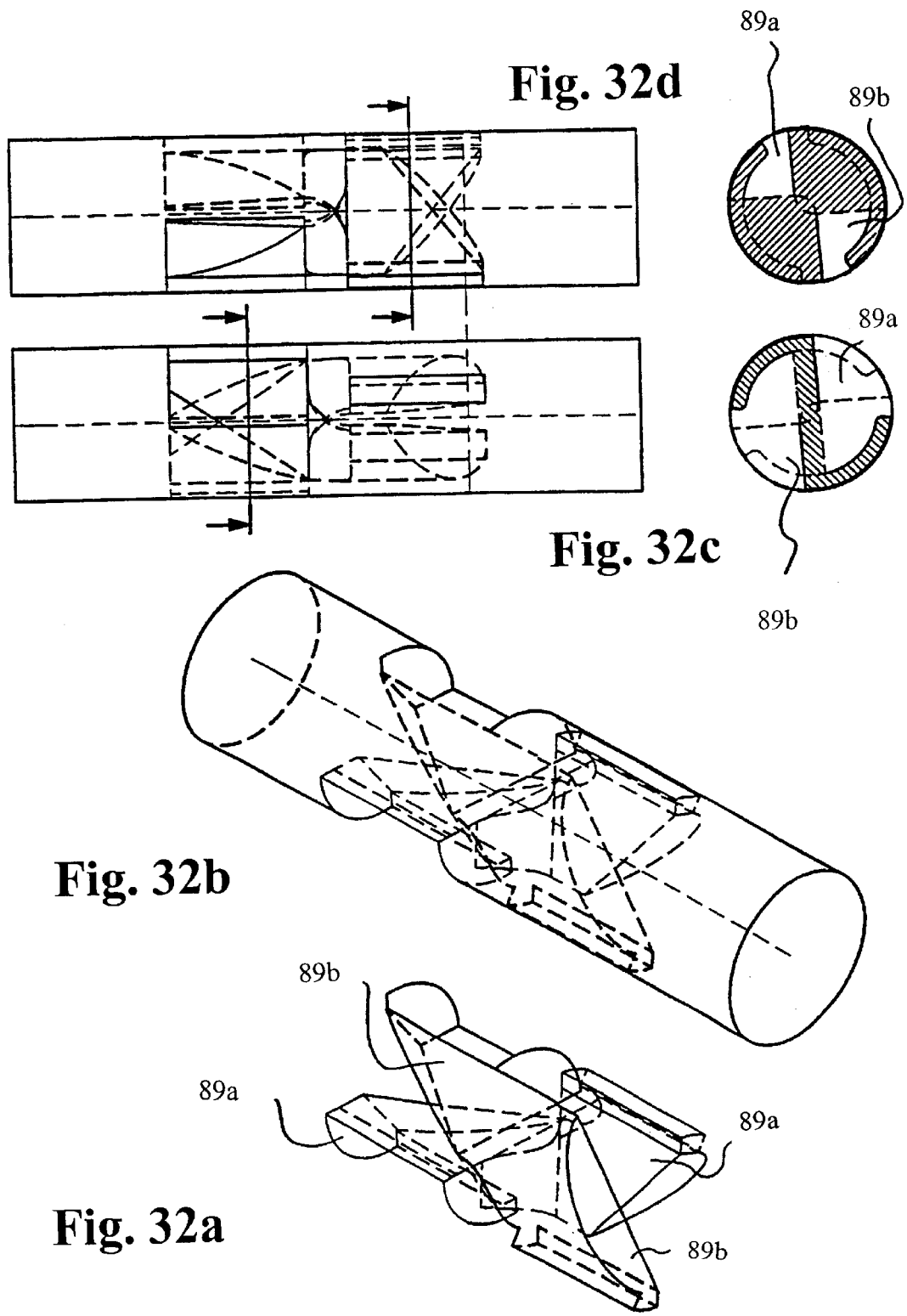
FIGS. 32a–d are illustrations of the combustion chambers in the fifth embodiment.

In the 180° position of the crank shaft depicted in FIG. 29, the first piston 3 is in the bottom dead center position so that the compression stroke will now begin following the suction stroke. The second piston 4 is in the top dead center position so that the working stroke will start thereafter whereby hot combustion gases will flow out from the second combustion chamber 89*b* into the second cylinder volume as is apparent from FIGS. 30*c* and 30*d*, which show the 270° position.

In the case of the first five embodiments, it is advantageous that following the exhaust stroke and after the closure of the combustion chamber relative to the second cylinder volume, the exhaust gas remaining in the combustion chamber will be expelled at least partially into an exhaust line. The fuel, especially petrol or diesel, is then injected into the compression chamber and evaporated at least to a partial extent in the still hot combustion chamber. In the succeeding compression stroke, fresh gas is forced into the combustion chamber that is filled with fuel and fuel vapor. It is advantageous that the fuel will then be completely evaporated by the time of the succeeding ignition process. It is possible to dispense with the exhaust line used for the process of completely emptying the closed combustion chamber.

FIGS. 33 to 36 show a sixth embodiment, which represents a further modification of the first embodiment. The same reference numerals have been used for components, which remain unaltered relative to the first embodiment. In this embodiment, the control shaft 93 serves for guiding compressed fresh gas from the compression cylinder 1 into the combustion chambers 183, 184 and following the injection of preferably diesel fuel by means of the injection nozzles 117 into the combustion chambers 183, 184, for opening these relative to the second cylinder volume 6 of the working cylinder 2. Consequently, the combustion chambers 183, 184 in this sixth embodiment are fixed relative to the cylinders, and the control shaft 93 merely serves for providing the desired connection between the cylinders and the combustion chambers. The ignition process is effected by means of spark plugs 118, which project into the combustion chamber.

It is advantageous, if the control shaft rotates in the same sense as the crank shaft and runs with a step-down ratio of 2:1; the cylinders 1, 2 function at the same angle of the crank shaft as was previously described in connection with the first embodiment.

Figure 33B:
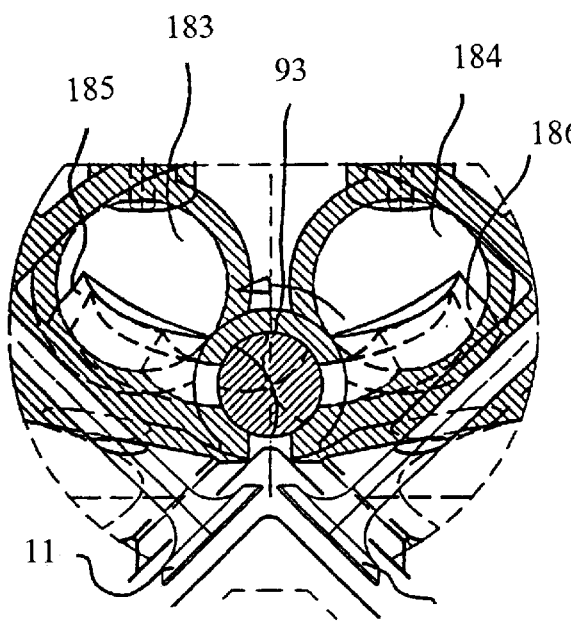
FIGS. 33a–d and 34a–d are sectional views of the first and second cylinders in a sixth embodiment of the invention depicting the crank shaft in the 0° and 180° positions.
Figure 33D:
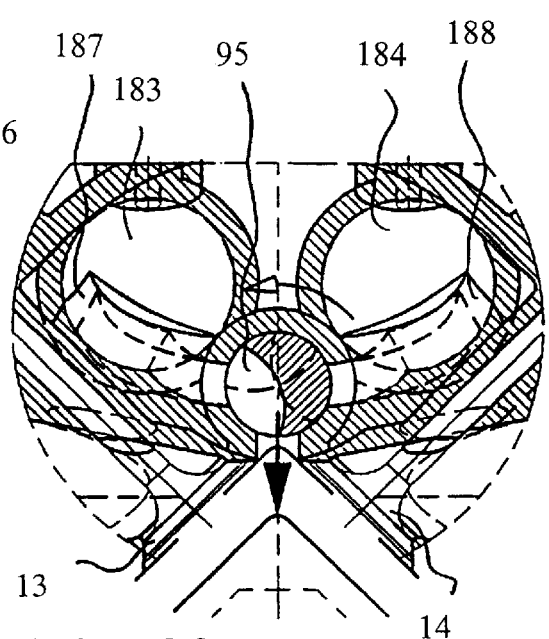
Figure 33A:
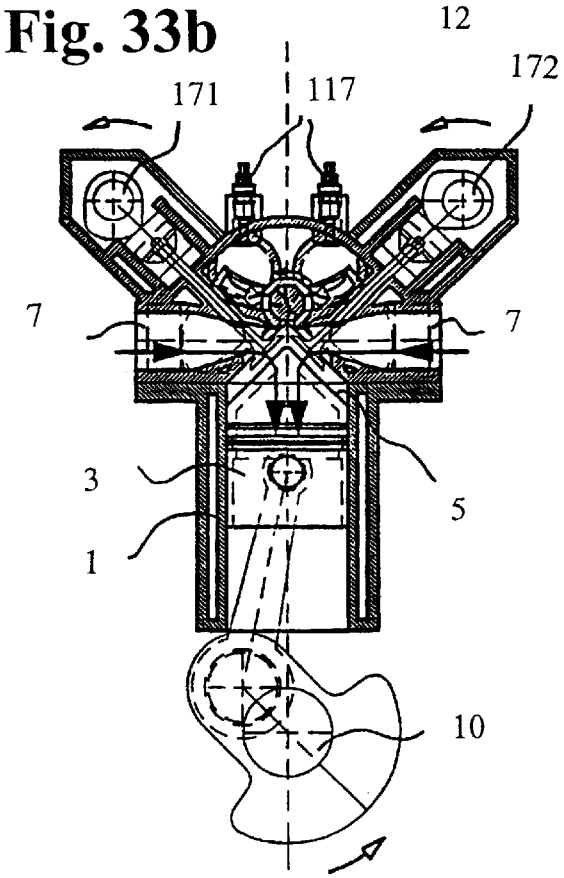
Figure 33C:
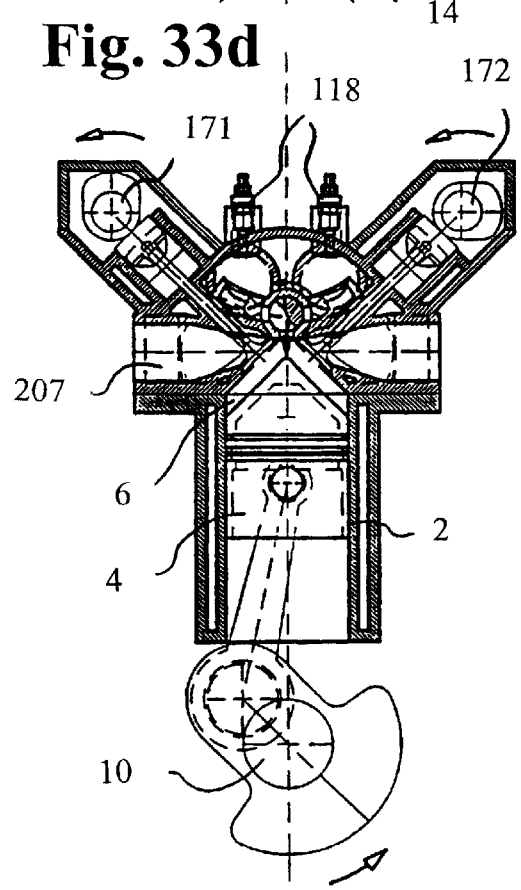
Figure 34B:
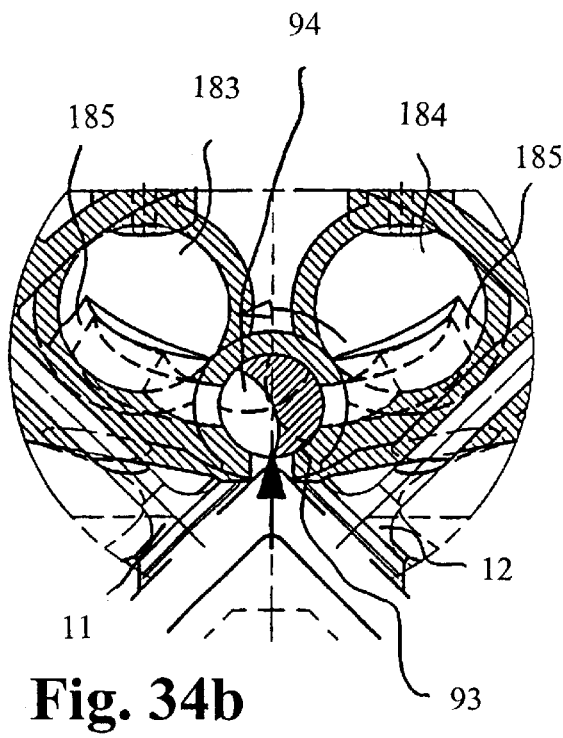
Figure 34D:
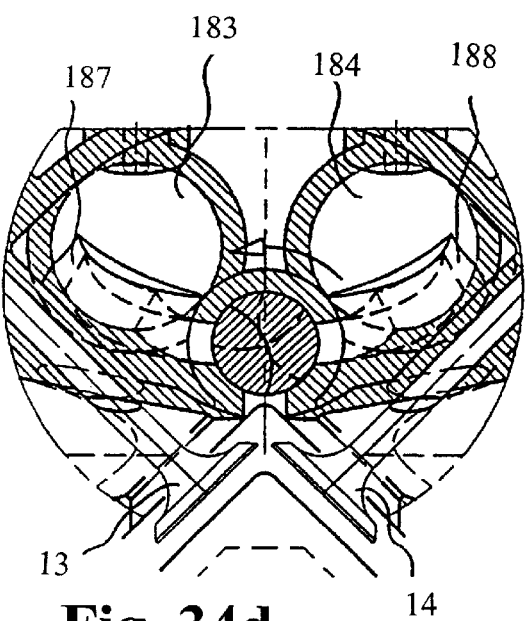
Figure 34A:
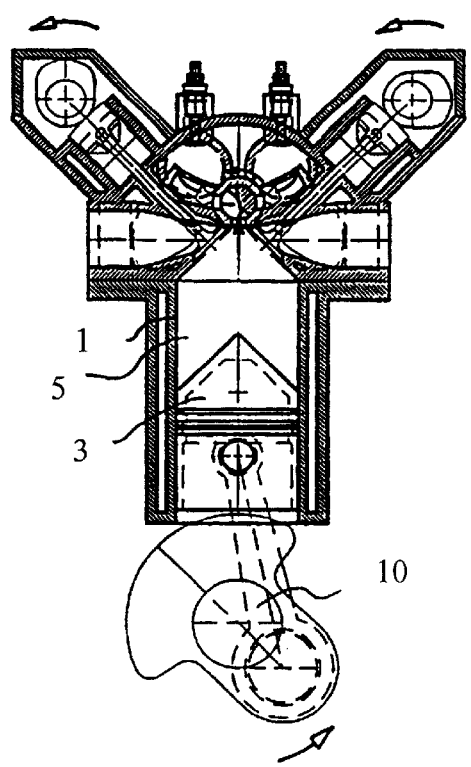
Figure 34C:
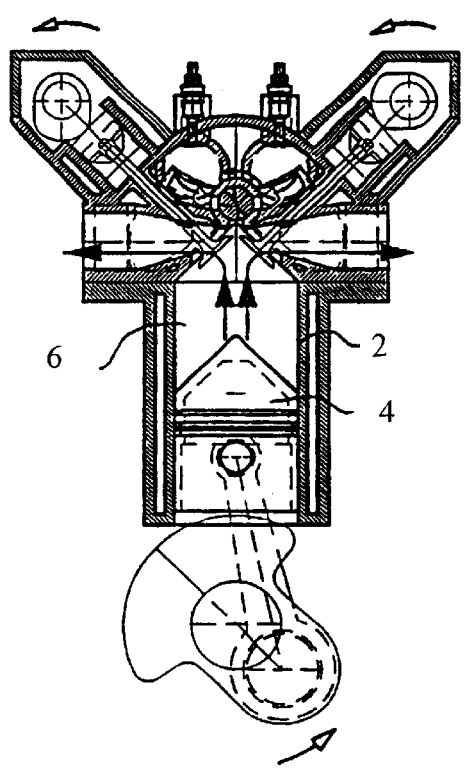
Figure 35:
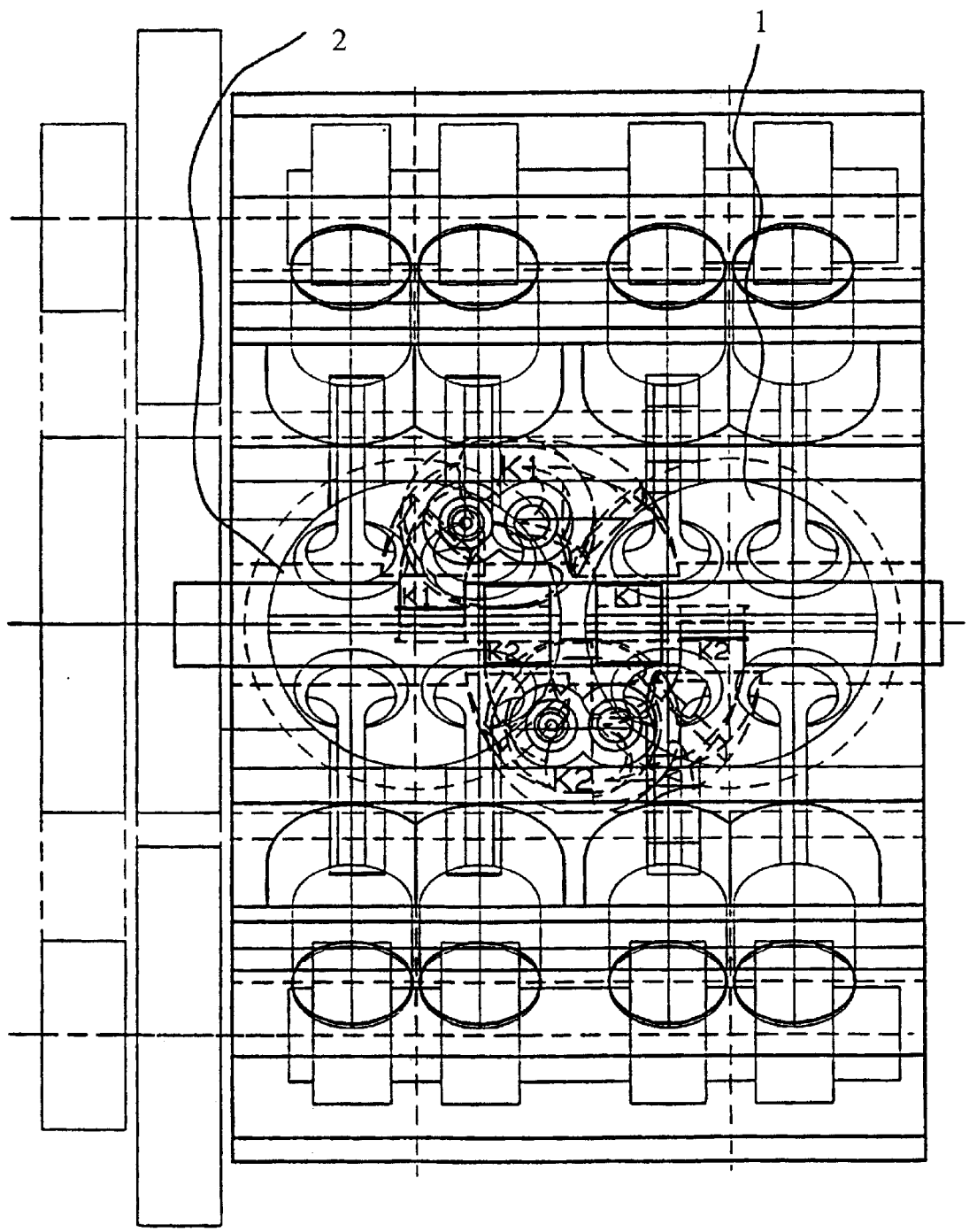
FIG. 35 is a top view of the internal combustion engine in the sixth embodiment.
Figure 36B:
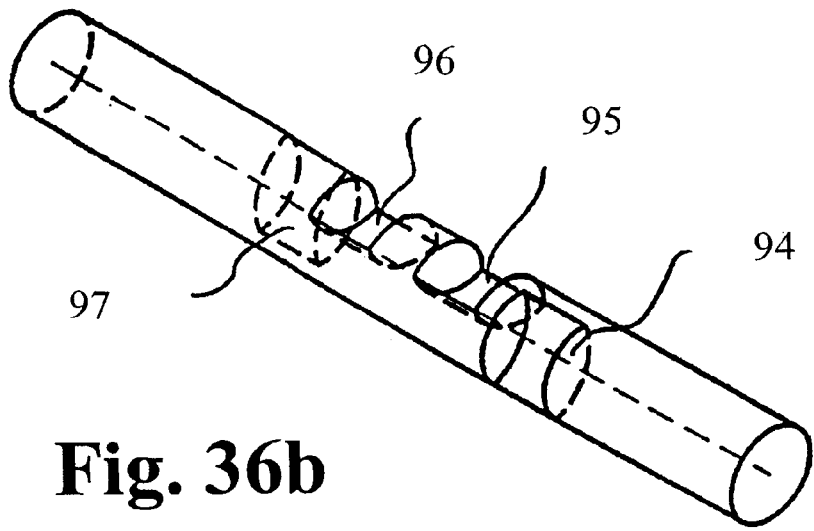
FIGS. 36a, b are perspective views of the control shaft in the sixth embodiment.
Figure 36A:
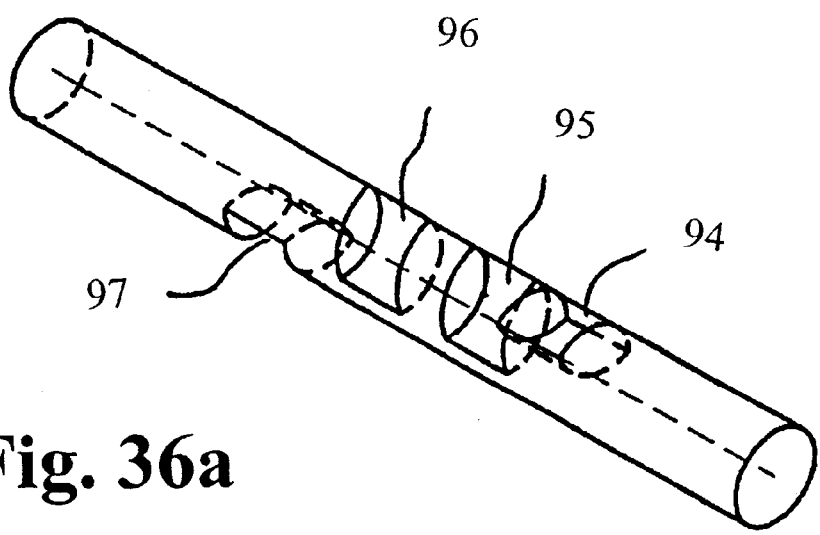

Thus, according to FIGS. 34a, b, the control shaft alternately represents a connection between the compression cylinder 1 and one of the two combustion chambers 183, 184 during the compression stroke phase; in accordance with FIGS. 34c, d, the working cylinder 2 is simultaneously in the exhaust stroke phase. In FIGS. 33a, b, the compression cylinder 1 is in the suction stroke phase, whilst the working cylinder 2 is in the working stroke phase and is connected to the combustion chamber 183. FIGS. 36a, b show the construction of the control shaft in these two positions. Passage openings 94, 95, 96, 97 in the control shaft 93 have an oval form for example along the cross-section of the control shaft. FIGS. 36a and 36b show examples for the shape of the passage openings 94, 95, 96, 97. They are in the form of concave recesses in the cylindrical control shaft 93, wherein the curves of the recesses are advantageously in the form of an arc of a circle.

The passage openings 94, 95, 96 and 97 in the control shaft 93 are connected to the connector openings 185, 186, 187 and 188 in the combustion chambers 183 and 184.

It is advantageous if a first cylinder is used continuously as a compression cylinder, whereby the piston and/or the connecting rods thereof may be made of a synthetic material for example so that they are light in weight and are also economical to manufacture.

What is claimed is:

1. An internal combustion engine which comprises:
a first cylinder in which a first piston is connected to a crank shaft that is guided, and a first cylinder volume, which is formed between the first piston and the first cylinder and is adapted to be filled with fresh gas during the expansion thereof in a suction stroke, whereby the fresh gas is adapted to be compressed in a subsequent compression stroke during the reduction in size of the first cylinder volume, wherein outside the first cylinder volume there are provided at least two mutually separated combustion chambers, which are arranged in a rotatably mounted combustion rotary valve, the first cylinder is spaced from a second cylinder in the axial direction of the combustion rotary valve and compressed fresh gas is adapted to be transferred from the first cylinder to the second cylinder by the combustion rotary valve, wherein the compressed fresh gas is chargeable with fuel and is ignitable therein is adapted to be successively fed into the combustion chambers from the first cylinder volume during successive compression strokes, and following the ending of a respective compression stroke, each of the combustion chambers is connectible during a working stroke to a second cylinder volume, which is formed between the second cylinder and a second piston that is connected to the crank shaft, whereby the second piston is displaceable by the ignition of the compressed fresh gas that is charged with fuel in such a manner that the second cylinder volume will be expandable and exhaust gas will be expellable by the second piston from the second cylinder volume during an exhaust stroke subsequent to the working stroke.

2. The internal combustion engine according to claim 1, wherein the rotational axis of the rotatably mounted combustion rotary valve extends in parallel with the crank shaft.

3. The internal combustion engine according to claim 1, wherein the combustion chamber is closed relative to the first cylinder volume following the compression stroke, whereafter fuel is adapted to be injected and ignited automatically or by means of an ignition device and thereafter the combustion chamber is open relative to the second cylinder volume.

4. The internal combustion engine according to claim 1, wherein the cubic capacity of the first cylinder or of the second cylinder substantially corresponds to at least that of the respective first or the second cylinder volume.

5. The internal combustion engine according to claim 1, wherein the first piston and the second piston are arranged at the same angular position of the crank shaft and first, the working stroke and the suction stroke and second, the exhaust stroke and the compression stroke are adapted to be carried out simultaneously.

6. The internal combustion engine according to claim 5, wherein inlet valves for fresh gas are provided on the first cylinder.

7. The internal combustion engine according to claim 5, wherein outlet valves for expelling the exhaust gas to an exhaust line are provided on the second cylinder.

8. The internal combustion engine according to claim 5, wherein the combustion shaft is rotatable in the same manner as the crank shaft.

9. The internal combustion engine according to claim 1, wherein the rotatably mounted combustion rotary valve is a combustion shaft, which preferably has a circular cross-section.

10. The internal combustion engine according to claim 9, wherein at least two combustion chambers are mutually spaced in the peripheral direction in the combustion shaft and are preferably arranged symmetrically relative to the rotational axis of the combustion shaft.

11. The internal combustion engine according to claim 9, wherein the combustion shaft is adapted to be driven in synchronism with the crank shaft.

12. The internal combustion engine according to claim 9, wherein the combustion shaft includes two combustion chambers and is adapted to be driven at substantially half the rotational speed relative to the crank shaft and includes an Otto engine.

13. The internal combustion engine according to claim 9, wherein a respective portion of the combustion shaft projects into the first cylinder and into the second cylinder, whereby the respective cross-sections of the portions substantially form a 90° segment of the circular cross-section of the combustion shaft which has an angular range of up to 90°.

14. The internal combustion engine according to claim 13, wherein the two pistons include a respective recess for resting on the respective portion of the combustion shaft or the housing for the combustion shaft.

15. The internal combustion engine according to claim 9, wherein the combustion shaft includes four combustion chambers and is adapted to be driven at substantially a quarter of the rotational speed relative to the crank shaft.

16. The internal combustion engine according to claim 15, wherein the combustion shaft includes a diesel engine.

17. The internal combustion engine according to claim 9, wherein an injection nozzle for the fuel includes a spark plug that is or are arranged on a housing surrounding the combustion shaft.

18. The internal combustion engine according to claim 17, wherein an injection nozzle for the fuel includes a spark plug that is located on the cylinder head.

19. The internal combustion engine according to claim 9, further includes a suction rotary valve, which is preferably arranged in parallel with the combustion shaft and fresh gas is adapted to be conveyed to the first cylinder in the axial direction thereof.

20. The internal combustion engine according to claim 19, wherein the suction rotary valve rotate at substantially the same rotational speed as the crank shaft and is driven thereby.

21. The internal combustion engine according to claim 19, wherein an exhaust gas channel, which is at least intermittently open relative to the second cylinder volume during the exhaust stroke, is formed in the suction rotary valve.

22. The internal combustion engine according to claim 9, wherein the crank shaft is rotatable in the opposite sense relative to the combustion shaft and the suction rotary valve.

23. The internal combustion engine according to claim 22, wherein the first cylinder follows the second cylinder at an angular displacement of the crank shaft of 90°, 180° or 270°.

24. The internal combustion engine according to claim 9, wherein the crank shaft and the combustion shaft are rotatable in the same sense but in the opposite sense relative to a suction rotary valve.

25. The internal combustion engine according to claims 24, wherein the crank shaft rotates in the opposite sense relative to the combustion shaft and the suction rotary valve, and the second piston follows the first piston with an angular displacement of 90°, 180° or 270°.

26. The internal combustion engine according to claims 9, wherein the combustion chambers are at a fixed position in relationship to the first cylinder and the second cylinder and are connectable by a control device to the first cylinder and the second cylinder.

27. The internal combustion engine according to claims 26, wherein the control device is adapted to be driven in synchronism with the crank shaft.

28. The internal combustion engine according to claims 27, wherein the control device includes a rotatably mounted body having at least one passage opening from the cylinder volumes to the combustion chambers.

29. The internal combustion engine according to claim 28, wherein the rotatably mounted body includes a control shaft that is in parallel with the crank shaft and includes a circular cross-section.

30. The internal combustion engine according to claim 29, wherein two mutually separated combustion chambers are alternately connectable to the first cylinder volume and the second cylinder volume by means of the control shaft.

31. The internal combustion engine according to claim 29, wherein the control shaft includes a circular cross-section incorporating a curved recess for the passage opening.

32. A process for operating an internal combustion engine comprising:

compressing fresh gas in a first cylinder volume incorporating a first piston during at least one compression stroke and is forced into one of at least two combustion chambers which are arranged in a rotating combustion rotary valve, wherein combustion of a mixture consisting of the compressed fresh gas and at least partially evaporated fuel is initiated after the combustion chamber has been closed relative to the first cylinder volume;

opening the combustion chamber relative to a second cylinder volume and the expanding combustion gases from the combustion chamber are applied to a second piston in the second cylinder volume for performing a working stroke;

expelling exhaust gases from the second cylinder volume, wherein the first cylinder volume is spaced from the second cylinder volume in the axial direction of the combustion rotary valve following the completion of the working stroke; and transferring compressed fresh gas from the first cylinder volume to the second cylinder volume by the combustion rotary valve.

33. The process according to claim 32, further includes the successive opening in a synchronous movement of the two combustion chambers relative to the first cylinder volume and the second cylinder volume.

34. The process according to claim 33, wherein the synchronous movement is at a continuous speed.

35. The process according to claim 32, further includes closing the respective combustion chamber relative to the second cylinder volume after the working stroke and then inserting fuel into the combustion chamber and then inserting fresh air into the combustion chamber that is filled with at least partially evaporated fuel in a following compression stroke.

36. The process according to claim 35, further includes at least partially transferring residual exhaust gases, which are present in the combustion chamber, from the combustion chamber to an exhaust line following the closure of a combustion chamber relative to the second cylinder volume.

37. The process according to claim 35, wherein an inlet connector that intermittently connects the first or the second cylinder volume to a suction line and an outlet connector that intermittently connects the first or the second cylinder volume to an exhaust line rotate in synchronism with the two combustion chambers, whereby the two combustion chambers are held closed relative to the cylinder volume during the respective suction and exhaust connecting processes.

38. The process according to claim 37, wherein there are provided two combustion chambers which rotate at a rotational speed that is approximately half the rotational speed of the crank shaft driving the piston.

39. The process according to claim 37, wherein there are provided four combustion chambers which rotate at a rotational speed that is substantially a quarter of the rotational speed of the crank shaft.

* * * * *